United States Patent [19]

Adelson et al.

[11] Patent Number: 5,526,446
[45] Date of Patent: Jun. 11, 1996

[54] NOISE REDUCTION SYSTEM

[75] Inventors: Edward H. Adelson, Cambridge; William T. Freeman, Brookline, both of Mass.

[73] Assignee: Massachusetts Institute of Technology, Boston, Mass.

[21] Appl. No.: 764,567

[22] Filed: Sep. 24, 1991

[51] Int. Cl.$^6$ .................................................. G06K 9/40
[52] U.S. Cl. ...................... 382/275; 382/260; 382/279
[58] Field of Search ............................... 382/54, 49, 42; 358/167; 346/616

[56] References Cited

U.S. PATENT DOCUMENTS

| | | | |
|---|---|---|---|
| 4,163,258 | 7/1979 | Ebihara et al. | 382/54 |
| 4,523,230 | 6/1985 | Carlson et al. | 358/167 |
| 4,549,212 | 10/1985 | Bayer | 358/167 |
| 4,674,125 | 6/1987 | Carlson et al. | 382/49 |

OTHER PUBLICATIONS

William T Freeman et al "Steerable Filters for Early Vision, Image Analysis & Wavelet Decomposition" 1990 IEEE p. 406.

W. T. Freeman and E. H. Adelson. Steerable Filters for Early Vision, Image Analysis, and Wavelet Decomposition, The Media Lab, MIT, 20 Ames St., Cambridge, MA 02139, Proc. ICCV., pp. 406–415, 1990.

W. T. Freeman and E. H. Adelson. The Design and Use of Steerable Filters, IEEE Transactions on Pattern Analysis and Machine Intelligence, vol. 13, No. 9, pp. 891–906, Sep. 1991.

E. P. Simoncelli, W. T. Freeman, E. H. Adelson and D. J. Heeger. Shiftable Multiscale Transforms, IEEE Transactions on Information Theory, vol. 38, No. 2, pp. 587–607, Mar. 1992.

T. Poggio and F. Girosi. A Theory of Networks for Approximation and Learning, MIT, Artificial Intelligence Lab. and-Center for Biological Information Processing, Whitaker College, A.I. Memo No. 1140, C.B.I.P. Paper No. 31, Jul. 1989.

R. C. Gonzalez and P. Wintz. Digital Image Processing, Addison–Wesley Publishing Company, Inc., Advanced Book Program, 1977.

J. W. Woods. Subband Image Coding, Kluwer Academic Publishers, 1990.

H. J. Trussell. A Fast Algorithm for Noise Smoothing Based on a Subjective Criterion, IEEE Transactions on Systems, Man, and Cybernetics, vol. SMC–7, No. 9, pp. 677–678, Sep. 1977.

(List continued on next page.)

Primary Examiner—Leo Boudreau
Assistant Examiner—Chris Kelley
Attorney, Agent, or Firm—Robert K. Tendler

[57] ABSTRACT

A technique is provided to remove noise from images and to enhance their visual appearance through the utilization of a technique which converts an image into a set of coefficients in a multi-scale image decomposition process, followed by modification of each coefficient based on its value and the value of coefficients of related orientation, position, or scale, which is in turn followed by a reconstruction or synthesis process to generate the enhanced image. Also contributing to the improved enhancement is a set of orientation tuned filters of a specialized design to permit steering, with the analysis and synthesis filters also having a self-inverting characteristic. Additionally, steerable pyramid architecture is used for image enhancement for the first time, with the steering being provided by the above orientation tuned filters. The utilization of related coefficients permits coefficient modification with multipliers derived through a statistical or neural-network analysis of coefficients derived through the utilization of clean and degraded images, with the modifiers corresponding to vectors which result in translating the degraded image coefficients into clean image coefficients, in essence by cancelling those portions of a coefficient due to noise. Further improvements include an overlay of classical coring on single coefficients. Thus, the subject technique provides improved image enhancement through the use of a multi-band or scale-oriented analysis and synthesis transform having improved coefficient modification, good orientation tuning, improved bandpass characteristics, and good spatial localization.

4 Claims, 15 Drawing Sheets

OTHER PUBLICATIONS

H. Knutsson and G. H. Granlund. Texture Analysis Using Two-Dimensional Quadrature Filters, IEEE Computer Society Workshop on Computer Architecture for Pattern Analysis and Image Database Management—CAPAIDM, pp. 206–213, 1983.

P. G. Powell and B. E. Bayer. A Method for the Digital Enhancement of Unsharp, Grainy Photographic Images, IEEE Int'l Conf. on Elec. Image Proc., 1982.

R. P. Lippmann. An Introduction to Computing with Neural Nets, IEEE ASSP Magazine, pp. 4–23, Apr. 1987.

S. G. Mallat. A Theory for Multiresolution Signal Decomposition: The Wavelet Representation, IEEE Transactions on Pattern Analysis and Machine Intelligence, vol. II, No. 7, pp. 674–693, Jul. 1989.

J–S. Lee. Digital Image Enhancement and Noise Filtering by Use of Local Statistics, IEEE Transactions on Pattern Analysis and Machine Intelligence, vol. PAMI–2, No. 2, pp. 165–168, Mar. 1980.

D. Clarke and M. Norman. Spyglass Dicer 2.0, Volumetric Data Analysis and Presentation for the Macintosh, National Center for Supercomputing Applications, University of Illinois at Urbana–Champaign, Apr. 30, 1993.

M. Kass and A. Witkin. Analyzing Oriented Patterns, Schlumberger Palo Alto Research, 3340 Hillview Ave., Palo Alto, CA 94394, Readings in Computer Vision: Issues, Problems, Principles and Paradigns, Fischler & Firschein, eds., pp. 268–276, 1985.

E. P. Simoncelli and E. H. Adelson. Subband Transforms, J. W. Woods, Subband Image Coding, Kluwer Academic, 1991.

B. E. Bayer and P. G. Powell. A Method for the Digital Enhancement of Unsharp, Grainy Photographic Images, Advances in Computer Vision and Image Processing, vol. 2, pp. 31–88, Copyright 1986.

J–F Abramatic and L. M. Silverman. Nonlinear Restoration of Noisy Images, IEEE Transacations on Pattern Analysis and Machine Intelligence, vol. PAMI–4, No. 2, Mar. 1982.

H. E. Knutsson, R. Wilson and G. H. Granlund. Anisotropic Nonstationary Image Estimation and Its Applications: Part I—Restoration of Noisy Images, IEEE Transactions on Communications, vol. COM–31, No. 3, Mar. 1983.

P. J. Burt and E. H. Adelson. The Laplacian Pyramid as a Compact Image Code, IEEE Transactions on Communications, vol. COM–31, No. 4, Apr. 1983.

E. H. Adelson, E. Simoncelli and R. Hingorani. Visual Communications and Image Processing II, MIT, Media Lab, Cambridge, MA 02139 and SRI David Sarnoff Research Center, Princeton, NJ 08540, A Reprint from the Proceedings of SPIE—The International Society for Optical Engineering, vol. 845, Oct. 1987.

J. Lubin. Adaptive Coring Techniques or Spatio–Temporal Signals, David Sarnoff Research Center, Princeton, NJ 08543–5300, 1991.

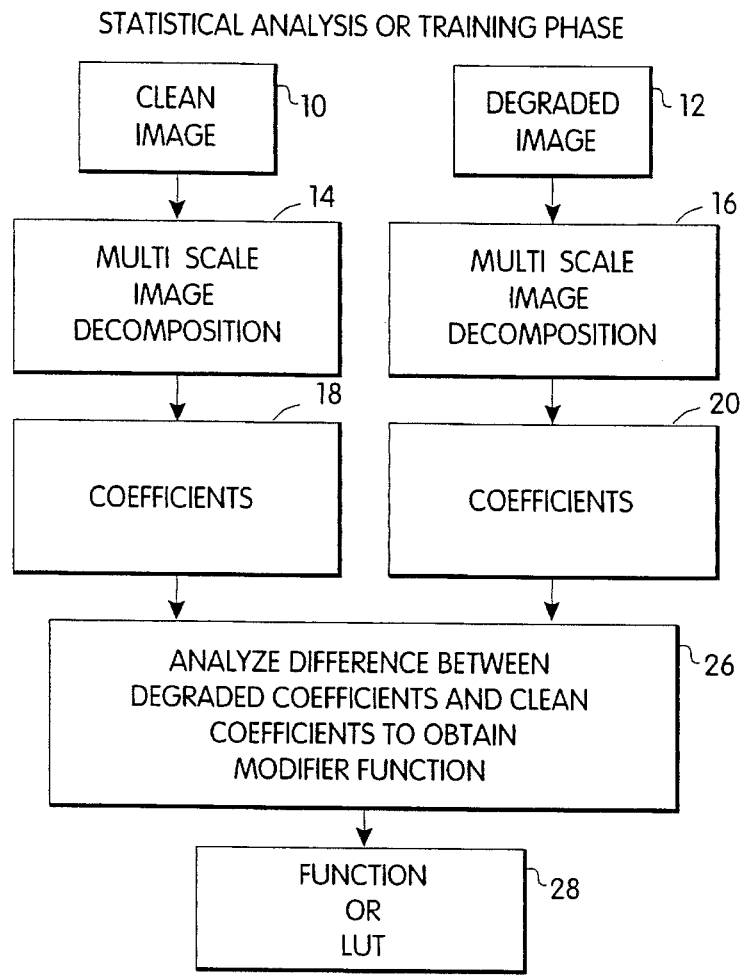
Fig. 1A
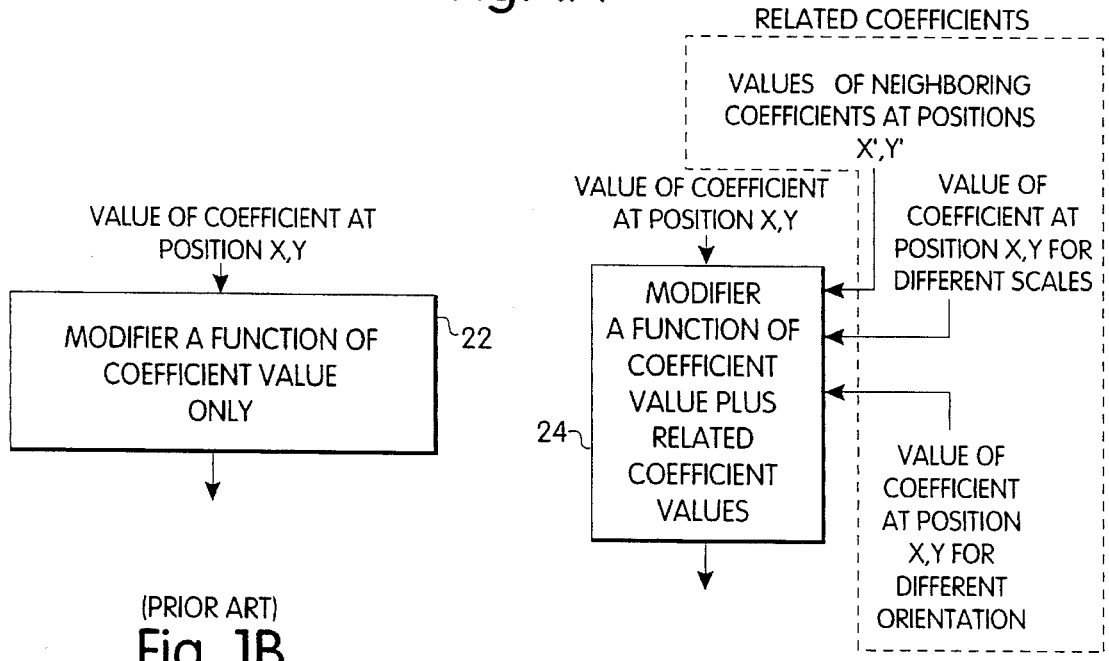
(PRIOR ART)
Fig. 1B
Fig. 1C $S_1$ = HIGHEST BANDPASS FREQUENCY
$S_2$ = MID BANDPASS FREQUENCY
$S_3$ = LOW BANDPASS FREQUENCY

BANDPASS CHARACTERISTICS FOR FILTERS
(SCALES $S_1$, $S_2$ AND $S_3$)

5,526,446

NOISE REDUCTION SYSTEM

This invention was made with government support under contract Number F30602-89-C-0002 awarded by the Defense Advanced Research Projects Agency. The government has certain rights in the invention.

FIELD OF THE INVENTION

This invention relates to image enhancement and more particularly to an image enhancement system in which spatially-localized phenomena in coefficients derived from the image by convolution are utilized to better enhance the image.

BACKGROUND OF THE INVENTION

It will be appreciated that photographic images or those which are recorded on electronic media are plagued with noise and other degradations including blur. For many different applications, one wants to remove the noise and enhance the image so as to bring out features of the image while at the same time suppressing noise and other artifacts that in general degrade the image. With respect to television or a photograph, these images are usually degraded in some way meaning that they are blurry due to objects which are not in focus or which are moving or due to the inherent resolution limits of the television signal itself; and are noisy in the fact that either the film grain is a pronounced problem or electronic noise degrades the image. The problem is particularly severe in format conversion from low resolution standard TV format NTSC up to high resolution HDTV television.

The problem is that given the image data which is received, one wishes to obtain the best possible picture which, in some instances means that the picture is to be sharpened, that noise is to be eliminated, or that the images are to be actually synthesized in another form that result in a higher resolution than the image from which the enhanced image is formed.

In the past classical methods for image enhancement include the so-called Wiener filtering technique which is an entirely spectral method that involves taking a Fourier transform of an image and generating a linear filter function to modify the Fourier transform coefficients by either increasing them or decreasing them at every frequency. This is a so-called "global" approach to enhancement.

This classical method does not provide sufficiently enhanced results in most cases because it assumes that image statistics are stationary, meaning that every patch of the image is generated by the same random process as is every other patch of the image. However, image structure does not derive from a stationary process. That is, if one were to look at random noise on a screen, one could conclude that this is generated by a stationary process. However, if one were to look at another region of the image where an edge might exist, and another region in which there might be a blank or absence of signal, and in another region where there might be a line, the underlying process can be seen to change from patch-to-patch or even from point-to-point.

More specifically with Wiener filtering, a degraded image is modeled as an uncorrupted image to which noise has been added. One then needs to estimate the power spectrum of the uncorrupted image and of the noise. The Wiener filter then specifies a modulation for each spatial frequency of the image. If the statistics of the image and the noise are stationary, that is constant over the image, then the processed image has the smallest possible square difference for the uncorrupted image of all linear filters. Unfortunately, image statistics are typically non-stationary and conventional Wiener filtering does not work well.

In contradistinction to the global Wiener approach, there are local approaches that include median weighting. For example, a 3×3 neighborhood in an image would require replacing the center pixel in the 3×3 neighborhood with, for instance, the median of the nine pixels. However, such processes also do not work very well.

The reason that such localized approaches do not work very well is that they introduce unpleasant artifacts. One of the reasons for the unpleasant artifacts is that such a system does not take advantage of the local orientation structure of the image. Because image information tends to be locally oriented, meaning that it is made up of lines and edges, the above method does not take into account orientation, much less the multi-scale nature of image information, meaning that true image information can be better distinguished from noise by analyzing the results of spatial filtering in various spatial frequency bands.

Thus, images can be thought of as having information at many scales and/or frequency bands, so that fine details are in the higher frequency band, whereas the coarse details are in the lower frequency band.

While not a direct answer to the problem of including local orientation in the enhancement of an image, previous so-called coring techniques are utilized to remove noise that exists on either side of an edge transition which is a sharp transition from dark to light in the image. One possible way to smooth out this noise is to simply replace each data point with an average percentage of three adjacent pixels so that there is a blurring operation to smooth out the noise. However, by smoothing out the noise, one also smooths out the edge that is desired.

A so-called coring operation such as illustrated in U.S. Pat. No. 4,523,230 involves the subdivision of the original image into a high frequency band and a low frequency band. With respect to the signals in the low frequency band, these are left unprocessed. However, with respect to the signals in the high frequency band, the band generally associated with lines and edges, one sets these signals to zero for any signals which are below a plus and minus threshold. With respect to signals outside the plus and minus threshold, the so-called core, these signals are given full weight, so that the only components which are retained or kept are those components outside the core-like threshold.

Coring of this nature results in an enhanced image in that when the output of the coring means are summed with the lowpass components, the entire image is produced with edges enhanced, and more importantly with the noise to either side of a transition from a dark portion of the image to a light portion of the image being attenuated. This sharpens the edge. Other techniques are utilized to shape the thresholding condition so as to remove artifacts which exist when signals are approximately at a threshold. These artifacts can show up in television signals by apparent flickering along an edge or line.

One problem associated with traditional coring is that it deals only with one dimension. It does not take advantage of the two-dimensional structure of the image. Another problem is that it does not deal with the multi-scale aspect of image information. Splitting the image into a number of bands, more than just a highpass and a lowpass band, is referred to as a multi-scale decomposition in which the image is split into a number of adjacent spatial frequency bands, with processing or modification taking place on the information within these multiple bands or scales.

The bands that are referred to herein are logarithmically-spaced, multi-frequency bands. So-called "pyramid-type" processing allows one to minimize processing time and hardware while at the same time breaking up an image into different scales or frequency bands. In general, it will be appreciated that by subdividing down the original image, the smaller the image size the lower the spatial frequency. Thus, for the highest spatial frequency band, one utilizes the smallest scale representation of the image, with the most samples, whereas for the lowest passband, one utilizes the largest scale, with the least samples.

In U.S. Pat. No. 4,523,230, Carlson et al. describe a technique for coring within a Laplacian pyramid. There are a number of problems with the above-mentioned pyramid scheme. One problem is that the Laplacian pyramid technique has a disadvantage that the analysis filters used for building the pyramid are bandpass filters; but the synthesis filters that are used for reconstruction of the image are lowpass filters. This asymmetry in the mathematics results in broadband changes to the image which are unwanted. For instance, in the context of a transform, the result of convolution of an image with a filter is represented as an x, y array of coefficients. For enhancement, one modifies the value of each coefficient. Then, one reconstructs the image after this coefficient modification through the use of synthesis filters. When different types of filters are used for analysis and synthesis in a Laplacian environment as above, if one changes the coefficient in one of the images of this pyramid, even though this is supposed to represent a certain frequency band, when the image is reconstructed the energy spreads out as error energy which spreads across many bands.

The second problem with such a technique is that there isn't any dependence of the correction factors utilized in the enhancement on any orientational structure.

Assuming that one is looking at an edge, and assuming one wishes to break it out not only into bands corresponding to frequency but also as to orientation, one would like to have filters that would pull out for instance a vertical high frequency band corresponding to vertical detail and a band which would be a medium-frequency diagonal band. However, these types of functions are not obtainable with the conventional Laplacian and Gaussian pyramids. The problem therefore with the prior art pyramids, being Laplacian or Gaussian is that circularly symmetrical bands are all that are achievable with highpass and lowpass filtering. Thus, they have no directional component.

A third problem and one that is a problem with all coring schemes is the problem of how one is to modify the value of a coefficient. The way coring schemes work is that one breaks the signal up into a number of images. These images each contain a set of coefficients. One then modifies the value of each coefficient with a look-up table. This means that the only information one is using to modify that coefficient is the value of the coefficient itself. In short, the coring systems modify the value for the cored sample without any knowledge of any of the surrounding coefficient values.

Another type of image enhancement system is a system developed by Bayer and Powell which is also a coring system. Further it is a multi-band oriented coring system, although they do not use a pyramid-type structure. It is multi-scale and utilizes a unique method for decomposing an image using filter kernels that are in the form of doublets. Each of the kernels is represented by a "1" at one position and a "−1" at another position.

While the Bayer and Powell system results in increased enhancement because it utilizes orientation, one of the major problems with the system is that the filters are not very sharply oriented. They are primitive filters from the standpoint of extracting information about edges and lines.

However, the most constant problem with Bayer and Powell as well as other coring systems is that the system utilizes only the value of the coefficient itself in the derivation of the modification of the particular coefficient.

In summary, Bayer and Powell have extended the aforementioned coring method to include multiple orientation and scales and by Carlson et al. to include pyramids. Powell and Bayer describe using gradient filters to break up the image into oriented components. When gradient operators for eight different orientations are added together, they form a sharpening filter. However, each of the gradient outputs is cored independently before being added together to form the sharpened output. This oriented filtering tends to remove noise while leaving desired oriented structures intact. Powell and Bayer describe performing this operation in a multiplicity of spatial scales by blurring the image and applying the cored-sharpening operation on expanded filters.

Carlson et al. employ related processing, using a pyramid data structure. Carlson et al. propose converting the image to a Laplacian pyramid, coring the individual Laplacian pyramid coefficients and reconstructing an enhanced image from the altered coefficients. Like the Powell and Bayer approach, this removes noise over a variety of spatial scales. It suffers, however, from two major drawbacks. First the image representation is not tuned for orientation and so it does not exploit the characteristic of image structure. Because the Carlson et al. system is not self-inverting, errors of one subband introduced by coring appear as errors in a different subband. This can cause artifacts in the reconstructed image.

In a further attempt to increase enhancement, in a work by H. Knutsson, R. Wilson and G. H. Granlund, IEEE Transactions or Communications, 31(3);388–397, 1983, a spatially adaptive filtering system is presented in which the investigators break the image into three different spatial filter bands. One is the original image unchanged. Another is an isotropically-blurred version of the original image, and the third is an image which is blurred along whatever the local orientation is at each particular point in the image. One can therefore assert that this system is an adaptively filtered image, with the output image being a linear combination of the three images. In this system, one decides what linear combination of the three to take based on the local image structure. If the image is oriented in a particular direction, Knutsson et al. take the spatially-adaptively filtered image if the image is isotropically noisy. Isotropically, if one is at a corner, Knutsson et al. take the original image; and if one is at a flat region, they take the isotropically blurred version.

The problem with this system based on published pictures is that is not multi-scale so that it looks at things only in a particular spatial scale. Secondly, it looks too "painterly" in that it looks as if the image was gone over with a paint brush. So whatever was the original orientation, it filters along that direction so that all the oriented structures are emphasized as with a paintbrush. The problem therefore is that its fidelity with the original image is suspect. It also introduces some interesting artifacts in that when the enhancement level is set too high, the entire image looks unnatural. In summary, Knutsson et al. have augmented adaptive Wiener filter approaches by including orientation analysis. Their proposed image is a linear combination of three images: the original image, a version which is blurred along the direction of the local image orientation, and an isotropically-blurred version. By including the image which is blurred along the local orientation, they are able to remove noise along edges better than previous methods.

With respect to further background, articles relating to image enhancement are as follows:

J. F. Abramatic and L. M. Silverman. Non-linear restoration of noisy images. *IEEE Pat, Anal. Mach, Intell.*, 4(2):141, 1982; E. H. Adelson, E. Simoncelli, and R. Hingorani. Orthogonal pyramid transforms for image coding. In *Proc. SPIE—Vis. Comm. and Image Proc. II*, pages 50–58, Cambridge, Mass., 1987; B. E. Bayer, Image processing method using a collapsed Walsh-Hadamard transform. U.S. Pat. No. 4,549,212, October 1985; B. E. Bayer and P. G. Powell. A method for the digital enhancement of unsharp, grainy photographic images. In T. S. Huang, editor, *Advances in Computer Vision Image Processing*, volume 2, chapter 2. JAI Press Inc., Greenwich, Conn., 1986; P. J. Burt and E. H. Adelson. The Laplacian pyramid as a compact image code. *IEEE Trans. Comm.*, 31(4):532–540, 1983; C. R. Carlson, E. H. Adelson, and C. H. Anderson. System for coring an image-representing signal. U.S. Pat. No. 4,523,230, June 1985; W. T. Freeman and E. H. Adelson. Steerable filters for early vision, image analysis, and wavelet decomposition. In *Proc. 3rd Intl. Conf. Computer Vision*, Osaka, Japan, 1990. IEEE; W. T. Freeman and E. H. Adelson. The design and use of steerable filters for image analysis, enhancement, and multi-scale representation. *IEEE Pat. Anal. Mach. Intell.*, August 1991; R. C. Gonzalez and P. Wintz. *Digital Image Processing*. Addison-Wesley, 1977; M. Kass and A. P. Witkin. Analyzing oriented patterns. In *Proc. Ninth IJCAI*, pages 944–952, Los Angeles, Calif., August 1985; H. Knutsson and G. H. Granlund. Texture analysis using two-dimensional quadrature filters. In *IEEE Computer Society Workshop on Computer Architecture for Pattern Analysis and Image Database Management*, pages 206–213, 1983; H. Knutsson, R. Wilson, and G. H. Granlund. Anisotropic non-stationary image estimation and its applications: Part 1—Restoration of noisy images. *IEEE Trans. Comm.*, 31(3):388–397, 1983; J. S. Lee. Digital image enhancement and noise filtering by use of local statistics. *IEEE Pat. Anal. Mach. Intell.*, 2(2):165, 1980; R. P. Lippmann. An introduction to computing with neural nets. *IEEE ASSP Magazine*, pages 4–22, April 1987; S. G. Mallat. A theory for multi-resolution signal decomposition: the wavelet representation. *IEEE PAT. ANAL. MACH. INTELL.*, 11(47):674–693, 1989; R. H. McMann and A. A. Goldberg. Improved signal processing techniques for color television broadcasting. *J. SMPTE*, 77:221–228, 1969; T. Poggio and F. Girosi. A theory of networks for approximation and learning. Artificial Intelligence Lab. Memo 1140, Massachusetts Institute of Technology, Cambridge, Mass. 02139, 1989; P. G. Powell. Image gradient detectors operating in a partitioned lowpass channel. U.S. Pat. No. 4,446,484, May 1984; P. G. Powell and B. E. Bayer. A method for the digital enhancement of unsharp, grainy photographic images. In *IEE International Conference on Electronic Image Processing*, pages 178–183, 1982. no. 214; E. P. Simoncelli and E. H. Adelson. Subband transforms. In J. W. Woods, editor, *Subband Image Coding*, chapter 4. Kluwer Academic Publishers, Norwell, Mass. 1990; E. P. Simoncelli W. T. Freeman, E. H. Adelson, and D. J. Heeger. Wavelet image transforms with continuous parameterization. Vision and Modeling Technical Report 161, The Media Lab, MIT, 20 Ames St., Cambridge, Mass. 02139, 1991; H. J. Trussell. A fast algorithm for noise smoothing based on a subjective criterion. *IEEE Trans. Systems, Man, Cybern.*, 7(9):678, 1977; J. W. Woods and S. D. O'Neil. Subband coding of images. *IEEE Trans. Acoust., Speech, Signal Proc.*, 34(5):1278–1288, 1986. A further patent relating to truncated subband coding of images is U.S. Pat. No. 4,817,182.

What will be appreciated with the above-mentioned prior systems as that none of the systems provide for modification of coefficients derived through a convolution of the image with a filter in which the modifier is both a function of the coefficient value, as well as related coefficient values.

Related coefficients, as referred to herein, refers to values of neighboring coefficients, those coefficients at positions other than the position of the coefficient to be modified; the value of the coefficient for different scales; or the value of the coefficient for different orientations. What this means is that in the prior art, no local structure of a neighborhood of coefficients was taken into account when the coefficient value was modified for enhancement purposes.

Also none of the prior art teaches the use of self-inverting analysis and synthesis filters in a multi-scale environment. It will be noted that a self-inverting transform is one which utilizes analysis filters followed by synthesis filters in which the synthesis filters are identical to the analysis filters.

As a subsidiary issue, it is important that, the transform and its filters be both steerable and multi-scale, not shown in the prior art. It is also important, at least for signal processing efficiencies, that a pyramid arrangement be utilized which involves the utilization of subsampling. Further, it is also important that these filters be substantially non-aliasing.

It is also desirable in both the analyzing and reconstruction or synthesis filters, that these filters have a relatively small spatial extent. This is to eliminate ringing and to accomplish this, it is necessary that the variations of the filters in frequency be relatively smooth.

SUMMARY OF THE INVENTION

In order to accomplish improved enhancement, a technique is provided to remove noise from images and to enhance their visual appearance through the utilization of a technique which converts an image into a set of coefficients in a multi-scale image decomposition process, followed by modification of each coefficient based on its value and the value of coefficients of related orientation, position, or scale, which is in turn followed by a reconstruction or synthesis process to generate the enhanced image. Also contributing to the improved enhancement is a set of orientation tuned filters of a specialized design to permit steering, with the analysis and synthesis filters also having a self-inverting characteristic. Additionally, steerable pyramid architecture is used for image enhancement for the first time, with the steering being provided by the above orientation tuned filters. The utilization of related coefficients permits coefficient modification with multipliers derived through a statistical or neural-network analysis of coefficients derived through the utilization of clean and degraded images, with the modifiers corresponding to vectors which result in translating the degraded image coefficients into clean image coefficients, in essence by cancelling those portions of a coefficient due to noise. Further improvements include an overlay of classical coring on single coefficients. Thus, the subject technique provides improved image enhancement through the use of a multi-band or scale-oriented analysis and synthesis transform having improved coefficient modification, good orientation tuning, improved bandpass characteristics, and good spatial localization.

More specifically, multi-scale image decomposition utilizing orientation tuned filtering is provided to break up the image in appropriate frequency bands and to permit processing which can take into account local orientation for permitting appropriate modification of the outputs, e.g. coefficients, of each of the analysis filters through the utilization of "related coefficients". A related coefficient is one which is either x, y displaced from the coefficient to be modified; or is of a different scale; or is of a different orientation. Note, the analysis filters each provide a coefficient which is the result of convolution of the original image by the filter.

The output of each modifier is coupled to a synthesis filter, which in a preferred embodiment is identical to the corresponding analysis filter, thereby providing a self-inverting transform were the multiplications provided by the modifiers equal to "1". The result is an enhanced image in which the enhancement modification, in terms of a multiplier, is dependent not only on the coefficient value at a given position x, y, but also on related coefficients in terms of values of neighboring coefficients at positions x' and y'; the value of the coefficient at or near position x, y for a different scale or the value of the coefficient at or near position x, y for a different orientation.

By taking advantage of the use of related coefficients, coefficients may be modified more appropriately, eliminating artifacts, non-linearities, and undesired cartoonish-like effects, while at the same time reducing noise content and sharpening the image.

In order to accomplish the multi-scale decomposition with orientation-tuned filtering, in a preferred embodiment, a steerable pyramid technique is utilized in which the original image is broken down into different scales or spatial frequency bands, with each of the scales or frequency bands being processed through steerable orientation-tuned filters. The pyramid technique involving subsampling reduces processing time and constraints while providing for the multi-scale approach with each subsampling. The same orientation-tuned filters utilized in the analysis filter section, are also utilized as the synthesis filter section, making the analysis filter/synthesis filter transform self-inverting for elimination of artifacts.

In order to derive suitable modification algorithms or look-up tables, in one embodiment, a statistical analysis or training phase is utilized to provide for the appropriate algorithm. The purpose of this statistical analysis or neural-network analysis is to provide an optimal set of thresholds, in one embodiment. In order to accomplish this, a clear image and a degraded image are both multi-scale decomposed, utilizing the self-same type of orientation-tuned filtering used in the processing phase. By analyzing the results of the multi-scale image decomposition from the clear and degraded images, one can derive a function or set of algorithms which when applied to the coefficients corresponding to the degraded image result approximately in coefficients associated with the clear image. These can be in the form of a modifier which when applied to any coefficient map will take out the blurred or degraded image characteristics, usually due to noise or artifacts. The result of the statistical or neural-network analysis provides a so-called blue print which is applicable to the modification of coefficients of the image so that it can be modified for enhancement purposes.

In one embodiment the statistical or neural-network analysis results in two quantities; an anisotropy threshold and a strength or local coefficient energy threshold which is utilized for coefficient modification, the only other input being the coefficient itself. Because anisotropy and local coefficient energy are a measure of image versus noise, the utilization of these two thresholds provide the image enhancement system with a means of analyzing and modifying data on a position-by-position basis so that an appropriate local modification to a coefficient may be applied.

It will be appreciated that as referred to herein, a coefficient refers to the output obtained by convolving the original image with a filtering function so as to provide an image having coefficient values at x, y positions there across.

For example, a multi-scale representation of particular interest for image enhancement is the aforementioned steerable pyramid in which the filters used for this transform are oriented filters of a variety of scales and orientations. Two special features of this transform are that the analysis and reconstruction or synthesis filters are all scaled and rotated versions of the same filter and are all steerable. Another way of defining the fact that the filters are steerable is that the coefficients one would have obtained by using the analysis or synthesis filters rotated to an arbitrary angle can be found simply from a linear combination of the given set of four different orientations of analysis or synthesis filter outputs. This feature makes the steerable pyramid very useful for identifying oriented structures in the image from which noise is differentiated from signal.

In the simplest case, the coefficients of the convolved image are modified by a point function typically stored as a look-up table in which the modified value x' is a function of the original coefficient x. The more complex case is such that $x'=f(a, b, c, \ldots)$ where $a, b, c, \ldots$ are the values of "neighboring" coefficients. They can be neighboring in the spatial sense, or they can also be of neighboring orientations and scales.

As a subset, the transform can be expressed as $a'=f(p(a, b, \ldots), q(a, b, \ldots), \ldots)$. That is, it may be preferable to precompute certain measurements such as local anisotropy, local phase, etc. and use these to control the look-up table.

Having established this general architecture, one then chooses the appropriate modification function which involves three possible approaches: a statistical analysis, a neural network approach, and a threshold-based approach.

With respect to coefficient modification based on image statistics, one can develop a method to alter the transform coefficients based on the statistical properties of the image. Such a method includes an analysis phase, where the statistical properties of various images are studied, and the processing phase where the results of the statistical analysis are used to enhanced images.

In the analysis phase, one artificially degrades an image, by adding noise, and/or blurring it, and/or reducing its spatial resolution. Then one compares transform coefficients of the degraded and undegraded images. It is the purpose of this exercise to predict the transform coefficient of the undegraded image based on the value of the degraded image transform coefficient and on the values of neighboring coefficients of nearby position, orientation, or scale in the degraded image transform. By examining transform coefficients over many positions, scales, and orientations of one or more images, one can collect statistics and calculate an estimator for the corresponding transform coefficients of the undegraded image using standard statistical estimation techniques. This calculation results in a function which is stored in a look-up table or in the connection weights of a neural network. The inputs to the function are the degraded image transform coefficients and possibly some neighboring degraded image transform coefficients. The output is the best estimate of a corresponding transform coefficient of the undegraded image.

In the processing phase a look-up table (LUT) is used to apply the desired modification to estimate the undegraded image transform coefficient from each coefficient of the degraded image transform and its neighboring coefficients. Inverse transforming the modified coefficients then produces the enhanced image.

As an example, considering the coefficients corresponding to the vertically-oriented and the horizontally-oriented filters of a steerable pyramid image representation of the degraded image. At each scale and position, the coefficient values for the vertical and horizontal filters can be plotted on a two-dimensional graph. At the same scale and position, the coefficient values of the vertical and horizontal filters for the undegraded image will in general have a different but related pair of values. The average position of all undegraded image transform pairs which map to a particular degraded image transform pair can be used to determine the enhanced image transfer coefficient. This is the map or maximum aposteriori estimator. One can also use other standard statistical estimation techniques.

It will be appreciated that it is important to know how all possible pairs or groups of coefficients ought to be altered to enhance the image. This is done by collecting modification data over different parts of the image and over different images. One then averages over repeated values at a given ordered pair (n-tuple) of coefficients, and interpolates over regions in which no ordered pairs or groups of coefficients were observed. The result is a two dimensional (n-dimensional) look-up table indicating, for each pair (n-tuple) of noisy coefficients, the desired vertical or horizontal coefficient value. Note, that a given coefficient may have different modifications indicated for it by different look-up tables. In this case, the average modification can be taken, or the median, or one based on the observed variance at each of the look-up tables.

Many possible groups of coefficients may be used to develop a look-up table for modifying the image coefficients. Possible groups include groups of steered coefficients in which the steered pyramid allows an arbitrary rotation of the coordinate system at any point. It is useful to rotate or steer the analysis and synthesis filters such that one filter is oriented along the dominant orientation at each position. The dominant orientation can be found in a variety of well-known ways. In general at a single position each scale will have a different dominant orientation.

Another group is the group of coefficients in different spatial locations in which steered coefficients are paired with local averages of those coefficients, blurred along the dominant orientation. The average, along the dominant orientation of a filter of coefficients is a good estimator of filter coefficient.

As a third group, there are groups of unsteered coefficients; and finally there are coefficients at different scales.

It will be appreciated that it is desirable to add in the residual lowpass information which one is not able to manipulate with the subject technique and for this purpose, a lowpass channel is provided. Even further enhancement can be provided, for instance, by highpass filtering of the image signal followed by conventional coring techniques. In this overlay of coring, the output of the coring process is added in reconstruction. Also unmodified or lowpass filter components, those below the lowest bandpass filter frequency of the multi-scale decomposition technique may be utilized to fill-in those low frequency components.

Another method of obtaining coefficient modification is that based on a neural network theory. The goal of the look-up table system described above is to approximate a multi-dimensional function which is described through a sampling of examples. This operation can also be carried out by a so-called neural network approach. As in the statistical method described above, there is an analysis phase and a processing phase. In the analysis phase, instead of gathering statistical information to store in a look-up table, one uses the examples to train a neural network. Many examples are presented to the network of degraded image transform coefficients and neighboring degraded image coefficient values. Also presented is the desired output for the network for that particular input: the value of the undegraded image transform coefficient. Instead of being stored as entries in the look-up table, this modification information is stored as parameters of the neural network determined by training the network.

In the processing phase, one feeds a neighborhood of transform coefficients into the trained neural net set. The output of the neural network is a modified value of the central transform coefficient of the neighborhood, with the neighborhood of the transform coefficient being a set of coefficients of related position, orientation, or scale. The neural network approach requires less storage space than the look-up table approach described above.

Finally, coefficient modification can be based on thresholds or other heuristic methods. It will be appreciated that one can assign to each coefficient a probability of it representing true image data, instead of noise, based on its value and the value of related coefficients. Then each coefficient is attenuated by an amount dependent on that probability, with some coefficients not attenuated at all.

One way to assign such a probability is as follows: images are distinguished from noise based on two indicators. The first is the energy of each subband coefficient, e.g. the energy associated with a coefficient of a given scale. This assumes that low energy signals are more likely to be noise. Secondly, a local measure of anisotropy is utilized, it being assumed that isotropic signals are more likely to be noise.

From the above two indicators, one derives the following measures of energy and anisotropy. First, energy is measured through the square and the spatial blurring of the coefficients in a particular subband. Secondly, anisotropy is measured by calculating the variance of energy over some number of orientations and dividing by twice the square of the mean energy over that same number of orientations. For a steerable pyramid, with coefficients at four different orientations, the energy is analyzed over four different orientations, with the energy, related to the square of the coefficients, having a higher angular resolution than the coefficients themselves.

For coefficients at each orientation, position, and scale one derives three numbers corresponding to the energy, anisotropy, and rank. Note that in the calculation of these numbers, one examines the values of coefficients corresponding to different orientations. Note also that while the steerable pyramid may normally have coefficients at only four orientations, one finds the energy, anisotropy, and rank for coefficients at seven orientations, and reconstructs based on modified coefficients at the four different orientations.

Based on the two numbers, one computes the likelihood that a coefficient represents true image data. In one method to accomplish this, one makes a function different for each pyramid level which maps energy and anisotropy values into the range zero (least likely to be true image information), to one (most likely to be image information). Then, the two numbers are multiplied together to arrive at a final estimate for the likelihood that this coefficient represents image information.

One function which can map energy and anisotropy values into the range 0 to 1 is the following "fuzzy threshold" function, f:

$$f(x) = \frac{1}{(1 + \exp(-s(x - t)))} \quad (1)$$

where t is a threshold value and s is a parameter that determines the sharpness of that threshold.

Some representative values to use in the above function to modify the image representation coefficients: A sharpness parameter of 15 works well for orientation and 0.5 works well for energy. At pyramid level 0, set t=40 for energy, and t=0.57 for anisotropy. At pyramid level 1, set t=−inf for anisotropy for all ranks and for the energy, set t=3.0. At pyramid level 2, set t=−inf for anisotropy and for the energy, set t=2.5.

BRIEF DESCRIPTION OF THE DRAWINGS

These and other features of the subject invention will be better understood taken in conjunction with the Detailed Description and the Drawings of which:

FIG. 1A is a block diagram of the statistical analysis or training phase of the subject invention, operating on clean and degraded images, in which a function or look-up table is derived by analyzing the difference between degraded coefficients and clean coefficients to obtain the modifier function;

FIG. 1B is a block diagram of a prior art system indicating that the modifier is a function of coefficient value only;

FIG. 1C is a block diagram illustrating that in the subject system the modifier is not only a function of the coefficient value but is also a function of related coefficient values;

DETAILED DESCRIPTION

Figure 1D:
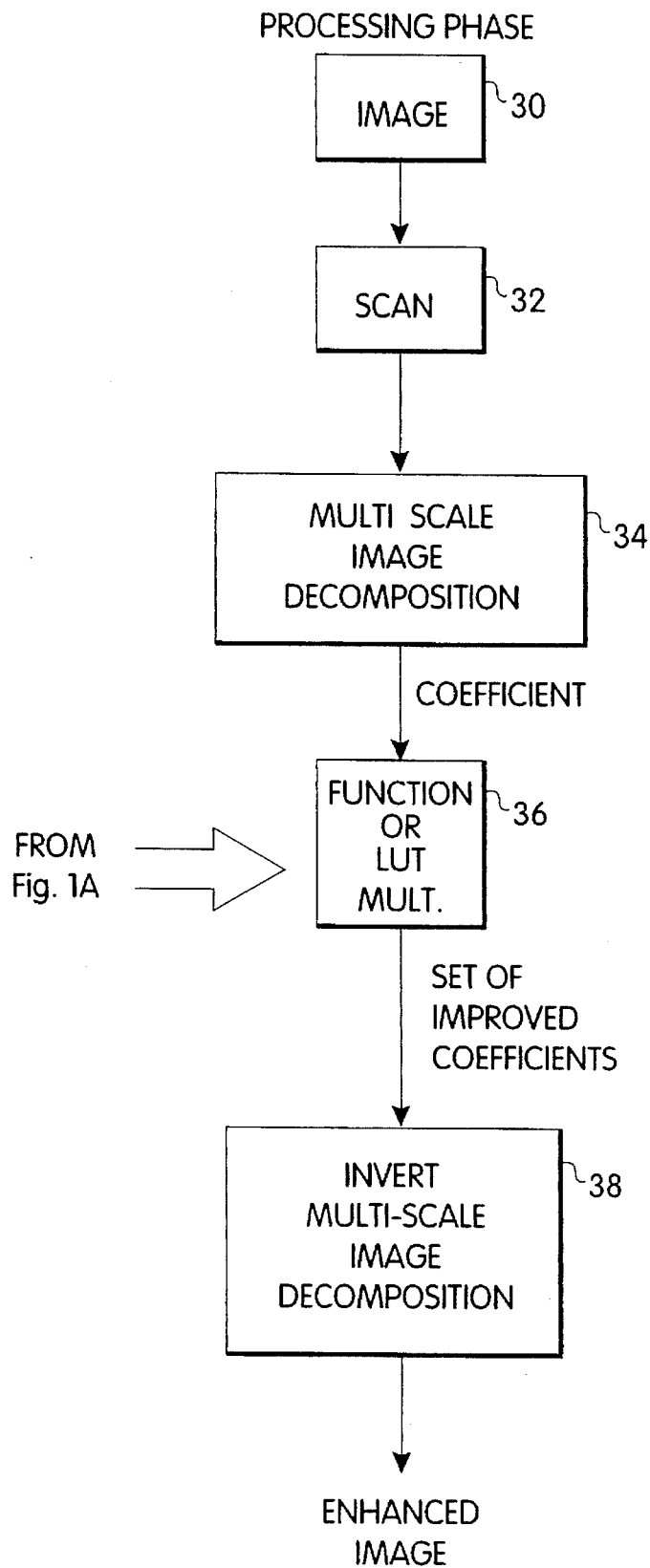
FIG. 1D is a block diagram of the processing phase of the subject invention illustrating that the image is scanned, is subjected to a multi-scale image decomposition which results in coefficients that are modified by multiplication of a coefficient value with a value determined by a modification function look-up table, with a set of improved coefficients being provided to an inverted multi-scale decomposition unit to provide an enhanced image.

In one of its major aspects, the subject invention involves the derivation of a modifier which when applied to a coefficient of a multi-scale decomposition of an image results in enhanced noise rejection and thus an enhanced reconstructed image.

In the subject system and referring now to FIG. 1A, the clean image and the degraded image, here shown by reference characters 10 and 12, are subjected to multi-scale image decomposition, respectively 14 and 16, so as to be able to derive coefficients 18 and 20 which are the result of convolving the image with a filtering system in which the filtering system provides filtering both with respect to orientation and with respect to scale. In the subject system, scale refers to the dominant spatial frequency of the filter by which the original image is convolved. Direction, D, refers to the convolution of the original image with directional filters of orientation $D_x$, such that the original images can be filtered selectively with respect to scale, with respect to direction, or both.

It is the purpose of the multi-scale, multi-directional image decomposition to provide information as to parameters or qualities of the original image which are not derivable by mere analysis of a coefficient of the original image.

As illustrated in FIG. 1B, a prior art method of derivation of a modifier function included only an indication of the value of a coefficient at a position x, y corresponding to the x, y position of a point in the original image. While enhancement can be achieved through the utilization of only the value of a coefficient, as illustrated at 22, this does not take into account the coefficients at points surrounding it.

Referring now to FIG. 1C, the modifiers discussed above can be improved as illustrated at 24 by providing that the modifier be a function not only of the coefficient at a position x, y but also that the modifier be a function of related coefficients which provide new dimensions or parameters for the specification of a modifier. Thus as illustrated, related coefficients can be of a number of different types. For instance, values of neighboring coefficients at positions x', y' are useful in determining if the local patch or image has lines or edges such that the probability of a point on a coefficient can be designated as being a true image point as opposed to noise.

Further, the value of a coefficient at position x, y for different scales often offers information as to whether or not the image at that position is a true image or corresponds to noise.

A third type of related coefficient is one in which the value of the coefficient at position x, y is taken for different orientations. This also specifies a localized condition which is useful in deciding what type of modifier or modifier function should be applied.

Referring back to FIG. 1A, assuming that the multi-scale decomposition includes derivation of not only coefficients but related coefficients, then the block illustrated at 26 is exceptionally effective when the difference between degraded coefficients and clean coefficients is analyzed, where the analysis may either be a statistical analysis, a neural-network analysis, or a heuristic analysis. That result is a maximally efficient modifier for differentiating between noise and image which is specified in the subject case not solely on the value of a coefficient at a position x, y but also on related coefficients as defined above.

The enhancement achievable through such a statistical analysis or training phase of the subject system is realized, as can be seen with reference to FIG. 1D, through the processing of an image 30 via scanning of it as illustrated at 32 into a multi-scale image decomposition unit 34, the coefficients of which are multiplied by a function or a value in a look-up table 36, with the function or look-up table value derived from the analysis of FIG. 1A as described at block 28 thereof.

The result of modifying coefficients with an improved function or look-up table value results in a set of improved coefficients over that which has previously been obtainable. This set of improved coefficients is utilized in an image synthesis or reconstruction system which, as illustrated in block 38, is one involving an inverted multi-scale image decomposition such that an enhanced image is produced.

Figure 1E:
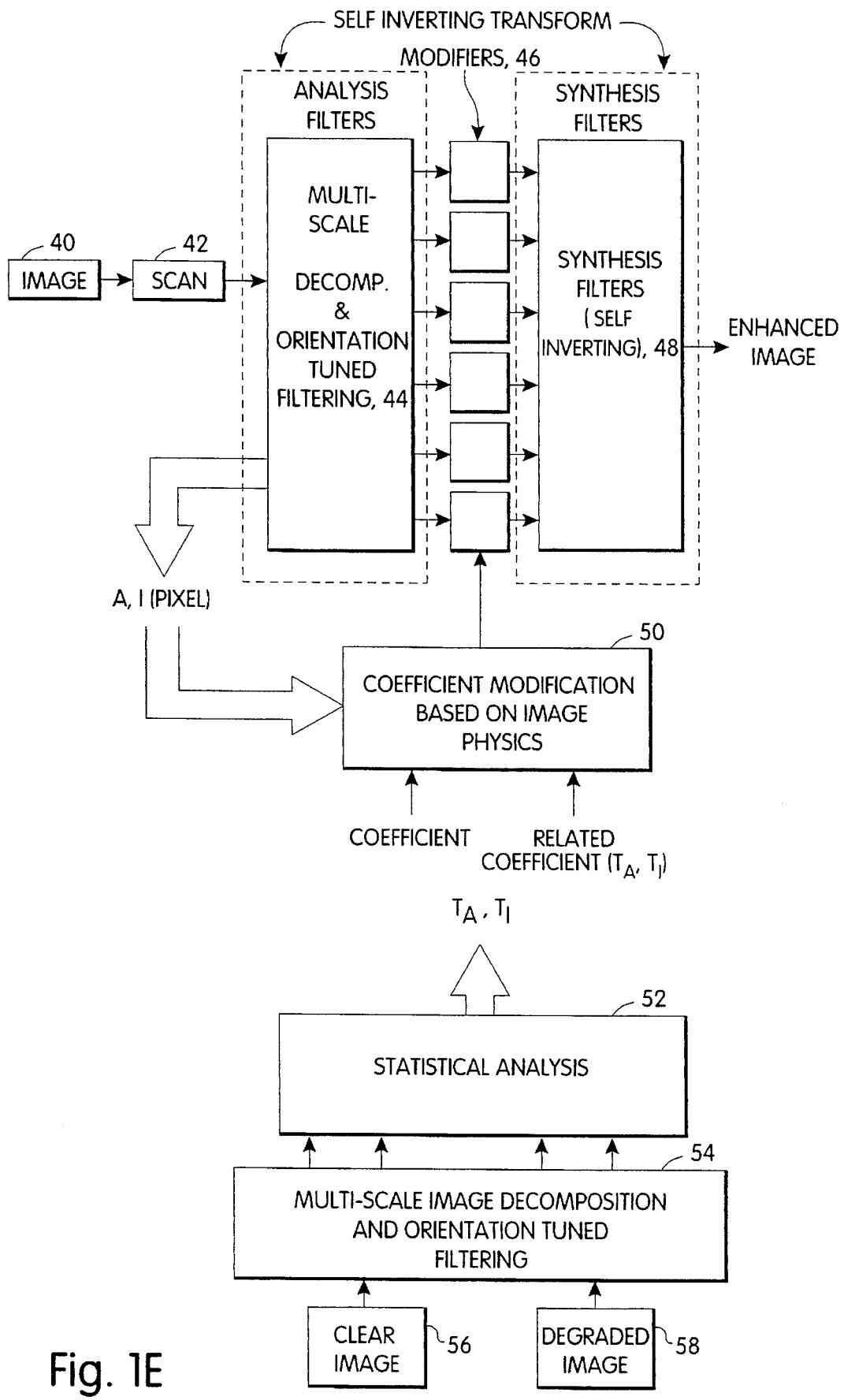
FIG. 1E is a more detailed block diagram of the system of FIGS. 1A and 1D illustrating the utilization of a self-inverting transform involving identical analysis and synthesis filters, with the analysis filters providing both multi-scale decomposition and orientation-tuned filtering, and with coefficient modification based on image physics including both coefficient values and related coefficient values, with the related coefficient values being derived through statistical analysis of a multi-scale image decomposition of a clear image and a degraded image.

While there are many methods of obtaining multi-dimensionally derived modifiers, referring to FIG. 1E and assuming that an image 40 is scanned at 42 into a multi-scale decomposition and orientation tuned filtering unit 44 comprising differently scaled analysis filters, and assuming that each of the outputs of these filters is modified through multiplication at units generally indicated by reference character 46; and further assuming that the outputs of modifiers 46 are recombined through synthesis filters 48, then an enhanced image can be produced without artifacts or unnatural representations of the original image.

As illustrated in block 50, coefficient modification is based on image properties in which the coefficient value at a given x, y position is utilized along with the aforementioned related coefficients. In a preferred embodiment, the related coefficients have to do with anisotropy and the local coefficient energy within the filtered image being processed. In a preferred embodiment, coefficient is in modification terms of thresholds $T_A$, and $T_I$ which are derived through the aforementioned statistical analysis here illustrated at block 52. This involves an analysis of the coefficients derived from multi-scale image decomposition and orientation-tuned filtering described in block 54 which mimics that of the multi-scale decomposition and orientation tuned filtering of block 44. As before, a clear image 56 and degraded image 58 are used in the derivation of the thresholds $T_A$ and $T_I$.

It will be appreciated that the outputs of each set of filters, each having a different scale, can be processed to provide localized anisotropy and energy strength. The anisotropy and the energy strength for a coefficient at a given point are compared respectively to thresholds $T_A$ and $T_I$, derived through statistical analysis, and a multiplication factor or modification factor is determined by which the output of the filter is multiplied for purposes of correction. It is the purpose of the multiplier to enhance coefficients corresponding valid image information, while deemphasizing or deenhancing coefficients corresponding to noise.

Figure 1F:
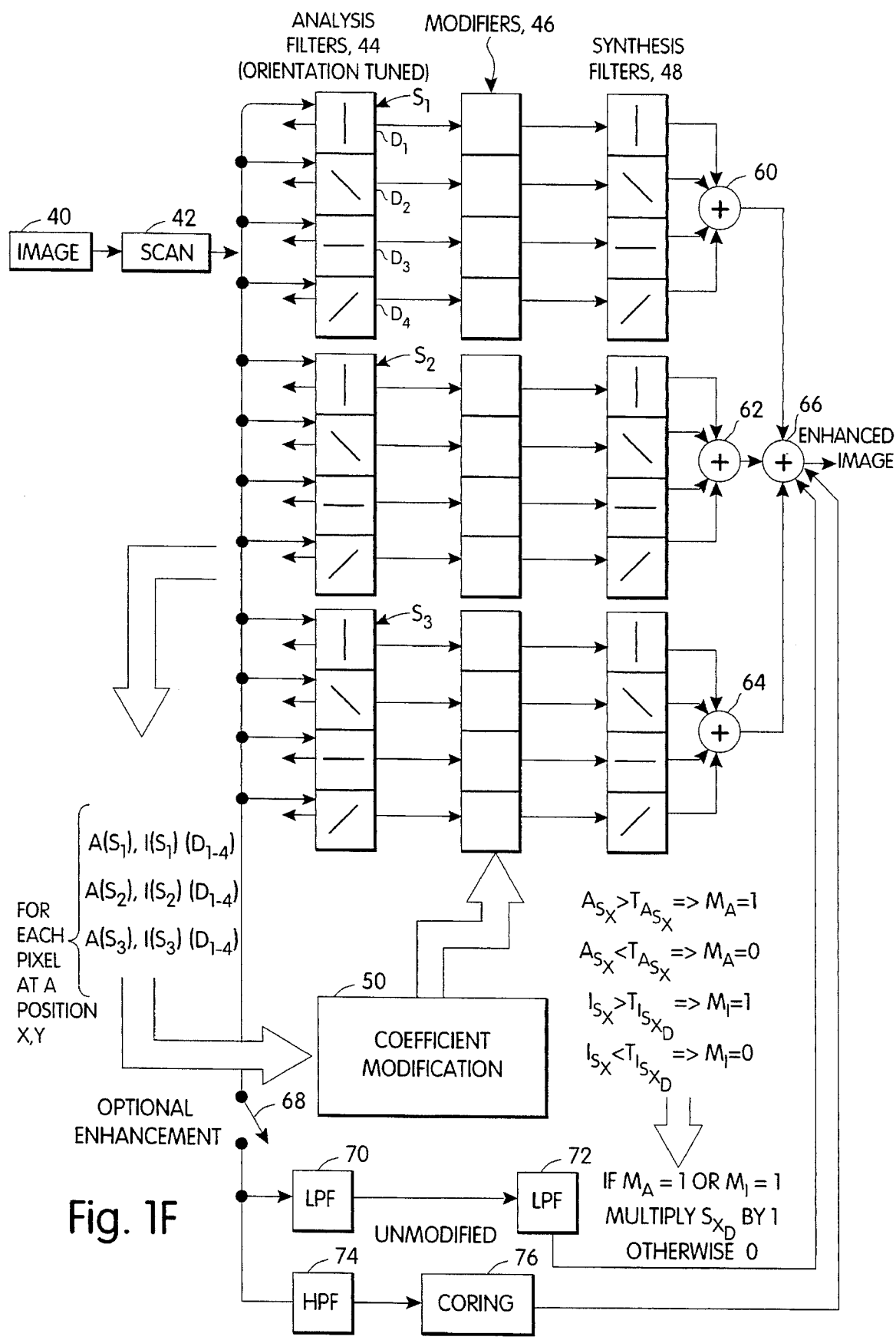
FIG. 1F is an expanded block diagram of a portion of the system of FIG. 1E illustrating the multi-scale decomposition method, orientation-tuned filtering, and an algorithm utilized to provide the coefficient modification required for the outputs of each of the orientation-tuned filters, the outputs of which are inputted to synthesis filters which are identical to the analysis filters, thereby providing a self-inverting transform, the output of which is the enhanced image required.
Figure 1G:
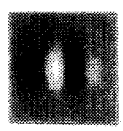
FIGS. 1G, 1H, 1I, and 1J are respectively representations of the orientation-tuned filters for use with each of the three illustrated scales for the system illustrated in FIG. 1F.
Figure 1K:
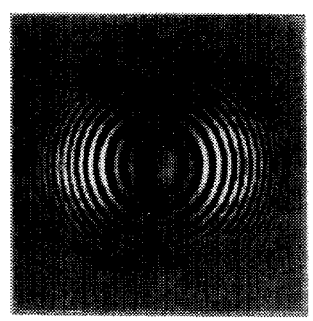
FIGS. 1K, 1L, 1M, and 1N are graphic realizations of the coefficients derived through the convolution of the original image with the orientation-tuned filters associated with scale $S_1$ where the original image is a zone plate.
Figure 1O:
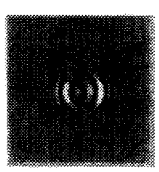
FIGS. 1O, 1P, 1Q, and 1R are graphic realizations of the convolution of the original image with the orientation-tuned filters associated with scale $S_2$.
Figure 1S:
FIGS. 1S, 1T, 1U and 1V are graphic realizations of the convolution of the original image with orientation-tuned filters associated with scale $S_3$.
Figure 1H:
Figure 1L:
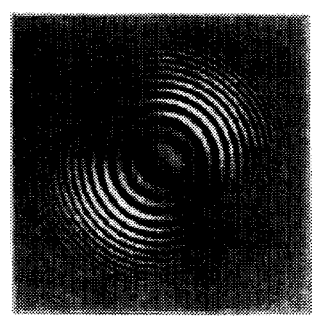
Figure 1P:
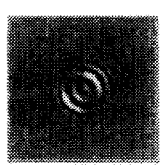
Figure 1T:
Figure 1I:
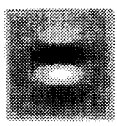
Figure 1M:
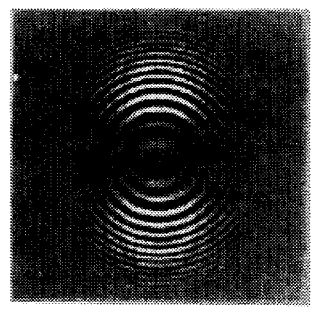
Figure 1Q:
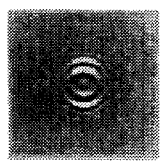
Figure 1U:
Figure 1J:
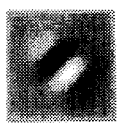
Figure 1N:
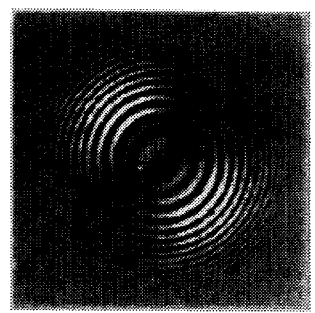
Figure 1R:
Figure 1V:

How this is accomplished in one embodiment is illustrated in FIG. 1F in which the scanned image is applied to the inputs of a series of orientation tuned filters, having orientations $D_1$, $D_2$, $D_3$ and $D_4$. Each bank of four orientation tuned filters has a scale characteristic, with the smallest scale being designated by $S_1$ and the largest scale being designated by $S_3$.

What this provides is a processing or convolution of the original image with an orientation tuned filter set which also has a scale or spatial frequency band characteristic. Thus, the original image can be analyzed both with respect to spatial frequency bands and with respect to orientation.

It is possible from the outputs of each of the filters to provide a matrix of values, one each for each point of a coefficient in which the matrix as illustrated, includes an anisotropy term for each of the scales which is applicable for all of the directions; and an intensity or energy term, one for each of the scales and one each for each of the directions of the filters within a scale.

Having derived these values for each pixel at a position x, y, coefficient modification as accomplished at 50 can be provided by the following:

Assuming $A_{Sx}$ is greater than $T_{ASx}$ then the modifier for anisotropy, $M_A$ is equal to 1; if not then $M_A$ is equal to 0. Likewise, $I_{Sx}$ being greater than $T_{ISxD}$ results in a modifier, $M_I$ equal to 1; otherwise not.

Having derived quantities $M_A$ and $M_I$, then if $M_A$ equals 1 or $M_I$ equals 1, then 1 is to multiply the output of $S_{xD}$ by one; otherwise by 0.

This simplified 1, 0 multiplier system in effect distinguishes whether a coefficient at x, y is representative of either a true image signal or noise. If it is determined to be representative of a true image signal, the coefficient at this point is multiplied by "1" and if it is determined to be a noise signal, the coefficient is multiplied by zero, thereby eliminating it from the enhanced image.

The outputs of each of the modifiers 46 is provided to the input of corresponding synthesis filters 48 which are duplicates of the orientation tuned filters utilized as analysis filters 44. The outputs of synthesis filters 48 are summed respectively at summing junctions 60, 62, and 64 for reconstruction in the three bands corresponding to $S_1$, $S_2$ and $S_3$. The outputs of summing junctions 60, 62, and 64 are in turn summed at a further summing junction 66 to provide the aforementioned enhanced image.

For optional increased enhancement as illustrated by switch 68, lowpass filters 70 and 72 may be utilized to provide unmodified lowpass components. Further, a highpass filter 74 may be utilized with conventional coring 76 to provide for the enhancement commonly associated with the unidimensional coring of the prior art.

Figure 2B:
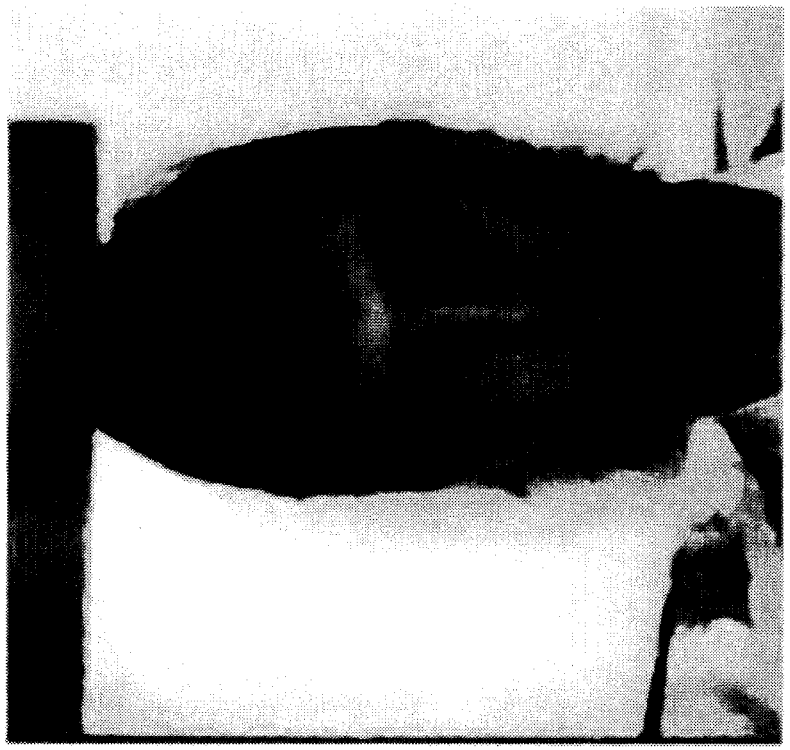
FIGS. 2A and 2B are respectively the unenhanced image produced by the system of FIG. 1A and the enhanced image, illustrating enhancement of edges, lines and other visually significant portions of the image while suppressing noise.
Figure 2A:
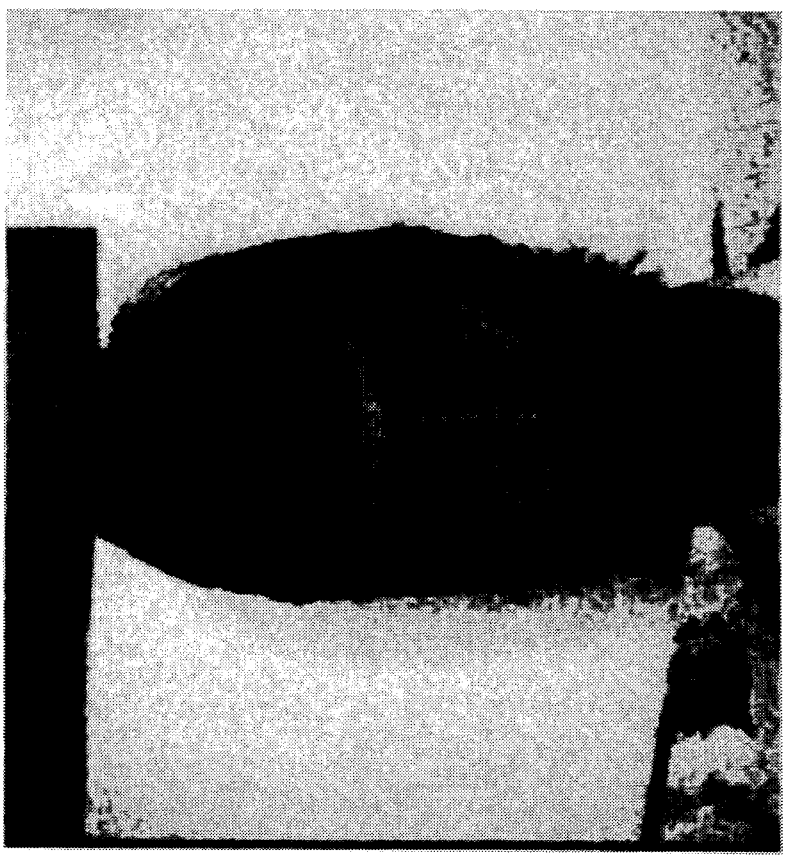

The result of the enhancement can be seen in FIGS. 2A and 2B in which the unenhanced image of FIG. 2A contains a significant amount of noise and blurring whereas with respect to the image of FIG. 2B all lines and edges are enhanced in a pleasing unpainterly manner. It can be seen that the hairs at the base of the individuals head are indeed enhanced in the enhanced image representation and are not cancelled out as would be the case in some prior art techniques.

Referring now to FIGS. 1G–1J, what is represented here are a series of digitally-implemented orientation tuned filters in the four directions illustrated. These filters are digital filters and the representation shown here are the coefficients of an image processed by these filters in which the image is originally an isotropic zone plate. In short, these figures show the directional transfer function of the filter.

Figure 1W:
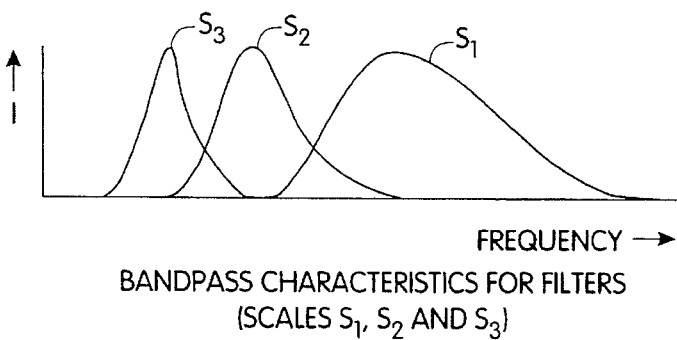
FIG. 1W is a graph of the spatial frequency versus intensity bandpass characteristic for the filters having scales $S_1$, $S_2$, and $S_3$, indicating the multi-scale decomposition bandpass ranges for the system illustrated in FIG. 1F.

Referring to FIGS. 1K–1N, these are the results, e.g. coefficients, of the convolving of the aforementioned isotropic zone plate image by the orientation-tuned filters of FIGS. 1G–1J for the smallest of the scales, $S_1$, which corresponds to the highest passband frequency illustrated in FIG. 1W.

The coefficients of FIGS. 1O–1R are for scale $S_2$ and the coefficients of FIGS. 1S–1V are coefficients for scale $S_3$.

This system thus provides information for both the setting of the modifiers and for the processing of the convolved original image in at least three passbands for increased enhancement purposes.

Figure 3:
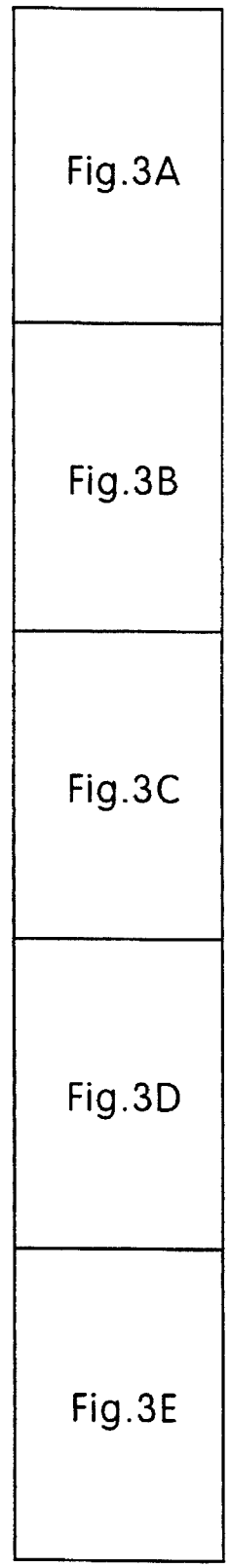
FIG. 3 is a diagram illustrating the flow of FIGS. 3A, 3B, 3C, 3D, and 3E.

Referring now to FIG. 3, in terms of the analysis phase for deriving related coefficients, in this example the related coefficients are in terms of thresholds relating to anisotropy and coefficient strength.

The analysis is based on the aforementioned technique of utilizing a noisy image and a clean image and deriving factors which will convert a noisy image to a clean image through the multiplication of the value of a coefficient at a given location with an appropriate number, with the coefficient being derived as the convolution of an image with a digital filtering system which convolutes the image both in terms of directionality and scale.

Figure 3A:
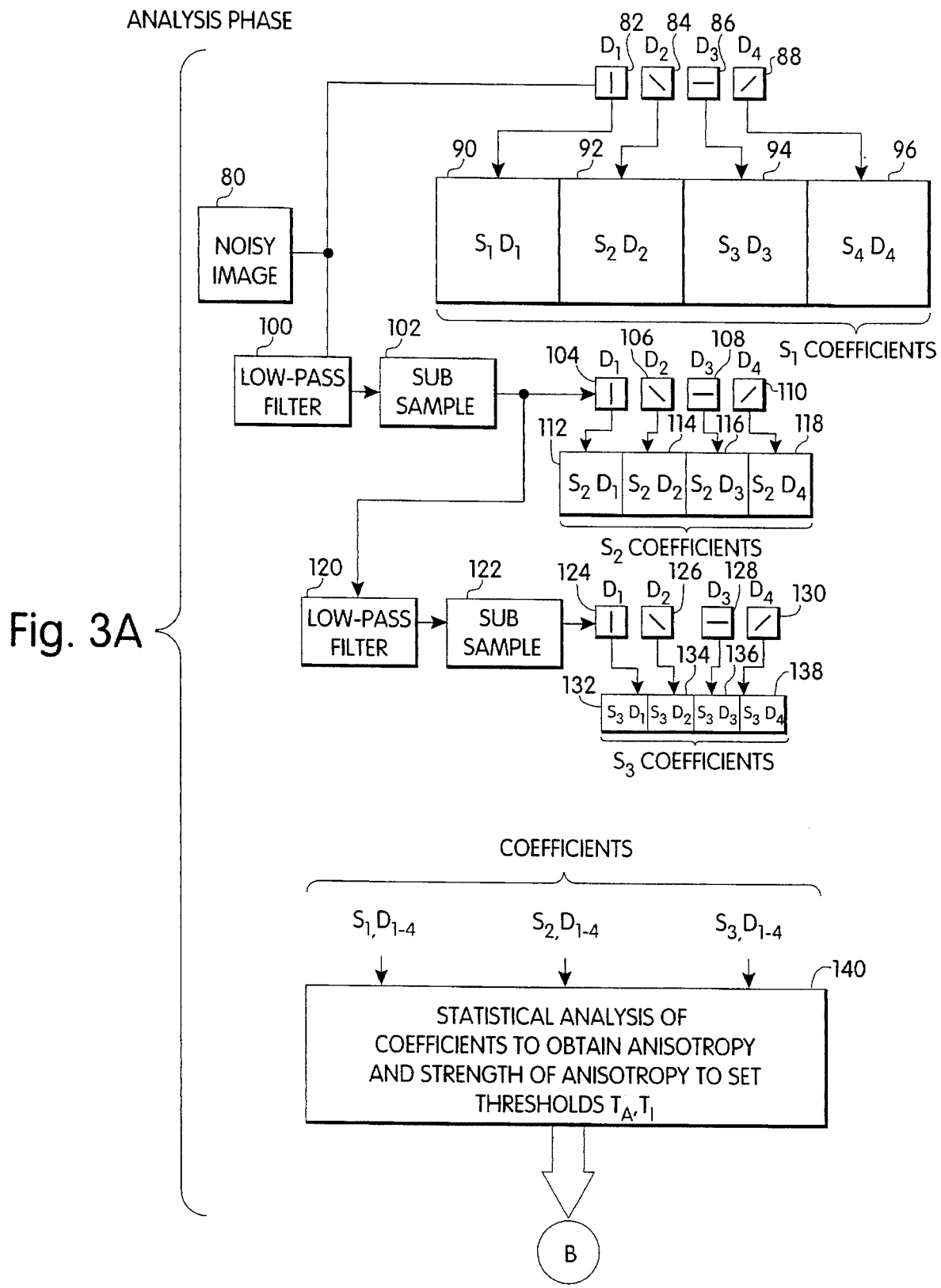
FIG. 3A is a block diagram illustrating the analysis phase of one embodiment of the FIG. 1E system, illustrating the derivation of coefficients $S_1$, $D_{1-4}$; $S_2$, $D_{1-4}$; and $S_3$, $D_{1-4}$ so as to permit a statistical analysis for the derivation of thresholds $T_A$, $T_I$.

What is described in connection with FIG. 3A is a system utilizing a pyramid-type image decompostion technique in which a noisy image 80 is convolved by directional filters 82, 84, 86, and 88 to produce coefficients 90, 92, 94, and 96 respectively. It will be appreciated that in this convolution process, the resulting coefficients are of a first scale $S_1$ which in general corresponds to the highest frequency band for the analysis.

How orientation-tuned filters 82, 84, 86, and 88 are made is described in MIT Media Laboratory, Vision and Modeling Report #161 revised July, 1991. Note the characteristics of these filters are described in the earlier-mentioned paper by William T. Freeman and Edward H. Adelson entitled Steerable filters for early vision, image analysis, and wavelet decomposition. IEEE 3rd Intl. Conf. Computer Vision, Osaka, Japan, December, 1990. In this paper, four bandpass filters are described which are utilized at each level of a pyramid to form a steerable basis set. The pyramid filters are oriented at 0 degrees, 45 degrees, 90 degrees, and 135 degrees. However, the coefficients for any filter orientation can be found from a linear combination of the four filter outputs. As also described in this paper when the filters are applied again at each scale or level, the pyramid collapses back to a filtered version of the original image with near-perfect agreement. Thus, the steerable pyramid image transform provided by these filters allows control over orientation analysis over all scales.

As also described in this paper, the pyramid is a complete representation in that it allows for reconstruction of the original image. It is also self-inverting, meaning that the filters used to build the pyramid are the same filters used for reconstruction.

Note, that the term "steerable filter" is used to describe a class of filters in which a filter of arbitrary orientation is synthesized as a linear combination of a set of "basis" filters, rather than providing as many versions of the same filter each different from the other by some small rotational angle, a more efficient approach to steerability is to apply a few filters corresponding to a few angles and interpolating between the responses. One then needs to know how many filters are required and how to properly interpolate between the responses. With the correct filter set and the correct interpolation rate, it is possible to determine the response of a filter of arbitrary orientation without explicitly applying that filter.

This technique is utilized in the subject case for image enhancement purposes in combination with the pyramid structure shown in FIG. 3A, utilized to provide coefficients convolved not only with respect to directionality but also with respect to scale.

In order to generate the convolution at a scale other than scale $S_1$, a lowpass filter 100 is utilized between the noisy image and a subsampling unit 102 which chooses or samples every other pixel, the output of which is applied to a similar set of orientation-tuned filters 104, 106, 108, and 110. The outputs of these filters are the coefficients at scale $S_2$ as illustrated at 112, 114, 116, and 118. It will be appreciated that the size of the output image is one half that of the unsubsampled image.

This provides processing at a mid-spatial frequency band, with the lowest spatial frequency band processing being provided by a further lowpass filter 120 coupled to the output of subsampling unit 102, with its output coupled to a further subsampling unit 122.

Again the output of the subsampling unit is applied to orientation-tuned filters 124, 126, 128, and 130, the outputs of which are coefficients 132, 134, 136, and 138 at scale $S_3$.

Having derived sets of coefficients at each of three scales, the results are applied to a statistical analysis block 140, the object of which is to ascertain how to set thresholds $T_A$ and $T_I$ for the particular image involved.

Figure 3B:
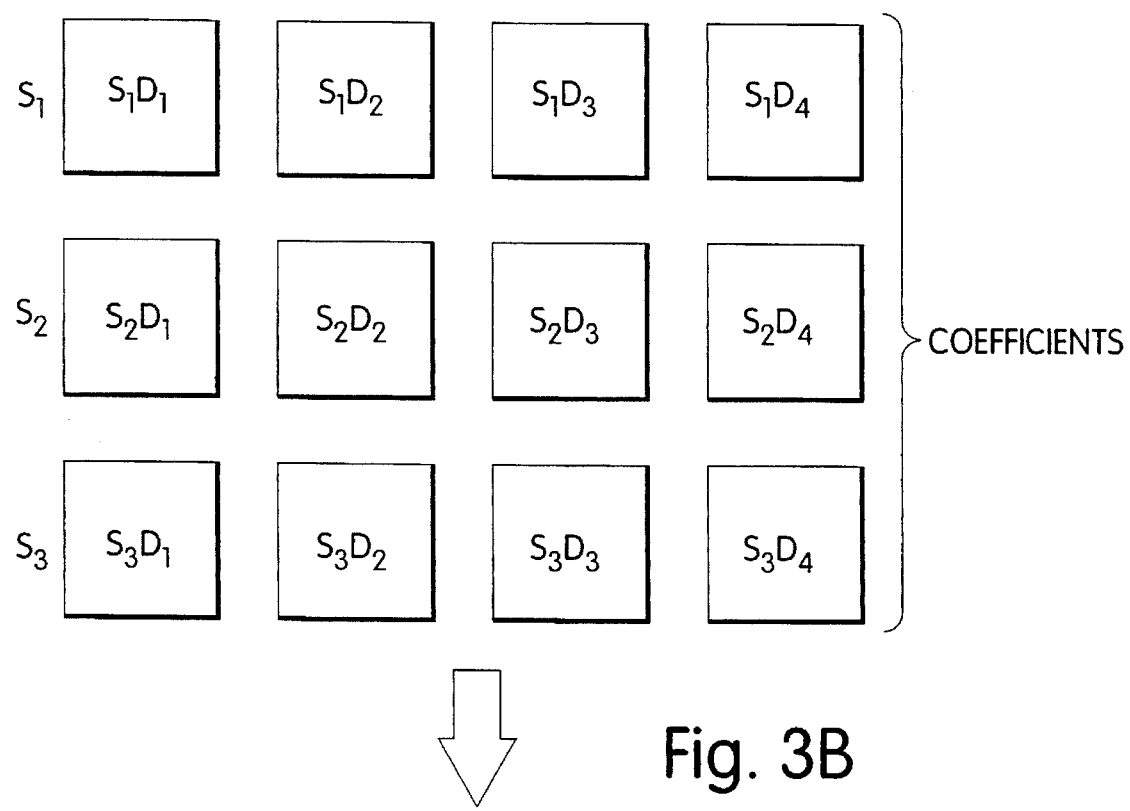
FIG. 3B is a diagrammatic illustration of the start of the statistical analysis in which the coefficients $S_x$, $D_{1-4}$ are derived.

Referring to FIG. 3B, it will be appreciated that the statistical analysis can begin through a matrix of the twelve coefficients produced by the aforementioned digital filtering and pyramid processing.

However, it is not necessary to do a comparison between clean and noisy images for each one of the twelve coefficients thus derived.

Rather it is sufficient to provide cumulative histograms for each scale for the coefficients of FIG. 3B.

Figure 3C:
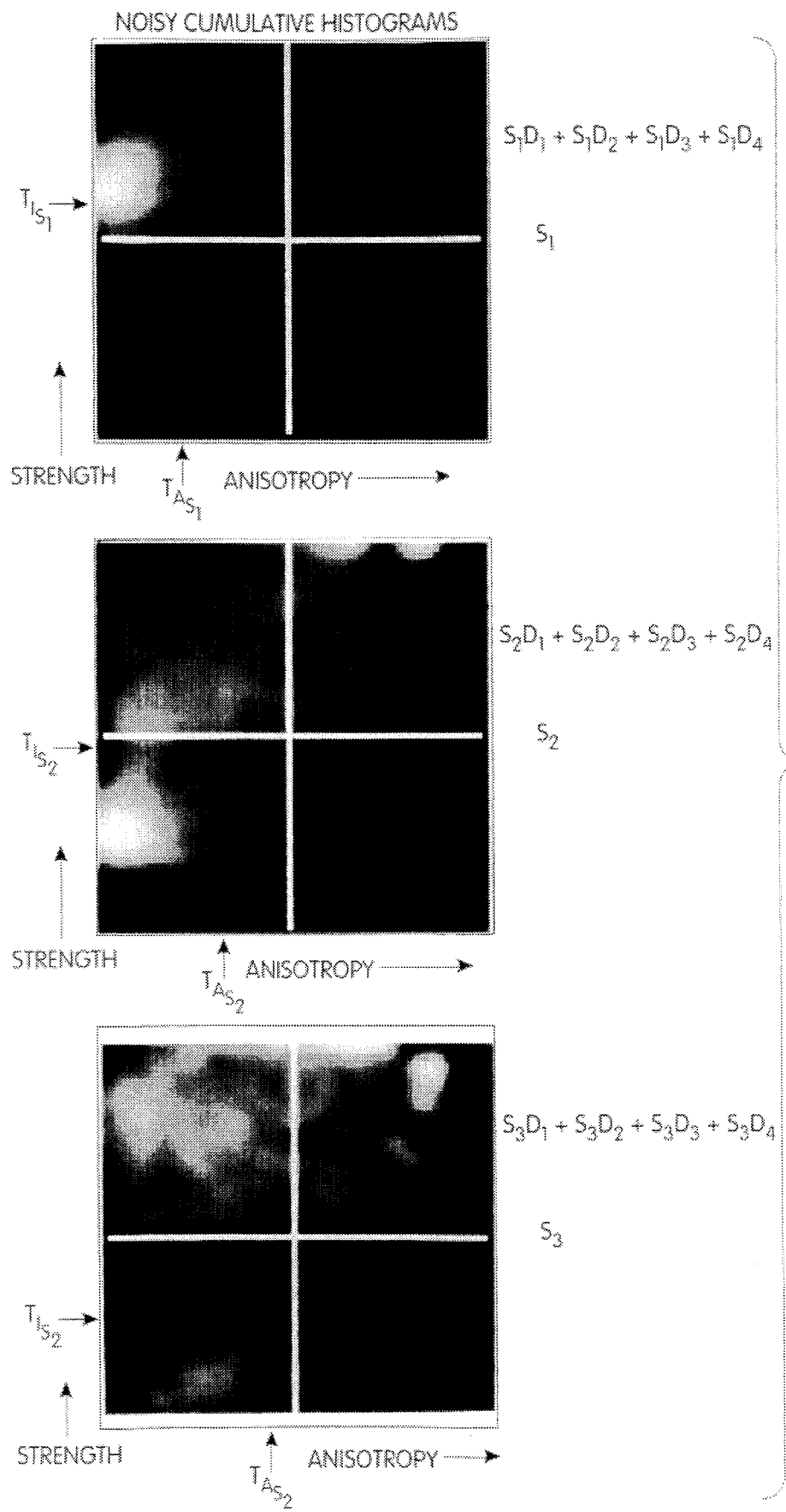
FIG. 3C illustrates combined noisy image histograms, for the three scales $S_1$, $S_2$, and $S_3$, as well as illustrating the $T_A$ and $T_I$ thresholds for each scale.
Figure 3D:
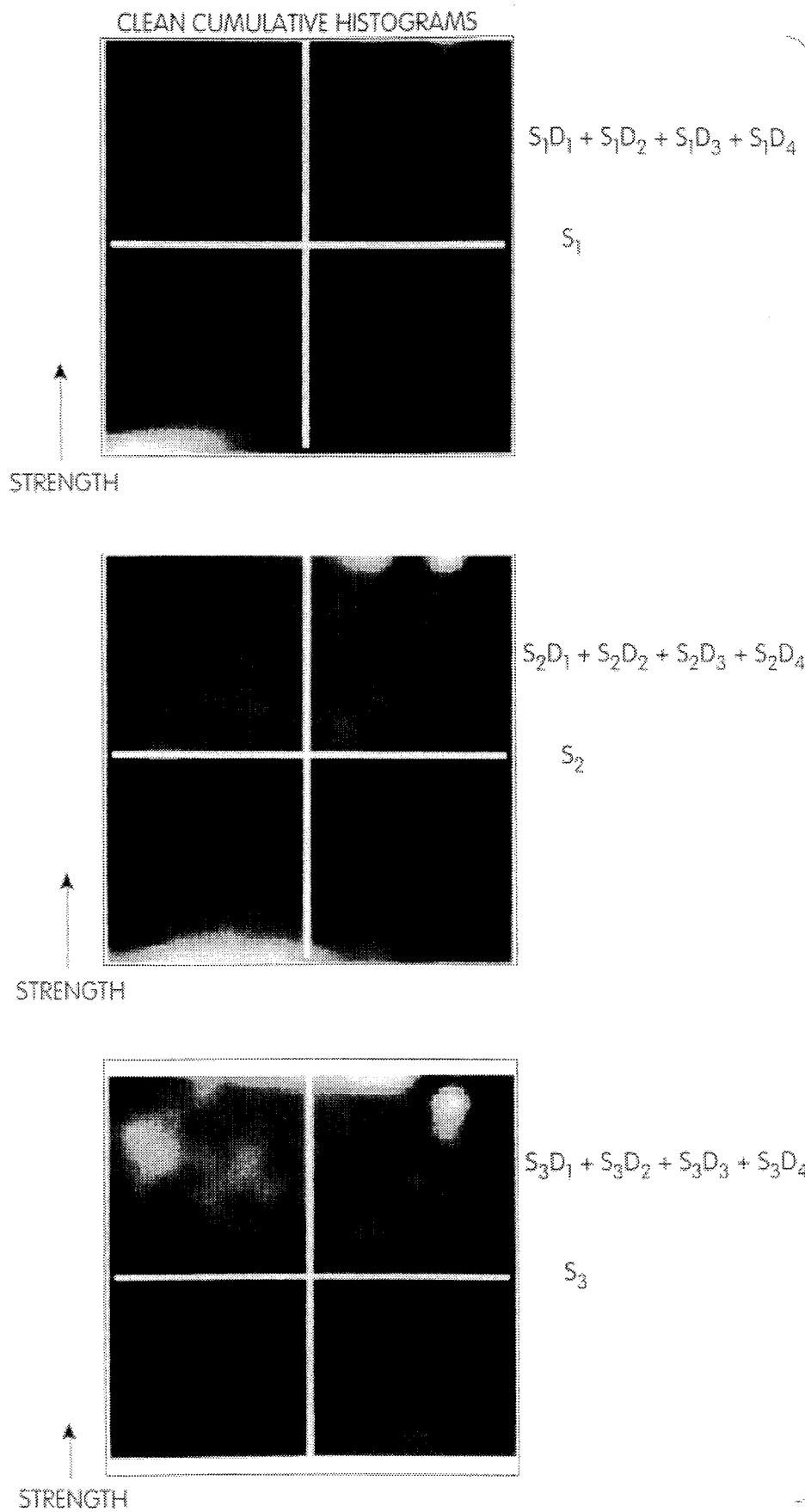
FIG. 3D illustrates combined clear image histograms for the $S_1$, $S_2$, and $S_3$ scales.

The result as seen in FIG. 3C is a set of histograms corresponding to the noisy image for the three different scales. These are generated by adding the coefficients for each scale together to provide the cumulative histogram. Each of the histograms graphs anisotropy, A, as a function of strength, I, with the thresholds $T_A$ and $T_I$ for each scale being set by comparison with clean image cumulative histograms such as those illustrated in FIG. 3D for each of the scales.

In order to calculate the anisotropy and strength thresholds for each of the different scales or pyramid levels, one first makes histogram plots of anisotropy, strength pairs, cumulative over the entire image and all orientations at a particular scale S. This is accomplished both for the clean image and the noisy image, with the plots shown in FIGS. 3C and 3D, utilizing a logarithmic scale along the intensity axis and a linear scale for the anisotropy axis. Comparing the histogram derived from the clean and noisy images, it is possible to identify two separate clusters of coefficients. This clustering can be done by visual inspection or through standard statistical clustering procedures. One cluster is relatively constant between the noisy and clean histograms and this is identified as desirable image information. The other cluster moves a great deal between the noisy and clean images, and this is identified as undesirable noise information. There is a noise cluster even in the "clean" image because of ever-present small amplitude noise. Note, in the histograms of FIGS. 3C and 3D, the intensity axis, being logarithmic results in linear offsets corresponding to multiplicative differences.

After identifying the noise cluster of the histogram derived from the noise image, one sets anisotropy and intensity thresholds to substantially eliminate the noise cluster. Note that in some cases, such as for histograms shown for the $S_1$ scale, it may not be possible to identify two distinct clusters in the intensity/anisotropy histogram. In this case, one chooses threshold levels which isolate the assumed noise cluster to the best extent possible, or by trial and error, to determine intensity/anisotropy thresholds which give a visually-desirable enhanced image.

Figure 3E:
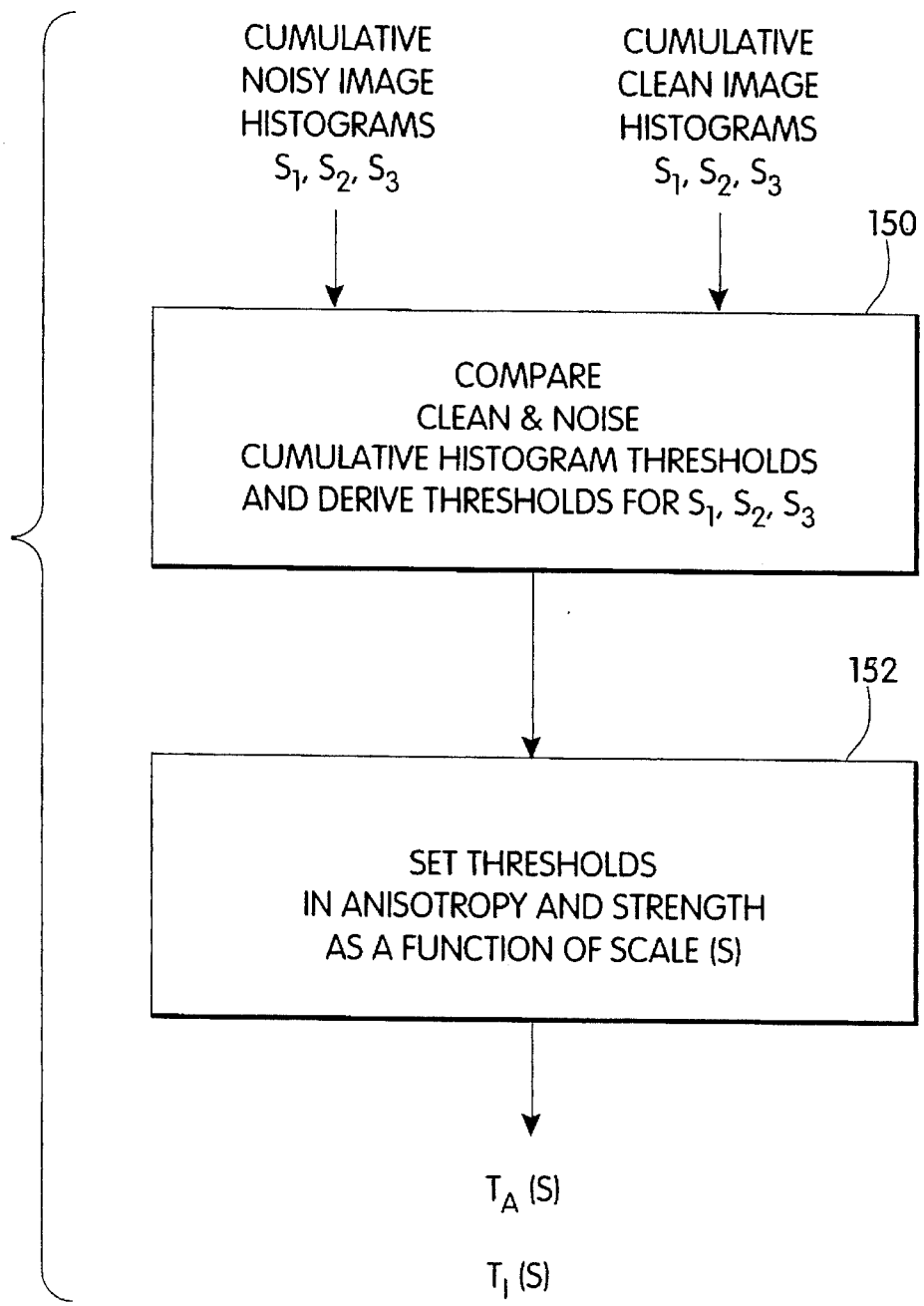
FIG. 3E is a block diagram illustrating the comparison of cumulative noisy image histograms for the three scales with cumulative clean image histograms for the three scales thereby to permit derivation of the thresholds to be utilized in modifying coefficients for scales $S_1$, $S_2$, and $S_3$.

This process is shown in FIG. 3E in block 150 and 152 such that for each scale, $T_A$ and $T_I$ are derived.

Figure 4A:
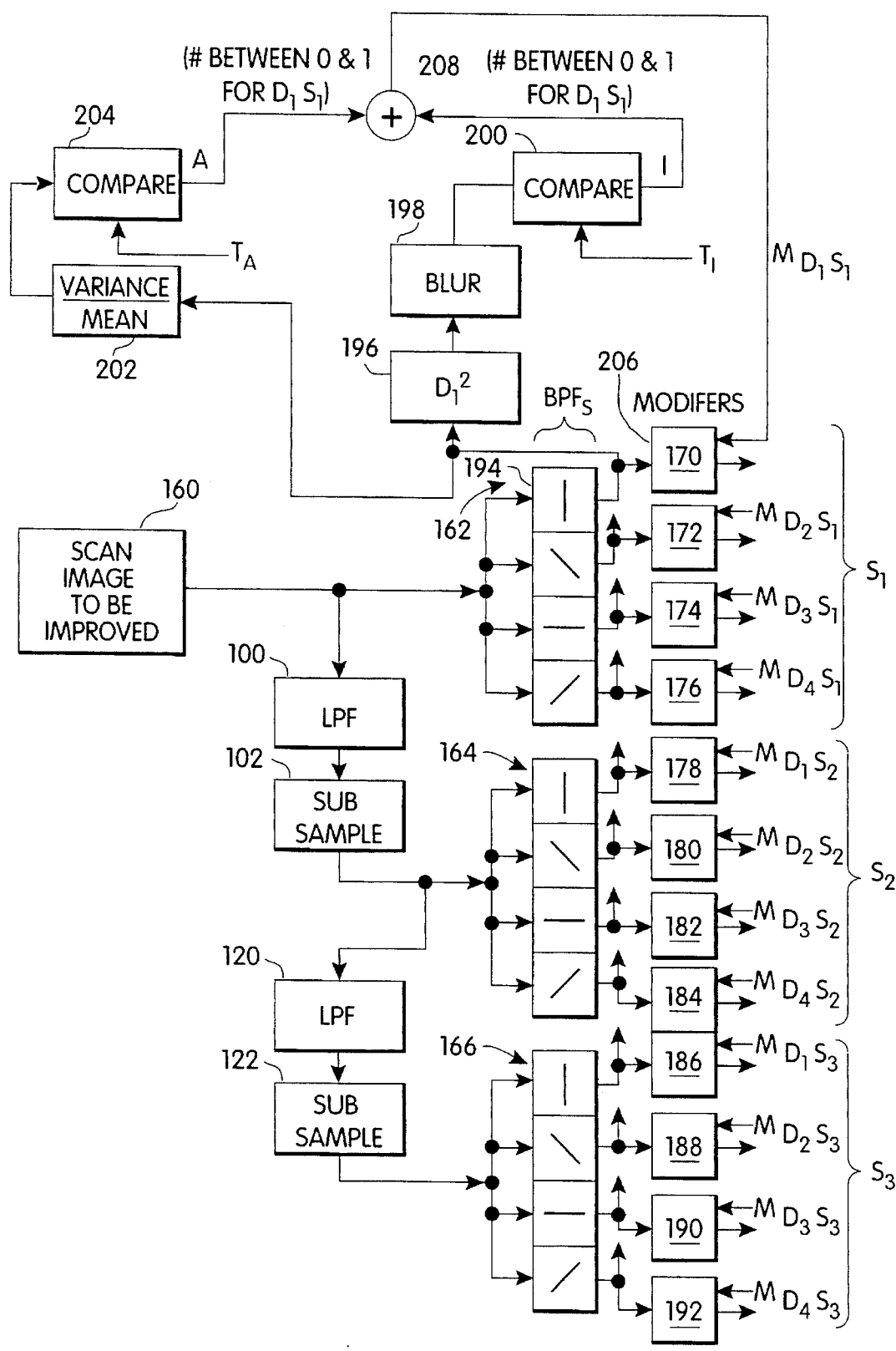
FIG. 4A is a detailed block diagram for the processing phase corresponding to the analysis phase illustrated in FIG. 3A, illustrating signal processing for the scanned image, including derivation of the modifier for orientation tuned filter outputs, for each of the three scales; and, FIG. 4B is a detailed block diagram utilizing the outputs derived in FIG. 4A for reconstructing the enhanced image through the utilization of synthesis or reconstruction filters having as inputs thereto the outputs of corresponding modifiers, also showing additional enhancement through the utilization of lowpass filtering and highpass filtering plus coring.
Figure 4B:
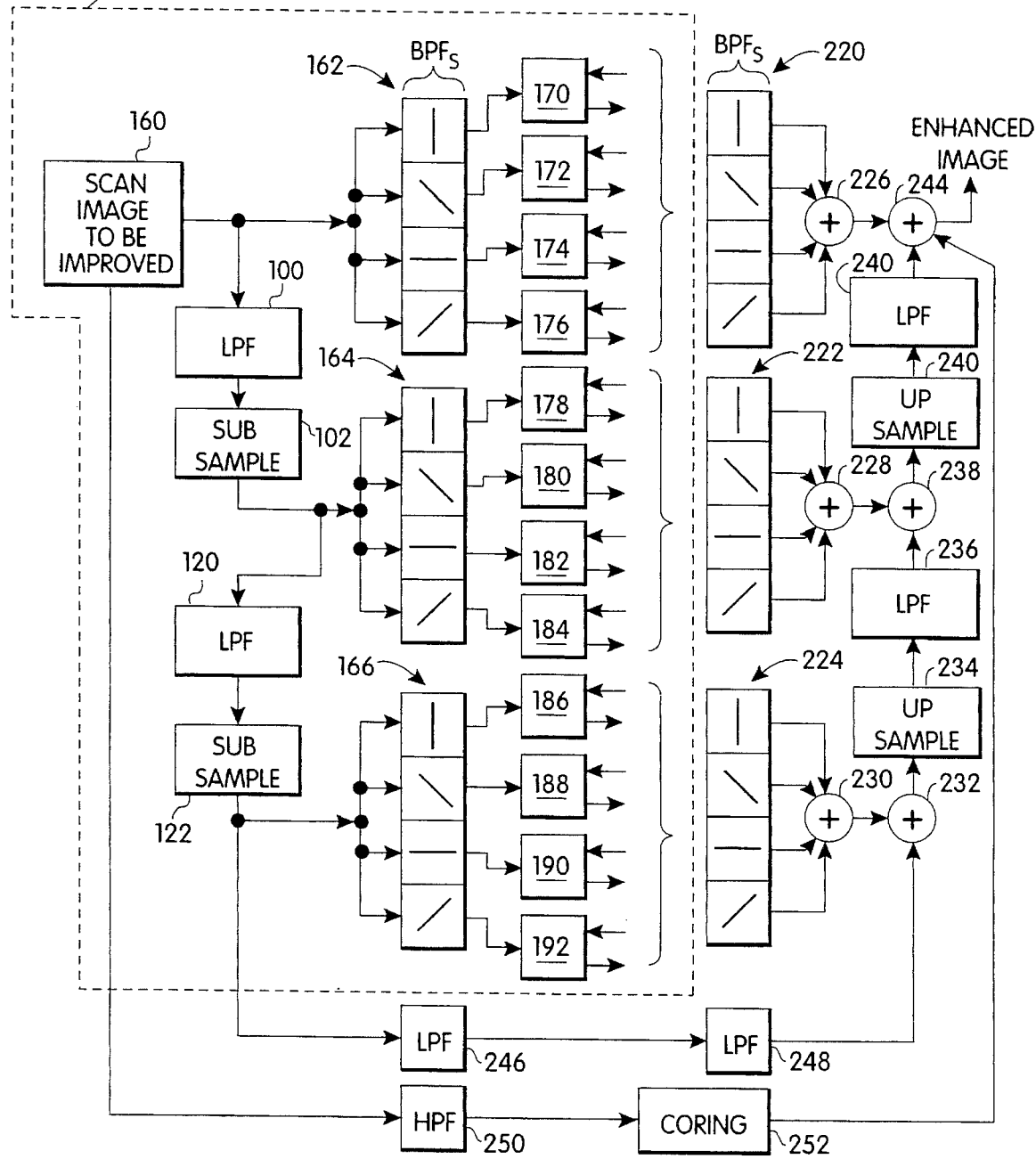

Having derived the thresholds $T_A$ and $T_I$, the processing phase, illustrated in FIGS. 4A and 4B produces the enhanced image. Referring to FIG. 4A, the image to be enhanced is scanned at 160 and the output is applied to orientation-tuned filters 162, 164, and 166, with the filters being identical to filters 82–88, 104–110, and 124–130 of FIG. 3A. These banks of filters correspond to bandpass filters in the pyramid structure which, for the processing phase, are the same as the analysis phase. Note the presence of lowpass filters 100 and 120 and subsampling units 102 and 122 previously described.

In order to provide the multiplier for each of modifiers 170–192, the output of an orientation-tuned filter, here shown at 194, is applied to a squaring circuit 196 and thence to a blurring circuit 198, the output of which is compared with threshold $T_I$ to provide a number between 0 and 1 for this orientation-tuned filter, in this case, the filter whose characteristics are $D_1$ and $S_1$. The comparison and number generation takes place at unit 200.

The output of filter 194 is also applied to a unit 202 which calculates varience/mean, the output of which is applied to a comparator 204 which generates a number between 1 and 0 corresponding to anisotropy after having been compared with threshold $T_A$. The multiplier for modifier 206 coupled to filter 194 is "1", should the output from comparator 204 or 200 be "1", otherwise it is 0. This function is shown by summing junction 208 as illustrated. It will be appreciated that modifiers for each of the orientation-tuned filters for each of the scales provided by the pyramiding structure is derived in this fashion such that when the coefficient from the filter is multiplied by this modifier, the result, as illustrated in FIG. 4B is applied to an identical set of orientation-tuned filters, here illustrated by reference characters 220, 222, and 224.

The outputs of orientation-tuned filters from set 220 are summed at a summing junction 226 with the outputs from set 222 summed at summing junction 228 and the outputs of set 224 summed at summing junction 230. Summing junction 230 is coupled via summing junction 232 to an upsample unit 234 coupled in turn to a lowpass filter 236. The output of lowpass filter 236, the lowest pass components, are summed at 238 with the midband frequency components which are again upsampled at 240 and provided through a lowpass filter 242 to a summing junction 244, at which the highest pass components are summed. The result is an enhanced image with lines, edges, and other true image features, with a minimal amount of noise.

It will be appreciated that for further enhancement, lowpass filters 246 and 248 may be coupled to subsampler 122 to provide the usual lowpass unprocessed video components, whereas a highpass filter 250 coupled to standard coring unit 252 provides for conventional highpass cored components to be added into the enhanced image at summing junction 244.

The subject enhancement method may also be used to achieve "super-resolution," whereby an image of size N1 ×M1 pixels may be transformed into an image of N2×M2 pixels, where N2 N1 and M2 M1. For example it might be used to increase the apparent resolution of a standard video image to that of a high definition television image.

For example, given a 512×512 pixel image, and wishing to increase its resolution to 1024×1024, in one method, one may proceed as follows. First, one interpolates the original 512×512 image, using a standard method such as bicubic interpolation. Because this image originated from a lower resolution image, it will lack the highest spatial frequencies and it will appear somewhat blurred. One can treat this blur as a form of image degradation, and can subject the image to a "deblurring" process as has been described above.

One can also optimize the deblurring process by the following statistical method: with a 1024 image, one filters and subsamples to obtain a 512 image. One then interpolates back to a 1024 image. One then performs transforms on both the original 1024 and the interpolated 1024 image. The difference between the coefficients in the transforms provides the statistical information needed to optimize the deblurring modifiers.

In another super-resolution technique, one predicts the transform coefficients of the desired 1024 image directly from the transform coefficients of the given 512 image. The 1024 transform differs from the 512 transform in having an extra level of resolution.

For those levels that are shared, the 1024 transform coefficients may be left equal to the 1024 coefficients. The problem then is to fill in the unknown coefficients in the highest-frequency band. It is possible to make a best estimate of each such coefficient, based on the known coefficients in the other bands that are of related position, orientation, or scale. Again, the best estimator can consist of a look-up table that is determined through a statistical analysis of the way 1024 pixel images map to 512 pixel images under filtering and subsampling.

As to the design of the specialized analysis and synthesis filters, a polar separable design strategy is used for the filter kernels of the transform. The radial frequency (scale) portion of the design is now described.

Pyramid algorithms are based on recursive filtering and subsampling operations. Typically, the input signal is partitioned into low and highpass portions, the lowpass portion is subsampled, and the subdivision is repeated recursively. In the present case, the signal is subdivided into a lowpass and a bandpass portion. The bandpass portion forms an annulus over which one "steers" in orientation. The lowpass portion forms the input for the next stage of recursion. To achieve this decomposition, one implements a novel bandpass pyramid architecture, in which the overall response of the system is lowpass.

First, the input signal is convolved with bandpass kernel, $B(\omega)$, and lowpass kernel $L_1(\omega)$. To ensure that there is no aliasing in the bandpass portion, it is not subsampled. The lowpass portion is subsampled by a factor of two, and then convolved with another lowpass kernel, $L_0(\omega)$.

Using standard signal processing results, and assuming that the subsampling of the lowpass branch introduces no aliasing, one writes the response of the system as:

$$S(\omega)=|B(\omega)|^2+|L_1(\omega)|^2|L_0(2\omega)|^2$$

Since $B(\omega)$ is bandpass, and the $L_1(\omega)$ are lowpass, $S(\omega)$ will have a lowpass characteristic. Therefore, a highpass residual image must be retained in order to reconstruct the original image. Alternatively, the original image can be upsampled before applying the steerable pyramid, the downsampled afterwards.

In order to cascade the system recursively, one must be able to replace a portion of the system with the entire system. One therefore requires that $S(\omega)=[L_0(\omega)]^2$. This allows the filter representation to be recursively cascaded. The resulting constraint on the bandpass filter $B(\omega)$ is $$|L_0(\omega)|^2=|B(\omega)|^2+|L_1(\omega)|^2\,|L_0(2\omega)|^2$$

This constraint must be used in the design of the filters.

The other constraint on the filter design is that the subsampling operation should not introduce aliasing in the lowpass branch. It would seem that this constrains the lowpass filter $L_1(\omega)$ to have strictly zero response above $w=\pi/2$. In practice, the restriction is less severe. The lowpass filter $L_0(\omega)$ that follows the subsampling operation removes most aliased components, which are high frequency in the subsampled domain. Therefore, a seven-tap binomial lowpass filter is used that is fairly gentle in the frequency domain: $l_1[n]=1/64 \cdot [1, 6, 15, 20, 15, 6, 1]$ One also has freedom to choose the $L_0(\omega)$ filter, or equivalently, the system response $S(\omega)$. Since it represents the lowpass response of the overall system, one requires that it be unity from 0 to $\pi/2$ radians, and zero at $w=\pi$. Using the Parks-McClellan algorithm, a 13-tap filter which best meets these criteria can be found.

Having specified the two lowpass filters, the bandpass filter is constrained by the recursion relation given in the above equation. A symmetric 15-tap bandpass filter is provided that minimizes the maximum error amplitude. A simplex algorithm is used to search the eight-dimensional space of free parameters. The result is the bandpass filter response with the maximum power deviation from the desired frequency response, roughly 3.5 percent.

As to the angular frequency component design, one chooses an angular kernel $h(\theta)=\cos^3(\theta)$. This can be expressed in terms of sinusoidal harmonics through use of standard trigonometric identities. Then the number of angular basis functions required for shiftability and the interpolation functions are determined by published equations describing steering. Solving for this case gives the interpolation functions.

Note with a linear combination of the four orientations, one can synthesize an arbitrary angular translation of the $\cos^3(\theta)$ basis functions.

As to two-dimensional filter design, using the known frequency transformation method, one converts the one-dimensional radial filters designed above into two-dimensional filters. These two-dimensional filters satisfy the constraint on the bandpass filter that was used in the one-dimensional design.

The angular filter design is combined with the two-dimensional bandpass filter. The angular variation is sufficiently slow to use the "frequency sampling" method for filter design. One computes the Fourier transform of the bandpass kernel, multiplied by the four desired angular responses, $\cos^3(\theta-\theta_n)$, and computes on inverse Fourier transform to obtain the basis filter impulse responses.

One can see that the steerable pyramid transform is self-inverting. When applying the oriented filters in two dimensions, the convolution results are not spatially subsampled. These subbands will therefore be spatially shiftable. The lowpass radial filters were designed to prevent aliasing, and so the lowpass signal will also be spatially shiftable. In the frequency domain, both the angular and radial component designs ensure that the sum of squares of the basis functions will be constant with respect to orientation and over the relevant range of scales (i.e., over the passband of $L_0(\omega)$). Therefore, the pyramid will be self-invertible.

Thus, as will be appreciated, for a steerable transform the invention is to take all the filter responses for all orientations and scales, square them, and add them, with the result to be unity in all positions in the Fourier plane, excluding the regions accounted for by the highpass and lowpass residuals. One embodiment of the specialized orientation tuned filters is presented by way of example herebelow:

Filter specifications:
Numbers represent filter tap values. Different lines of the convolution kernel are delineated by an extra space between lines of numbers.
Bandpass filters (15 × 15 size convolution kernel):

Orientation 0 (vertical)

| | | | | |
|---|---|---|---|---|
| −1.6665384E-4 | −5.0577027E-4 | −8.647268E-4 | −0.0012025941 | −0.0014195308 |
| −0.0013378551 | −8.4702595E-4 | 0.0 8.4702595E-4 | 0.0013378551 | 0.0014195308 |
| 0.0012025941 | 8.647268E-4 | 5.0577027E-4 | 1.6665384E-4 | |
| −1.3814024E-4 | −4.533271E-4 | −8.5638167E-4 | −0.0013987926 | −0.0018775791 |
| −0.0019168257 | −0.0011901611 | 0.0 0.0011901611 | 0.0019168257 | 0.0018775791 |
| 0.0013987926 | 8.5638167E-4 | 4.533271E-4 | 1.3814024E-4 | |
| −5.8038942E-5 | −2.8542563E-4 | −9.3607133E-4 | −0.0019276462 | −0.0027707168 |
| −0.0028939378 | −0.0020386078 | 0.0 0.0020386078 | 0.0028939378 | 0.0027707168 |
| 0.0019276462 | 9.3607133E-4 | 2.8542563E-4 | 5.8038942E-5 | |
| 1.3814561E-4 | −1.06828455E-4 | −0.0010942376 | −0.0023037964 | −0.0036897128 |
| −0.0052895956 | −0.0043884967 | 0.0 0.0043884967 | 0.0052895956 | 0.0036897128 |
| 0.0023037964 | 0.0010942376 | 1.06828455E-4 | −1.3814561E-4 | |
| 2.789543E-4 | 2.4048246E-5 | −7.632023E-4 | −0.0023095745 | −0.0054954467 |
| −0.008710007 | | | | |
| −0.008527457 | 0.0 0.008527457 | 0.008710007 | 0.0054954467 | 0.0023095745 |
| 7.632023E-4 | | | | |
| −2.4048246E-5 | −2.789543E-4 | | | |
| 3.5529574E-5 | 4.3139525E-4 | 4.578225E-4 | −0.002957185 | −1.3919214E-4 |
| −0.013461593 | | | | |
| −0.034258235 | 0.0 0.034258235 | 0.013461593 | 1.3919214E-4 | 0.002957185 |
| −4.578225E-4 | | | | |
| −4.3139525E-4 | −3.5529574E-5 | | | |
| −0.0016883219 | 0.0025546663 | 1.4859415E-4 | −0.0016192239 | 0.017838402 |
| −0.02448788 | | | | |
| −0.08756359 | 0.0 0.08756359 | 0.02448788 | −0.017838402 | 0.0016192239 |
| −1.4859415E-4 | | | | |
| −0.0025546663 | 0.0016883219 | | | |
| −0.004443808 | 0.0056791715 | −0.0024476235 | 0.00208627 | 0.026913576 |
| −0.028841132 | | | | |
| −0.12148209 | 0.0 0.12148209 | 0.028841132 | −0.026913576 | −0.00208627 |
| 0.0024476235 | | | | |
| −0.0056791715 | 0.004443808 | | | |
| −0.0016883219 | 0.0025546663 | 1.4859415E-4 | −0.0016192239 | 0.017838402 |
| −0.02448788 | | | | |
| −0.08756359 | 0.0 0.08756359 | 0.02448788 | −0.017838402 | 0.0016192239 |
| −1.4859415E-4 | | | | |
| −0.0025546663 | 0.0016883219 | | | |
| 3.5529574E-5 | 4.3139525E-4 | 4.578225E-4 | −0.002957185 | −1.3919214E-4 |
| −0.013461593 | | | | |
| −0.034258235 | 0.0 0.034258235 | 0.013461593 | 1.3919214E-4 | 0.002957185 |
| −4.578225E-4 | | | | |
| −4.3139525E-4 | −3.5529574E-5 | | | |
| 2.789543E-4 | 2.4048246E-5 | −7.632023E-4 | −0.0023095745 | −0.0054954467 |
| −0.008710007 | | | | |
| −0.008527457 | 0.0 0.008527457 | 0.008710007 | 0.0054954467 | 0.0023095745 |
| 7.632023E-4 | | | | |
| −2.4048246E-5 | −2.789543E-4 | | | |
| 1.3814561E-4 | −1.06828455E-4 | −0.0010942376 | −0.0023037964 | −0.0036897128 |
| −0.0052895956 | | | | |
| −0.0043884967 | 0.0 0.0043884967 | 0.0052895956 | 0.0036897128 | 0.0023037964 |
| 0.0010942376 | | | | |
| 1.06828455E-4 | −1.3814561E-4 | | | |
| −5.8038942E-5 | −2.8542563E-4 | −9.3607133E-4 | −0.0019276462 | −0.0027707168 |
| −0.0028939378 | | | | |
| −0.0020386078 | 0.0 0.0020386078 | 0.0028939378 | 0.0027707168 | 0.0019276462 |
| 9.3607133E-4 | | | | |
| 2.8542563E-4 | 5.8038942E-5 | | | |
| −1.3814024E-4 | −4.533271E-4 | −8.5638167E-4 | −0.0013987926 | −0.0018775791 |
| −0.0019168257 | | | | |
| −0.0011901611 | 0.0 0.0011901611 | 0.0019168257 | 0.0018775791 | 0.0013987926 |
| 8.5638167E-4 | | | | |
| 4.533271E-4 | 1.3814024E-4 | | | |
| −1.6665384E-4 | −5.0577027E-4 | −8.647268E-4 | −0.0012025941 | −0.0014195308 |
| −0.0013378551 | | | | |
| −8.4702595E-4 | 0.0 8.4702595E-4 | 0.0013378551 | 0.0014195308 | 0.0012025941 |
| 8.647268E-4 | | | | |
| 5.0577027E-4 | 1.6665384E-4 | | | | filter taps for orientation 1 (15 × 15)

| | | | | |
|---|---|---|---|---|
| −4.4268492E-10 | 3.180216E-4 | 6.5535365E-4 | 0.0010060476 | 0.0013135547 |
| 0.0015144891 | | | | |
| 0.00170111 | 0.0030331952 | −4.6662757E-5 | −0.001348555 | −0.0017468196 |
| −0.0015528413 | | | | |

-continued

Filter specifications:
Numbers represent filter tap values. Different lines of the convolution kernel are delineated by an extra space between lines of numbers.
Bandpass filters (15 × 15 size convolution kernel):

Orientation 0   (vertical)

| | | | | |
|---|---|---|---|---|
| −0.0011259177 | −6.943738E-4 | −3.251513E-4 | | |
| −3.1802175E-4 | −3.5045977E-10 | 3.631106E-4 | 8.344419E-4 | 0.0013726181 |
| 0.0016995687 | | | | |
| 0.0012427594 | −0.0012405333 | 3.8429582E-4 | −2.047678E-4 | −0.0014427082 |
| −0.0020976234 | | | | |
| −0.0018506575 | −0.0012289224 | −6.9437356E-4 | | |
| −6.553542E-4 | −3.6311155E-4 | −3.130365E-10 | 6.2248553E-4 | 0.001625461 |
| 0.0030362871 | | | | |
| 0.004441197 | 0.0055280253 | 1.3277118E-4 | −0.0018462801 | −0.0017029818 |
| −0.0019330485 | | | | |
| −0.0022799957 | −0.0018506577 | −0.0011259192 | | |
| −0.0010060476 | −8.344415E-4 | −6.2248576E-4 | −2.3108875E-10 | 0.001356226 |
| 0.0033726227 | | | | |
| 0.0049502356 | 0.004052697 | 0.0061738174 | 0.0016731401 | −0.0023119866 |
| −0.0022572062 | | | | |
| −0.0019330474 | −0.0020976218 | −0.0015528414 | | |
| −0.001313556 | −0.0013726181 | −0.0016254598 | −0.0013562258 | −1.0842216E-10 |
| 0.005055297 | | | | |
| 0.011141315 | 0.005203105 | −0.011573142 | −0.007275544 | −9.238022E-4 |
| −0.002311987 | | | | |
| −0.0017029806 | −0.0014427063 | −0.0017468192 | | |
| −0.001514489 | −0.0016995694 | −0.0030362874 | −0.003372623 | −0.005055297 |
| −9.650807E-10 | | | | |
| 0.03447172 | 0.05267349 | 0.012521397 | −0.024708178 | −0.0072755455 |
| 0.0016731382 | | | | |
| −0.0018462815 | −2.047664E-4 | −0.0013485533 | | |
| −0.001701113 | −0.0012427592 | −0.004441195 | −0.004950236 | −0.011141317 |
| −0.03447172 | | | | |
| −4.3253845E-10 | 0.09882036 | 0.09264193 | 0.012521398 | −0.011573142 |
| 0.006173817 | | | | |
| 1.3277102E-4 | 3.8429516E-4 | −4.6665027E-5 | | |
| −0.0030331963 | 0.0012405316 | −0.005528024 | −0.0040526954 | −0.005203106 |
| −0.05267349 | | | | |
| −0.09882036 | 0.0 0.09882036 | 0.05267349 | 0.005203106 | 0.0040526954 |
| 0.005528024 | | | | |
| −0.0012405316 | 0.0030331963 | | | |
| 4.6665027E-5 | −3.8429516E-4 | −1.3277102E-4 | −0.006173817 | 0.011573142 |
| −0.012521398 | | | | |
| −0.09264193 | −0.09882036 | 4.3253848E-10 | 0.03447172 | 0.011141317 |
| 0.004950236 | | | | |
| 0.004441195 | 0.0012427592 | 0.001701113 | | |
| 0.0013485533 | 2.047664E-4 | 0.0018462815 | −0.0016731382 | 0.0072755455 |
| 0.024708178 | | | | |
| −0.012521397 | −0.05267349 | −0.03447172 | 9.650807E-10 | 0.005055297 |
| 0.003372623 | | | | |
| 0.0030362874 | 0.0016995694 | 0.001514489 | | |
| 0.0017468192 | 0.0014427063 | 0.0017029806 | 0.002311987 | 9.238022E-4 |
| 0.007275544 | | | | |
| 0.011573142 | −0.005203105 | −0.011141315 | −0.005055297 | 1.0842215E-10 |
| 0.0013562258 | | | | |
| 0.0016254598 | 0.0013726181 | 0.001313556 | | |
| 0.0015528414 | 0.0020976218 | 0.0019330474 | 0.0022572062 | 0.0023119866 |
| −0.0016731401 | | | | |
| −0.0061738174 | −0.004052697 | −0.0049502356 | −0.0033726227 | −0.001356226 |
| 2.3108872E-10 | | | | |
| 6.2248576E-4 | 8.344415E-4 | 0.0010060476 | | |
| 0.0011259192 | 0.0018506577 | 0.0022799957 | 0.0019330485 | 0.0017029818 |
| 0.0018462801 | | | | |
| −1.3277118E-4 | −0.0055280253 | −0.004441197 | −0.0030362871 | −0.001625461 |
| −6.2248553E-4 | | | | |
| 3.130365E-10 | 3.6311155E-4 | 6.553542E-4 | | |
| 6.9437356E-4 | 0.0012289224 | 0.0018506575 | 0.0020976234 | 0.0014427082 |
| 2.047678E-4 | | | | |
| −3.8429582E-4 | 0.0012405333 | −0.0012427594 | −0.0016995687 | −0.0013726181 |
| −8.344419E-4 | | | | |
| −3.631106E-4 | 3.5045977E-10 | 3.1802175E-4 | | |
| 3.251513E-4 | 6.943738E-4 | 0.0011259177 | 0.0015528413 | 0.0017468196 |
| 0.001348555 | | | | |
| 4.6662757E-5 | −0.0030331952 | −0.00170111 | −0.0015144891 | −0.0013135547 |
| −0.0010060476 | | | | |
| −6.5535365E-4 | −3.180216E-4 | 4.4268492E-10 | | | filter taps for orientation 2 (15 × 15)

-continued

Filter specifications:
Numbers represent filter tap values. Different lines of the convolution
kernel are delineated by an extra space between lines of numbers.
Bandpass filters (15 × 15 size convolution kernel):

Orientation 0 (vertical)

| | | | | |
|---|---|---|---|---|
| 1.6665192E-4 | 1.38139E-4 | 5.80386E-5 | −1.3814619E-4 | −2.789553E-4 |
| −3.5530073E-5 | | | | |
| 0.0016883216 | 0.004443808 | 0.0016883216 | −3.5530073E-5 | −2.789553E-4 |
| −1.3814619E-4 | | | | |
| 5.80386E-5 | 1.38139E-4 | 1.6665192E-4 | | |
| 5.0576916E-4 | 4.5332548E-4 | 2.854237E-4 | 1.0682653E-4 | −2.4050027E-5 |
| −4.3139674E-4 | | | | |
| −0.0025546667 | −0.005679172 | −0.0025546667 | −4.3139674E-4 | −2.4050027E-5 |
| 1.0682653E-4 | | | | |
| 2.8542365E-4 | 4.5332548E-4 | 5.0576916E-4 | | |
| 8.647253E-4 | 8.563804E-4 | 9.3607034E-4 | 0.0010942363 | 7.632014E-4 |
| −4.5782336E-4 | | | | |
| −1.4859457E-4 | 0.0024476238 | −1.4859457E-4 | −4.5782336E-4 | 7.632014E-4 |
| 0.0010942363 | | | | |
| 9.3607034E-4 | 8.563804E-4 | 8.647253E-4 | | |
| 0.0012025955 | 0.0013987938 | 0.0019276468 | 0.0023037966 | 0.0023095754 |
| 0.002957185 | | | | |
| 0.0016192226 | −0.002086269 | 0.0016192226 | 0.002957185 | 0.0023095754 |
| 0.0023037966 | | | | |
| 0.0019276468 | 0.0013987938 | 0.0012025955 | | |
| 0.0014195292 | 0.0018775789 | 0.002770718 | 0.0036897138 | 0.005495447 |
| 1.3919282E-4 | | | | |
| −0.017838402 | −0.026913576 | −0.017838402 | 1.3919282E-4 | 0.005495447 |
| 0.0036897138 | | | | |
| 0.002770718 | 0.0018775789 | 0.0014195292 | | |
| 0.0013378564 | 0.0019168252 | 0.0028939361 | 0.005289594 | 0.008710006 |
| 0.013461592 | | | | |
| 0.024487877 | 0.02884113 | 0.024487877 | 0.013461592 | 0.008710006 |
| 0.005289594 | | | | |
| 0.0028939361 | 0.0019168252 | 0.0013378564 | | |
| 8.470236E-4 | 0.0011901602 | 0.0020386088 | 0.0043884977 | 0.008527457 |
| 0.034258235 | | | | |
| 0.08756358 | 0.121482074 | 0.08756358 | 0.034258235 | 0.008527457 |
| 0.0043884977 | | | | |
| 0.0020386088 | 0.0011901602 | 8.470236E-4 | | |
| 0.0 0.0 0.0 0.0 | 0.0 0.0 0.0 0.0 | 0.0 0.0 | | |
| 0.0 0.0 0.0 0.0 | 0.0 | | | |
| −8.470236E-4 | −0.0011901602 | −0.0020386088 | −0.0043884977 | −0.008527457 |
| −0.034258235 | −0.08756358 | −0.121482074 | −0.08756358 | −0.034258235 |
| −0.008527457 | | | | |
| −0.0043884977 | −0.0020386088 | −0.0011901602 | −8.470236E-4 | |
| −0.0013378564 | −0.0019168252 | −0.0028939361 | −0.005289594 | −0.008710006 |
| −0.013461592 | | | | |
| −0.024487877 | −0.02884113 | −0.024487877 | −0.013461592 | −0.008710006 |
| −0.005289594 | | | | |
| −0.0028939361 | −0.0019168252 | −0.0013378564 | | |
| −0.0014195292 | −0.0018775789 | −0.002770718 | −0.0036897138 | −0.005495447 |
| −1.3919282E-4 | | | | |
| 0.017838402 | 0.026913576 | 0.017838402 | −1.3919282E-4 | −0.005495447 |
| −0.0036897138 | | | | |
| −0.002770718 | −0.0018775789 | −0.0014195292 | | |
| −0.0012025955 | −0.0013987938 | −0.0019276468 | −0.0023037966 | −0.0023095754 |
| −0.002957185 | | | | |
| −0.0016192226 | 0.002086269 | −0.0016192226 | −0.002957185 | −0.0023095754 |
| −0.0023037966 | | | | |
| −0.0019276468 | −0.0013987938 | −0.0012025955 | | |
| −8.647253E-4 | −8.563804E-4 | −9.3607034E-4 | −0.0010942363 | −7.632014E-4 |
| 4.5782336E-4 | | | | |
| 1.4859457E-4 | −0.0024476238 | 1.4859457E-4 | 4.5782336E-4 | −7.632014E-4 |
| −0.0010942363 | | | | |
| −9.3607034E-4 | −8.563804E-4 | −8.647253E-4 | | |
| −5.0576916E-4 | −4.5332548E-4 | −2.854237E-4 | −1.0682653E-4 | 2.4050027E-5 |
| 4.3139674E-4 | | | | |
| 0.0025546667 | 0.005679172 | 0.0025546667 | 4.3139674E-4 | 2.4050027E-5 |
| −1.0682653E-4 | | | | |
| −2.8542365E-4 | −4.5332548E-4 | −5.0576916E-4 | | |
| −1.6665192E-4 | −1.38139E-4 | −5.80386E-5 | 1.3814619E-4 | 2.789553E-4 |
| 3.5530073E-5 | | | | |
| −0.0016883216 | −0.004443808 | −0.0016883216 | 3.5530073E-5 | 2.789553E-4 |
| 1.3814619E-4 | | | | |
| −5.80386E-5 | −1.38139E-4 | −1.6665192E-4 | | | filter taps for orientation 3

Filter specifications:
Numbers represent filter tap values. Different lines of the convolution kernel are delineated by an extra space between lines of numbers.
Bandpass filters (15 × 15 size convolution kernel):

Orientation 0 (vertical)

| | | | | |
|---|---|---|---|---|
| −3.251513E-4 | −6.943738E-4 | −0.0011259177 | −0.0015528413 | −0.0017468196 |
| −0.001348555 | | | | |
| −4.6662757E-5 | 0.0030331952 | 0.00170111 | 0.0015144891 | 0.0013135547 |
| 0.0010060476 | | | | |
| 6.5535365E-4 | 3.180216E-4 | −4.4268492E-10 | | |
| −6.9437356E-4 | −0.0012289224 | −0.0018506575 | −0.0020976234 | −0.0014427082 |
| −2.047678E-4 | | | | |
| 3.8429582E-4 | −0.0012405333 | 0.0012427594 | 0.0016995687 | 0.0013726181 |
| 8.344419E-4 | | | | |
| 3.631106E-4 | −3.5045977E-10 | −3.1802175E-4 | | |
| −0.0011259192 | −0.0018506577 | −0.0022799957 | −0.0019330485 | |
| −0.0017029818 | −0.0018462801 | | | |
| 1.3277118E-4 | 0.0055280253 | 0.004441197 | 0.0030362871 | |
| 0.001625461 | 6.2248553E-4 | | | |
| −3.130365E-10 | −3.6311155E-4 | −6.553542E-4 | | |
| −0.0015528414 | −0.0020976218 | −0.0019330474 | −0.0022572062 | |
| −0.0023119866 | 0.0016731401 | | | |
| 0.0061738174 | 0.004052697 | 0.0049502356 | 0.0033726227 | |
| 0.001356226 | −2.3108872E-10 | | | |
| −6.2248576E-4 | −8.344415E-4 | −0.0010060476 | | |
| −0.0017468192 | −0.0014427063 | −0.0017029806 | −0.002311987 | |
| −9.238022E-4 | −0.007275544 | | | |
| −0.011573142 | 0.005203105 | 0.011141315 | 0.005055297 | |
| −1.0842215E-10 | −0.0013562258 | | | |
| −0.0016254598 | −0.0013726181 | −0.001313556 | | |
| −0.0013485533 | −2.047664E-4 | −0.0018462815 | 0.0016731382 | |
| −0.0072755455 | −0.024708178 | | | |
| 0.012521397 | 0.05267349 | 0.03447172 | −9.650807E-10 | |
| −0.005055297 | −0.003372623 | | | |
| −0.0030362874 | −0.0016995694 | −0.001514489 | | |
| −4.6665027E-5 | 3.8429516E-4 | 1.3277102E-4 | 0.006173817 | |
| −0.011573142 | 0.012521398 | | | |
| 0.09264193 | 0.09882036 | −4.3253848E-10 | −0.03447172 | |
| −0.011141317 | −0.004950236 | | | |
| −0.004441195 | −0.0012427592 | −0.001701113 | | |
| 0.0030331963 | −0.0012405316 | 0.005528024 | 0.0040526954 | |
| 0.005203106 | 0.05267349 | | | |
| 0.09882036 | 0.0 −0.09882036 | −0.05267349 | −0.005203106 | |
| −0.0040526954 | −0.005528024 | | | |
| 0.0012405316 | −0.0030331963 | | | |
| 0.001701113 | 0.0012427592 | 0.004441195 | 0.004950236 | 0.011141317 |
| 0.03447172 | 4.3253845E-10 | | | |
| −0.09882036 | −0.09264193 | −0.012521398 | 0.011573142 | −0.006173817 |
| −1.3277102E-4 | | | | |
| −3.8429516E-4 | 4.6665027E-5 | | | |
| 0.001514489 | 0.0016995694 | 0.0030362874 | 0.003372623 | 0.005055297 |
| 9.650807E-10 | | | | |
| −0.03447172 | −0.05267349 | −0.012521397 | 0.024708178 | 0.0072755455 |
| −0.0016731382 | | | | |
| 0.0018462815 | 2.047664E-4 | 0.0013485533 | | |
| 0.001313556 | 0.0013726181 | 0.0016254598 | 0.0013562258 | |
| 1.0842216E-10 | −0.005055297 | | | |
| −0.011141315 | −0.005203105 | 0.011573142 | 0.007275544 | |
| 9.238022E-4 | 0.002311987 | | | |
| 0.0017029806 | 0.0014427063 | 0.0017468192 | | |
| 0.0010060476 | 8.344415E-4 | 6.2248576E-4 | 2.3108875E-10 | |
| −0.001356226 | −0.0033726227 | | | |
| −0.0049502356 | −0.004052697 | −0.0061738174 | −0.0016731401 | |
| 0.0023119866 | | | | |
| 0.0022572062 | 0.0019330474 | 0.0020976218 | 0.0015528414 | |
| 6.553542E-4 | 3.6311155E-4 | 3.130365E-10 | −6.2248553E-4 | −0.001625461 |
| −0.0030362871 | | | | |
| −0.004441197 | −0.0055280253 | −1.3277118E-4 | 0.0018462801 | |
| 0.0017029818 | 0.0019330485 | | | |
| 0.0022799957 | 0.0018506577 | 0.0011259192 | | |
| 3.1802175E-4 | 3.5045977E-10 | −3.631106E-4 | −8.344419E-4 | |
| −0.0013726181 | −0.0016995687 | | | |
| −0.0012427594 | 0.0012405333 | −3.8429582E-4 | 2.047678E-4 | |
| 0.0014427082 | 0.0020976234 | | | |
| 0.0018506575 | 0.0012289224 | 6.9437356E-4 | | |
| 4.4268492E-10 | −3.180216E-4 | −6.5535365E-4 | −0.0010060476 | |
| −0.0013135547 | −0.0015144891 | | | |
| −0.00170111 | −0.0030331952 | 4.6662757E-5 | 0.001348555 | |

-continued

Filter specifications:
Numbers represent filter tap values. Different lines of the convolution kernel are delineated by an extra space between lines of numbers.
Bandpass filters (15 × 15 size convolution kernel):

Orientation 0 (vertical)

| | | |
|---|---|---|
| 0.0017468196 | 0.0015528413 | |
| 0.0011259177 | 6.943738E-4 | 3.251513E-4 |

Low-pass filter (7 × 7 size convolution kernel):

| | | | | |
|---|---|---|---|---|
| 9.765625E-4 | 0.005859375 | 0.0146484375 | 0.01953125 | 0.0146484375 |
| 0.005859375 | 9.765625E-4 | | | |
| 0.005859375 | 0.01953125 | 0.025390625 | 0.0234375 | 0.025390625 |
| 0.01953125 | 0.005859375 | | | |
| 0.0146484375 | 0.025390625 | 0.032226562 | 0.04296875 | 0.032226562 |
| 0.025390625 | 0.0146484375 | | | |
| 0.01953125 | 0.0234375 | 0.04296875 | 0.078125 | 0.04296875 |
| 0.0234375 | 0.01953125 | | | |
| 0.0146484375 | 0.025390625 | 0.032226562 | 0.04296875 | 0.032226562 |
| 0.025390625 | 0.0146484375 | | | |
| 0.005859375 | 0.01953125 | 0.025390625 | 0.0234375 | 0.025390625 |
| 0.01953125 | 0.005859375 | | | |
| 9.765625E-4 | 0.005859375 | 0.0146484375 | 0.01953125 | 0.0146484375 |
| 0.005859375 | 9.765625E-4 | | | |

Recursion ending low-pass filter (13 × 13 convolution kernel):

| | | | | |
|---|---|---|---|---|
| −4.248047E-6 | −5.0976563E-5 | −2.803711E-4 | −9.3457033E-4 | −0.0021027832 |
| −0.003364453 | −0.0039251954 | −0.003364453 | −0.0021027832 | −9.3457033E-4 |
| −2.803711E-4 | −5.0976563E-5 | −4.248047E-6 | | |
| −5.0976563E-5 | −4.2353515E-4 | −0.0014826172 | −0.002746582 | −0.0026513673 |
| −8.548829E-4 | 3.1992188E-4 | −8.548829E-4 | −0.0026513673 | −0.002746582 |
| −0.0014826172 | −4.2353515E-4 | −5.0976563E-5 | | |
| −2.803711E-4 | −0.0014826172 | −0.0025060547 | 4.4160127E-4 | 0.008078808 |
| 0.015216015 | 0.017765235 | 0.015216015 | 0.008078808 | 4.4160127E-4 |
| −0.0025060547 | −0.0014826172 | −2.803711E-4 | | |
| −9.3457033E-4 | −0.002746582 | 4.4160127E-4 | 0.0089850575 | 0.0058790995 |
| −0.0152634755 | −0.028822266 | −0.0152634755 | 0.0058790995 | 0.0089850575 |
| 4.4160127E-4 | −0.002746582 | −9.3457033E-4 | | |
| −0.0021027832 | −0.0026513673 | 0.008078808 | 0.0058790995 | −0.023827683 |
| −0.028377736 | −0.014596701 | −0.028377736 | −0.023827683 | 0.0058790995 |
| 0.008078808 | −0.0026513673 | −0.0021027832 | | |
| −0.003364453 | −8.548829E-4 | 0.015216015 | −0.0152634755 | −0.028377736 |
| 0.08816835 | 0.1771523 | 0.08816835 | −0.028377736 | −0.0152634755 |
| 0.015216015 | | | | |
| −8.548829E-4 | −0.003364453 | | | |
| −0.0039251954 | 3.1992188E-4 | 0.017765235 | −0.028822266 | −0.014596701 |
| 0.1771523 | 0.32691327 | 0.1771523 | −0.014596701 | −0.028822266 |
| 0.017765235 | | | | |
| 3.1992188E-4 | −0.0039251954 | | | |
| −0.003364453 | −8.548829E-4 | 0.015216015 | −0.0152634755 | −0.028377736 |
| 0.08816835 | 0.1771523 | 0.08816835 | −0.028377736 | −0.0152634755 |
| 0.015216015 | | | | |
| −8.548829E-4 | −0.003364453 | | | |
| −0.0021027832 | −0.0026513673 | 0.008078808 | 0.0058790995 | −0.023827683 |
| −0.028377736 | −0.014596701 | −0.028377736 | −0.023827683 | 0.0058790995 |
| 0.008078808 | −0.0026513673 | −0.0021027832 | | |
| −9.3457033E-4 | −0.002746582 | 4.4160127E-4 | 0.0089850575 | 0.0058790995 |
| −0.0152634755 | −0.028822266 | −0.0152634755 | 0.0058790995 | 0.0089850575 |
| 4.4160127E-4 | −0.002746582 | −9.3457033E-4 | | |
| −2.803711E-4 | −0.0014826172 | −0.0025060547 | 4.4160127E-4 | 0.008078808 |
| 0.015216015 | 0.017765235 | 0.015216015 | 0.008078808 | 4.4160127E-4 |
| −0.0025060547 | | | | |
| −0.0014826172 | −2.803711E-4 | | | |
| −5.0976563E-5 | −4.2353515E-4 | −0.0014826172 | −0.002746582 | |
| −0.0026513673 | | | | |
| −8.548829E-4 | 3.1992188E-4 | −8.548829E-4 | −0.0026513673 | |
| −0.002746582 | | | | |
| −0.0014826172 | −4.2353515E-4 | −5.0976563E-5 | | |
| −4.248047E-6 | −5.0976563E-5 | −2.803711E-4 | −9.3457033E-4 | |
| −0.0021027832 | | | | |
| −0.003364453 | −0.0039251954 | −0.003364453 | −0.0021027832 | |
| −9.3457033E-4 | | | | |
| −2.803711E-4 | −5.0976563E-5 | −4.248047E-6 | | |

The following is a program listing used in conjunction with the Common LISP programming language, and the OBVIUS version 1.2 image processing computer program, available from the MIT Media Lab Vision and Modeling Group, 20 Ames Street, Massachusetts Institute of Technology, Cambridege, Mass.:

```
;;;;;;;;;;;;;;;
;;; sept. 18, 1991  William T. Freeman
;;; Program to apply noise reduction technique to images.
;;; came from /u/freeman/lisp/pyr/enhance.lisp ;;; load auxiliary functions.
(compile-load "steer.lisp")
(compile-load "new-steer-pyramid-va.lisp")
(compile-load "enhance-aux.lisp")
(compile-load "fun.lisp")

;;; image to be cleaned
(load-image  "/v/images/freeman/pyramid/noisyrobert")
;;; make steerable pyramid
(setq noisy-rob-pyr (make-steerable-pyramid noisyrobert))

;;; Set anisotropy and energy strength threshold levels for the noise reduction,
;;; and set the "sharpness" parameters for use in the soft thresholds.  Rank
;;; is a parameter which is not used in the version shown here.
;;; Parameters for version 3:
;;; for version 3:  what the enhancement list means:
;;; position 0 in th
``` e list: anisotropy threshold    position 1: anisotropy sharpness for sigmoids
;;; position 2: level 0 energy threshold   3: sharpness for energy sigmoids
;;; 4: nil 5: nil
;;; 6: rank0clip for level 1   7: : rank1clip for level 1
;;; 8: rank0clip for level 2   9: : rank1clip for level 2

;;; so to make a version which is independent of rank, make
;;; sure 6th parameter = 7th parmaeter, and
;;; 8th parameter = 9th parmaeter.

;;; and:  just use 4 orientations, as descirbed in the patent.
(setq enhancement (list 0.57 15 40       0.5   nil nil 3.0 3.0   2.5 2.5) version 3 level 2)
(odd-enhance-collapse noisy-rob-pyr level enhancement  :num-steps 4 :version 3
                :debug t :debug-list '(128 147) :-> 'processed)

;;; this looks fine.  As a matter of fact, it is visually indistinguishable from
;;; the earlier way I did it, including rank variations.

```
;;; -*- Package: OBVIUS; Syntax: Common-lisp -*-
;;;;;;;;;;;;;;;;;;;;;;;;;;;;;;;;;;;;;;;;;;;;;;;;;;;;;;;;;;;;;;;;;;;;;;;;;;;;
;;;  File: steer.lisp
;;;  Author: David Heeger and Bill Freeman
;;;  Description: steerable filters and quadrature-steerable filters
;;;  Creation Date: summer '89
;;;  ---------------------------------------------------------------
;;;     Object-Based Vision and Image Understanding System (OBVIUS),
;;;        Copyright 1988, Vision Science Group,  Media Laboratory,
;;;               Massachusetts Institute of Technology.
;;;;;;;;;;;;;;;;;;;;;;;;;;;;;;;;;;;;;;;;;;;;;;;;;;;;;;;;;;;;;;;;;;;;;;;;;;;;
;;; revisions history:  Feb. 2, 1991  Freeman added steer-filter-list.
;;;                     March 26, 1991  freeman added    make-avg-steerable-filters
;;;                     and *avg-steerable-filters*.
;;;                     July 11, 1991  freeman commented-out *avg-steerable-filters*,
;;;                            because I don't use it and it slowed-down load-in.

(in-package 'obvius)
(export '(*default-even-steerable-filters* *default-odd-steerable-filters*
          make-g1-steerable-filters
          make-g4-steerable-filters make-h4-steerable-filters
          make-avg-steerable-filters
          steerable-basis steerable-basis-p separable-steerable-basis-p
          make-steerable-basis even-steerable-basis odd-steerable-basis
          filter-list image-list order
          dimensions x-dim y-dim minimum maximum range
          steer quadrature-steerable-basis make-quadrature-steerable-basis
          steer-even steer-odd sum-even sum-odd magnitude square-magnitude
          complex-phase average-energy steer-filter-list
          sample-1d sample-2d))

;;;;;;;;;;;;;;;;;;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;;;;;;;;;;;;;;;;;;

;;; DEFAULT STEERABLE FILTERS
;;; 2nd derivs of Gaussians
;;; and their Hilbert transforms.

(defun sample-1d (function &key (window-size 9) (delx 1.0))
  (let ((kernel (make-array (list window-size) :element-type 'float))
        (x (- (floor window-size 2))))
    (loop for i from 0 below (array-dimension kernel 0) do
          (setf (aref kernel i) (funcall function (* delx x)))
          (setq x (+ 1.0 x)))
```

```
 kernel))

;;; 2nd derv of gaussian filters.   The polynomial functions:
(defun g2.poly (x)(* (exp (* x x -1.0)) (*
                                         .92132
                                         (+
                                          (* 2.0 (expt x 2))
                                          -1.0))))
(defun g2.gauss (x)(exp (* x x -1.0)))
(defun g2.diag (x)(* (exp (* x x -1.0)) (* 1.35744 x )))

;;; hilbert transforms of 2nd deriv of gaussian filters.   Polynomial forms.
(defun h3.hila (x)(* (exp (* x x -1.0)) (*
                                         .97796
                                         (+
                                          (* -2.2544 x)
                                          (expt x 3)))))
(defun h3.hilb (x) (exp (* x x -1.0)))
(defun h3.minusx (x)(* (exp (* x x -1.0))  x ))
(defun h3.minusy (x)(* (exp (* x x -1.0)) (* .97796
                                            (+
                                             (expt x 2)
                                             -0.751465))))
(defun make-default-even-steerable-filters ()
  (let ((n2dgpoly (make-filter (sample-1d 'g2.poly :window-size 9 :delx 0.67)))
        (n2dggauss (make-filter (sample-1d 'g2.gauss :window-size 9 :delx 0.67)))
        (n2diag (make-filter (sample-1d 'g2.diag :window-size 9 :delx 0.67))))
    (list (make-separable-filter n2dggauss n2dgpoly
                                 :edge-handler "treflect")
          (make-separable-filter n2diag n2diag
                                 :edge-handler "treflect")
          (make-separable-filter n2dgpoly n2dggauss
                                 :edge-handler "treflect"))))

(defun make-default-odd-steerable-filters ()
  (let ((n3hila (make-filter (sample-1d 'h3.hila :window-size 9 :delx 0.67)))
        (n3hilb (make-filter (sample-1d 'h3.hilb :window-size 9 :delx 0.67)))
        (n3minusy (make-filter (sample-1d 'h3.minusy :window-size 9 :delx 0.67)))
        (n3minusx (make-filter (sample-1d 'h3.minusx :window-size 9 :delx 0.67))))
    (list (make-separable-filter n3hilb n3hila
                                 :edge-handler "treflect")
          (make-separable-filter n3minusx n3minusy
                                 :edge-handler "treflect")
          (make-separable-filter n3minusy n3minusx
```

```
                              :edge-handler "treflect")
        (make-separable-filter n3hila n3hilb
                              :edge-handler "treflect"))))

;;; 2nd derivative of Gaussian filters  (normalized)
(defvar *default-even-steerable-filters* (make-default-even-steerable-filters))

;;; Hilbert transform of 2nd derivative of Gaussian filters  (normalized)
(defvar *default-odd-steerable-filters* (make-default-odd-steerable-filters))

;;;;;;;;;;;;;;;;;;;;;;;;;;;;;;;;;;;;;;;;;;;;;;;;;;;;;;;;;;;;;;;;;;;;;;;;;;;;;
;;; STEERABLE 1ST DERIVATIVE OF GAUSSIAN
;;; Sept. 27, 1989

;;; from loading ~/mtca/defns.m  into mathematica, and evaluating N[normderivgauss2d[x,y,1]],
;;; we find the normalization required for the integral of 1st deriv of Gaussian to equal 1.
(defun g1.poly (x)(* (exp (* x x -1.0)) (* x -1.59577)))
(defun g1.gauss (x)(exp (* x x -1.0)))

(defun make-g1-steerable-filters ()
  (let ((n1dgpoly (make-filter (sample-1d 'g1.poly :window-size 9 :delx 0.67)))
        (n1dggauss (make-filter (sample-1d 'g1.gauss :window-size 9 :delx 0.67))))
    (list (make-separable-filter n1dggauss n1dgpoly
                                :edge-handler nil)
          (make-separable-filter n1dgpoly n1dggauss
                                :edge-handler nil))))

;;;;;;;;;;;;;;;;;;;;;;;;;;;;;;;;;;;;;;;;;;;;;;;;;;;;;;;;;;;;;;;;;;;;;;;;;;;;;

;;; DEFINE STEERABLE 4TH DERIVATIVE OF GAUSSIAN, AND STEERABLE 5TH ORDER FIT TO
;;; ITS HILBERT TRANSFORM
;;; August 27, 1989 Bill Freeman created from ~freeman/lisp/steer/steerables.lisp,
;;;                                and ~freeman/mtca/sepout.  See also Vision Science
;;;                                Technical Report #118.
;;; x-y separable Gaussian derivatives, order 4
(defun g4.4y (y)
       (* 1.24585 (exp (* y y -1.0)) (+ .75 (* y y -3.0) (expt y 4))))

(defun g4.4x (x)(exp (* x x -1.0)))

(defun g4.3x (x)(* 1.24585 x (exp (* x x -1.0))))
(defun g4.3y (y)(* (exp (* y y -1.0)) (+ (* y -1.5) (expt y 3))))

(defun g4.2x (x)(* 1.116176 (exp (* x x -1.0)) (+ (* x x) -0.5)))
(defun g4.2y (y)(* 1.116176 (exp (* y y -1.0)) (+ (* y y) -0.5)))
```

```
(defun g4.1y (y)(* 1.24585 y (exp (* y y -1.0))))
(defun g4.1x (x)(* (exp (* x x -1.0)) (+ (* x -1.5) (expt x 3))))

(defun g4.0x (x)(* 1.24585 (exp (* x x -1.0)) (+ .75 (* x x -3.0) (expt x 4))))
(defun g4.0y (y)(exp (* y y -1.0)))

;;; x-y separable order 5 Hilbert transforms of order 4 Gaussian derivatives (defun h4.5y (y)(* 0.39752 (exp (* y y -1.0)) (+
                                              (expt y 5)
                                              (* (expt y 3) -7.5014)
                                              (* y 7.1891))))
(defun h4.5x (x)(exp (* x x -1.0)))

(defun h4.4y (y)(* 0.39752 (exp (* y y -1.0)) (+
                                              (expt y 4)
                                              (* (expt y 2) -4.501)
                                              1.4378)))
(defun h4.4x (x)(* x (exp (* x x -1.0))))

;;; ;; non-separable version of h4.3
;;; (defun h4.3yx (y x)(* 0.39752 (exp (+ (* x x -1.0) (* y y -1.0)))
;;;                      (+
;;;                       (* 1.4378 y)
;;;                       (* x x y -2.25043)
;;;                       (* (expt y 3) -.750143)
;;;                       (* (expt y 3) (expt x 2)))))
;;;

;; separable (approximate) version of h4.3
(defun h4.3y (y)(* 0.39752 (exp (* y y -1.0)) (+
                                              (expt y 3)
                                              (* y -2.225))))
(defun h4.3x (x)(* (exp (* x x -1.0))
                   (+
                    (sqr x)
                    -.6638)))

;;; ;; non-separable version of h4.2
;;; (defun h4.2yx (y x)(* 0.39752 (exp (+ (* y y -1.0) (* x x -1.0)))
;;;                      (+
;;;                       (* 1.4378 x)
;;;                       (* y y x -2.25043)
```

```
;;;                    (* (expt x 3) -.750143)
;;;                    (* (expt x 3) (expt y 2)))))
;;;

;;; approximately separable version of h4.2
(defun h4.2x (x)(* 0.39752 (exp (* x x -1.0)) (+
                                                (expt x 3)
                                                (* x -2.225))))
(defun h4.2y (y)(* (exp (* y y -1.0))
                   (+
                    (sqr y)
                    -.6638)))

(defun h4.1x (x)(* 0.39752 (exp (* x x -1.0)) (+
                                                (expt x 4)
                                                (* (expt x 2) -4.501)
                                                1.4378)))
(defun h4.1y (y)(* y (exp (* y y -1.0))))

(defun h4.0x (x)(* 0.39752 (exp (* x x -1.0)) (+
                                                (expt x 5)
                                                (* (expt x 3) -7.5014)
                                                (* x 7.1891))))
(defun h4.0y (y)(exp (* y y -1.0)))

;;; Following is only needed when use the more exact, non-separable function
;;; definition for h4.3 and h4.2
;;; (defun sample-2d (function &key
;;;                            (y-window-size 9)
;;;                            (x-window-size 9)
;;;                            (delx 1.0)
;;;                            (dely 1.0))
;;;    (let ((kernel (make-array (list y-window-size x-window-size) :element-type 'float)))
;;;      (loop for y = (* dely (- (floor y-window-size 2))) then (incf y dely)
;;;            for j from 0 below (array-dimension kernel 0) do
;;;         (loop for x = (* delx (- (floor x-window-size 2))) then (incf x delx)
;;;               for i from 0 below (array-dimension kernel 1) do
;;;            (setf (aref kernel j i) (funcall function y x))))
;;;      kernel))
```

```
(defun make-g4-steerable-filters ()
  (list
    (make-separable-filter
      (make-filter (sample-1d 'g4.0y :window-size 13 :delx 0.5))
      (make-filter (sample-1d 'g4.0x :window-size 13 :delx 0.5))
      :edge-handler "treflect")
    (make-separable-filter
      (make-filter (sample-1d 'g4.1y :window-size 13 :delx 0.5))
      (make-filter (sample-1d 'g4.1x :window-size 13 :delx 0.5))
      :edge-handler "treflect")
    (make-separable-filter
      (make-filter (sample-1d 'g4.2y :window-size 13 :delx 0.5))
      (make-filter (sample-1d 'g4.2x :window-size 13 :delx 0.5))
      :edge-handler "treflect")
    (make-separable-filter
      (make-filter (sample-1d 'g4.3y :window-size 13 :delx 0.5))
      (make-filter (sample-1d 'g4.3x :window-size 13 :delx 0.5))
      :edge-handler "treflect")
    (make-separable-filter
      (make-filter (sample-1d 'g4.4y :window-size 13 :delx 0.5))
      (make-filter (sample-1d 'g4.4x :window-size 13 :delx 0.5))
      :edge-handler "treflect")))

(defun make-h4-steerable-filters ()
  (list
    (make-separable-filter
      (make-filter (sample-1d 'h4.0y :window-size 13 :delx 0.5))
      (make-filter (sample-1d 'h4.0x :window-size 13 :delx 0.5))
      :edge-handler "treflect")
    (make-separable-filter
      (make-filter (sample-1d 'h4.1y :window-size 13 :delx 0.5))
      (make-filter (sample-1d 'h4.1x :window-size 13 :delx 0.5))
      :edge-handler "treflect")
    (make-separable-filter
      (make-filter (sample-1d 'h4.2y :window-size 13 :delx 0.5))
      (make-filter (sample-1d 'h4.2x :window-size 13 :delx 0.5))
      :edge-handler "treflect")
    (make-separable-filter
      (make-filter (sample-1d 'h4.3y :window-size 13 :delx 0.5))
      (make-filter (sample-1d 'h4.3x :window-size 13 :delx 0.5))
      :edge-handler "treflect")
    (make-separable-filter
      (make-filter (sample-1d 'h4.4y :window-size 13 :delx 0.5))
      (make-filter (sample-1d 'h4.4x :window-size 13 :delx 0.5))
```

```
     :edge-handler "treflect")
   (make-separable-filter
     (make-filter (sample-1d 'h4.5y :window-size 13 :delx 0.5))
     (make-filter (sample-1d 'h4.5x :window-size 13 :delx 0.5))
     :edge-handler "treflect")))

;;;;;;;;;;;;;;;;;;;;;;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;;;;;;;;;;;;;;;;;;;;;;
;;; this is for a set of steerable filters which average along a particular direction.

;;; sample a function in 2-d and make a filter out of the result.
(defun sample-2d (function  &key
                               (y-window-size 9)
                               (x-window-size 9)
                               (delx 1.0)
                               (dely 1.0))
  (let ((kernel (make-array (list y-window-size x-window-size) :element-type 'single-float)))
    (loop for y = (* dely (- (floor y-window-size 2))) then (incf y dely)
          for j from 0 below (array-dimension kernel 0) do
          (loop for x = (* delx (- (floor x-window-size 2))) then (incf x delx)
                for i from 0 below (array-dimension kernel 1) do
                (setf (aref kernel j i) (float (funcall function y x )))))
    kernel))

;;; a steerable filter to perform angularly adaptive local averaging
;;; returns:  Cos(theta - theta-offset)^cos-power  exp(-r^2/(2 sigma^2)),
;;; where r = sqrt(x^2 + y^2), and theta = the usual arctan(y/x).
;;; Assumes cos-power is an even integer, so it takes abs to fix a numerical problem.
;;; Note:  play with symmetries (like atan y x  vs  atan x y) until get the
;;;        desired starting angle, and direction of rotation.
(defun avg-filter (theta-offset cos-power sigma y x &key (debug nil))
  (let ((r (sqrt (+ (* x x) (* y y))))
        (theta (if (and (= 0.0 x) (= 0.0 y))
                   0.0
                   (atan x y)))
        (out nil))
    (format debug "y ~d  x ~d  theta ~d  r ~d~%"
            y x theta r)
    (setq out (* (expt (abs (cos (- theta theta-offset))) cos-power)
                 (exp (/ (* -1.0 r r)
                         (* 2 (* sigma sigma))))))
    (format debug "out ~d ~%" out)
    out))
```

```
;;; function chooses the cosine power for the filter response based on
;;; the number of filters chosen for the steerable basis.
;;; Normalize this so that, ignoring the sampling effects, the function will
;;; have a unity DC value.  See p. 262 wtf loose red notebook.
;;; integral cos^N theta   exp(-r^2 / (2 sigma^2)   r d theta  d r
;;; =  (using abramowitz and stegun, p. 77 4.3.127, and p. 302, 7.4.5)
;;;  2 pi 1/2  3/4  5/6 ...  N-1/N    times  sigma^2.
;;; In practise, norm was within 3%, for a 9x9 filter.  I think that's ok.
(defun make-avg-steerable-filters (&key
                                    (n-filts 5)
                                    (sigma 2.0)
                                    (del 1.0)
                                    (size 9))
  (let* ((cos-power (1- n-filts))
         (norm (norm-avg-integral cos-power sigma)))
    (loop for i from 0 below n-filts collect
          (make-filter (sample-2d #'(lambda (y x)
                                      (/ (avg-filter (* i (/ pi n-filts)) cos-power sigma y x)
                                         :x-window-size size :y-window-size size
                                         :delx del :dely del)
                          :edge-handler "treflect"))))

;;; an auxiliary function to compute normalization for steerable blurring filters.
(defun norm-avg-integral (order sigma)
  (if (= order 2)
      (* pi sigma sigma)
      (/ (* (1- order) (norm-avg-integral (- order 2) sigma)) order)))

;;; (defvar *avg-steerable-filters* (make-avg-steerable-filters))

;;;;;;;;;;;;;;;;;;;;;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;;;;;;;;;;;;;;;;;;;;;

;;; STEERABLE BASIS OBJECT (DEFCLASS steerable-basis (viewable)
  (image-list
   filter-list)
  (:accessor-prefix ))

(defmacro steerable-basis-p (obj)
  `(typep ,obj 'steerable-basis))
```

```
(defmethod separable-steerable-basis-p ((steerable steerable-basis))
  (every '(lambda (x) (separable-filter-p x)) (filter-list steerable)))

;;; the input to this can be either an image, or a list of images
(defun make-steerable-basis (image
                             &key (filter-list *default-even-steerable-filters*)
                                  (display-type t)
                                  ((:-> name)))
  (when (viewable-p name) (error "Can not pass exisiting viewable to make-<vbl> functions"))
  (let* ((image-list (cond ((image-p image)
                            (loop for filter in filter-list
                                  collect (apply-filter filter image)))
                           ((listp image)
                            image)
                           (t (error "Input must be either an image or a list or images"))))
         (steerable (make-instance 'steerable-basis
                                   :filter-list filter-list
                                   :image-list image-list
                                   :display-type display-type)))
    (dolist (im image-list) (push steerable (superiors-of im)))
    (set-history steerable 'make-steerable-basis image :filter-list filter-list)
    (set-name steerable name)
    steerable))

(defmethod default-display-type ((steerable steerable-basis) (pane pane))
  (if (= (depth pane) 1)
      nil
      'pasteup))

(defmethod inferiors-of ((steerable steerable-basis))
  (image-list steerable))

(defmethod notify-of-inferior-destruction ((steerable steerable-basis) sub-image)
  (cerror "Destroy both ~A and ~A."
          "You are attempting to destroy ~A which is contained in ~A."
          sub-image steerable)
  (destroy steerable))

(defmethod order ((steerable steerable-basis))
  (1- (length (filter-list steerable))))

(defmethod dimensions ((steerable steerable-basis))
  (dimensions (car (image-list steerable))))
```

```
(defmethod x-dim ((steerable steerable-basis))
  (x-dim (car (image-list steerable))))

(defmethod y-dim ((steerable steerable-basis))
  (y-dim (car (image-list steerable))))

(defmethod minimum ((steerable steerable-basis))
  (loop for im in (image-list steerable)
        minimize (the single-float (minimum im))))

(defmethod maximum ((steerable steerable-basis))
  (loop for im in (image-list steerable)
        maximize (the single-float (maximum im))))

(defmethod range ((steerable steerable-basis))
  (- (the single-float (maximum steerable))
     (the single-float (minimum steerable))))

(defmethod sum ((steerable steerable-basis) &key ->)
  (with-result-image ((res ->) (dimensions steerable)
                      'sum steerable)
    (loop for im in (image-list steerable) do
          (add im res :-> res))))

;;;;;;;;;;;;;;;;;;;;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;;;;;;;;;;;;;;;;;;;;

;;; STEERING FUNCTIONS FOR EACH DIFFERENT ORDER

;;; *** Bill, please write this ***
(defmethod steer ((steerable steerable-basis) angle
                  &key ->)
  (with-result-image ((result ->) (dimensions steerable)
                      'steer steerable angle)
    (if (separable-steerable-basis-p steerable)
        (case (order steerable)             ; separable steerable
          (1 (steer-separable-1 (image-list steerable) angle result))
          (2 (steer-separable-2 (image-list steerable) angle result))
          (3 (steer-separable-3 (image-list steerable) angle result))
          (4 (steer-separable-4 (image-list steerable) angle result))
          (5 (steer-separable-5 (image-list steerable) angle result)))
        (case (order steerable)             ; non-separable steerable
          (1 nil)
          (2 nil)
          (3 (steer-3 (image-list steerable) angle result))
```

```
            (4 (steer-4 (image-list steerable) angle result))
            (5 nil))
      )))

;;;;;;;; steering functions for images made with x-y separable filters:  ;;;;;;;;;

(defun steer-separable-1 (image-list angle result)
  (with-local-images ((a (make-image (dimensions (car image-list))))
                      (b (make-image (dimensions (car image-list)))))
    (cond ((image-p angle)
           (point-operation angle 'sin :-> a);; sin-angle
           (point-operation angle 'cos :-> b);; cos-angle
           (mul (nth 0 image-list) b :-> result) ;;; cos * image
           (mul (nth 1 image-list) a :-> b)      ;;; sin * image
           (sub result b :-> result))
          (t
           (mul (nth 0 image-list) (cos angle) :-> a)   ;;; cos * image
           (mul (nth 1 image-list) (sin angle) :-> b)   ;;; sin * image
           (sub a b :-> result)))))

(defun steer-separable-2 (image-list angle result)
  (with-local-images ((a (make-image (dimensions (car image-list))))
                      (b (make-image (dimensions (car image-list))))
                      (c (make-image (dimensions (car image-list))))
                      (d (make-image (dimensions (car image-list))))
                      (e (make-image (dimensions (car image-list)))))
    (cond ((image-p angle)
           (point-operation angle 'sin :-> a);; sin-angle
           (point-operation angle 'cos :-> b);; cos-angle
           (square b :-> c);; cos-sqr
           (mul (nth 0 image-list) c :-> result);; h-part
           (square a :-> c);; sin-sqr
           (mul (nth 2 image-list) c :-> d);; v-part
           (add d result :-> result);; h-part + v-part
           (mul a b :-> c);; sin-cos
           (mul c -2.0 :-> c);; -2 sin-cos
           (mul c (nth 1 image-list) :-> d);; d-part
           (add result d :-> result))
          (t
           (mul (nth 0 image-list) (expt (cos angle) 2) :-> a);; h-part
           (mul (nth 1 image-list) (* -2.0 (sin angle) (cos angle)) :-> b);;d-part
           (mul (nth 2 image-list) (expt (sin angle) 2):-> c);; v-part
           (add a c :-> result)
           (add b result :-> result)))))
```

```
(defun steer-separable-3 (image-list angle result)
  (with-local-images ((a (make-image (dimensions (car image-list))))
                      (b (make-image (dimensions (car image-list))))
                      (c (make-image (dimensions (car image-list))))
                      (d (make-image (dimensions (car image-list))))
                      (e (make-image (dimensions (car image-list))))
                      (f (make-image (dimensions (car image-list)))))
    (cond ((image-p angle)
           (point-operation angle 'sin :-> a);; sin-angle
           (point-operation angle 'cos :-> b);; cos-angle
           (square b :-> c);; cos-sqr
           (mul c b :-> f);; cos-cube
           (mul c a :-> d);; cos-sqr-sin
           (mul (nth 1 image-list) d :-> e);; d2-part
           (square a :-> c);; sin-sqr
           (mul b c :-> d);; cos-sin-sqr
           (mul (nth 2 image-list) d :-> d);; d1-part
           (mul (sub d e :-> d) 3.0 :-> result)
           (mul (nth 0 image-list) f :-> f);; h-part
           (mul c a :-> c);; sin-cube
           (mul (nth 3 image-list) c :-> c);; v-part
           (sub f c :-> f);; "sub h-part v-part :-> h-part"
           (add f result :-> result))
          (t
           (mul (nth 0 image-list) (expt (cos angle) 3) :-> a)   ;; h-part
           (mul (nth 3 image-list) (expt (sin angle) 3) :-> b)   ;; v-part
           (mul (nth 2 image-list) (* 3.0 (expt (sin angle) 2) (cos angle)) :-> c) ;;d1-part
           (mul (nth 1 image-list) (* 3.0 (sin angle) (expt (cos angle) 2)) :-> d) ;; d2-part
           (add (sub a b :-> a)
                (sub c d :-> c) :-> result)))))

;;; see vision science technical report for the steering formulas
(defun steer-separable-4 (image-list angle result)
  (with-local-images ((a (make-image (dimensions (car image-list))))
                      (b (make-image (dimensions (car image-list))))
                      (c (make-image (dimensions (car image-list))))
                      (d (make-image (dimensions (car image-list))))
                      (e (make-image (dimensions (car image-list))))
                      (f (make-image (dimensions (car image-list))))
                      (g (make-image (dimensions (car image-list)))))
    (cond ((image-p angle)
           (point-operation angle 'sin :-> a)   ;; sin-angle
           (point-operation angle 'cos :-> e)   ;; cos-angle
           (square a :-> b)      ;; sin^2
```

```
            (mul b a :-> c)         ;; sin^3
            (square b :-> d)        ;; sin^4          d
            (mul e c :-> c)         ;; sin^3 cos      c
            (square e :-> f)        ;; cos^2
            (mul f b :-> b)         ;; cos^2 sin^2    b
            (mul e f :-> g)         ;; cos^3
            (mul g a :-> a)         ;; cos^3 sin      a
            (square f :-> g)        ;; cos^4          g
            (mul a -4.0 :-> a)      ;; -4sincos^3     a
            (mul b 6.0 :-> b)       ;; 6sin^2 cos^2   b
            (mul c -4.0 :-> c)      ;; -4sin^3 cos    c
            (mul (nth 0 image-list) g :-> g);;        g
            (mul (nth 1 image-list) a :-> a);;        a
            (mul (nth 2 image-list) b :-> b);;        b
            (mul (nth 3 image-list) c :-> c);;        c
            (mul (nth 4 image-list) d :-> d);;        d
            (add g a :-> e);; cos^4 + 4 cos^3 sin
            (add b c :-> f);; 6 sin^2 cos^2 -4 sin^3 cos
            (add e f :-> a);; cos^4 + 4 cos^3 sin + 6 sin^2 cos^2 -4 sin^3 cos
            (add a d :-> result));; cos^4 + 4 cos^3 sin + 6 sin^2 cos^2 -4 sin^3 cos + sir
           (t
            (mul (nth 0 image-list) (expt (cos angle) 4) :-> a)
            (mul (nth 1 image-list) (* -4.0 (sin angle) (expt (cos angle) 3)) :-> b)
            (mul (nth 2 image-list) (* 6.0 (sqr (cos angle)) (sqr (sin angle))) :-> c)
            (mul (nth 3 image-list) (* -4.0 (cos angle) (expt (sin angle) 3)) :-> d)
            (mul (nth 4 image-list) (expt (sin angle) 4) :-> e)
            (add a b :-> f)
            (add c d :-> g)
            (add f g :-> a)
            (add e a :-> result)))))

;;; see vision science technical report for the steering formulas
(defun steer-separable-5 (image-list angle result)
  (cond ((image-p angle)
         (with-local-images ((a (make-image (dimensions (car image-list))))
                             (b (make-image (dimensions (car image-list))))
                             (c (make-image (dimensions (car image-list))))
                             (d (make-image (dimensions (car image-list))))
                             (e (make-image (dimensions (car image-list))))
                             (f (make-image (dimensions (car image-list))))
                             (g (make-image (dimensions (car image-list))))))
           (point-operation angle 'sin :-> a)    ;; sin-angle
           (point-operation angle 'cos :-> b)    ;; cos-angle
           (square a :-> c)        ;; sin^2
           (mul c a :-> d)         ;; sin^3
```

```
        (square c :-> e)       ;; sin^4
        (mul c d :-> f)        ;; sin^5          f
        (mul b e :-> e)        ;; sin^4 cos      e
        (square b :-> g)       ;; cos^2
        (mul g d :-> d)        ;; cos^2 sin^3    d
        (mul g b :-> g)        ;; cos^3
        (mul g c :-> c)        ;; cos^3 sin^2    c
        (mul g b :-> g)        ;; cos^4
        (mul g a :-> a)        ;; cos^4 sin      a
        (mul g b :-> g)        ;; cos^5          g
        (mul a -5.0 :-> a)     ;; -5 cos^4 sin
        (mul c 10.0 :-> c)     ;; 10 cos^3 sin^2
        (mul d -10.0 :-> d)    ;; -10 cos^2 sin^3
        (mul e 5.0 :-> e)      ;; 5 cos sin^4
        (mul f -1.0 :-> f)     ;; -sin^5
        (mul (nth 0 image-list) g :-> g);;    g
        (mul (nth 1 image-list) a :-> a);;    a
        (mul (nth 2 image-list) c :-> c);;    c
        (mul (nth 3 image-list) d :-> d);;    d
        (mul (nth 4 image-list) e :-> e);;    e
        (mul (nth 5 image-list) f :-> f);;    f
        (add g a :-> b)        ;; cos^5 - 5 cos^4 sin
        (add c d :-> result)   ;; 10 cos^3 sin^2 + -10 cos^2 sin^3
        (add b result :-> result) ;; cos^5 - 5 cos^4 sin + 10 cos^3 sin^2 + -10
        (add e f :-> b)        ;; 5 cos sin^4 - sin^5
        (add b result :-> result)));; cos^5 - 5 cos^4 sin + 10 cos^3 sin^2 +
                               ;;    -10 cos^2 sin^3 + 5 cos sin^4 - sin^5
   (t
    (with-local-images ((a (make-image (dimensions (car image-list))))
                        (b (make-image (dimensions (car image-list))))
                        (c (make-image (dimensions (car image-list))))))
      (mul (nth 0 image-list) (expt (cos angle) 5) :-> a)
      (mul (nth 1 image-list) (* -5.0 (sin angle) (expt (cos angle) 4)) :-> b)
      (add a b :-> c)
      (mul (nth 2 image-list) (* 10.0 (expt (cos angle) 3) (sqr (sin angle))) :-
      (mul (nth 3 image-list) (* -10.0 (sqr (cos angle)) (expt (sin angle) 3))
      (add a b :-> result)
      (add c result :-> result)
      (mul (nth 4 image-list) (* 5.0 (cos angle) (expt (sin angle) 4)) :-> a)
      (mul (nth 5 image-list) (* -1.0 (expt (sin angle) 5)) :-> b)
      (add a b :-> c)
      (add c result :-> result)))))
```

```
;;;;;;;; steering functions for images made with x-y non-separable filters:  ;;;;;;;;

;;; non-separable, 3rd order polynomial filters.  See ~freeman/mtca/nonsepsteer.m
;;; for the formulae.
(defun steer-3 (image-list angle result)
  (with-local-images ((a (make-image (dimensions (car image-list))))
                      (b (make-image (dimensions (car image-list))))
                      (c (make-image (dimensions (car image-list))))
                      (d (make-image (dimensions (car image-list))))
                      (e (make-image (dimensions (car image-list)))))
    (cond ((image-p angle)
           (point-operation angle 'sin :-> a) ;; sin-angle
           (point-operation angle 'cos :-> b) ;; cos-angle
           (mul (square b :-> c) b :-> c) ;; cos cubed
           (sub (mul c 2 :-> c) b :-> e) ;; coefficient of 0th image
           (mul (nth 0 image-list) e :-> result)
           (mul (add a b :-> c) .7071 :-> c)   ;;; 0.707107*Cos[theta] + 0.707107*Sin[
           (mul c (square c :-> d) :-> d)  ;;; above, cubed
           (sub (mul d 2.0 :-> e) c :-> e) ;; coefficieint of 1st image
           (add (mul (nth 1 image-list) e :-> e) result :-> result) ;; running total
           (mul (square a :-> c) a :-> c) ;; sin cubed
           (sub (mul c 2 :-> c) a :-> e) ;; coefficient of 2nd image
           (add (mul (nth 2 image-list) e :-> e) result :-> result) ;; running total
           (mul (sub a b :-> c) .7071 :-> c)   ;;; 0.707107*Sin[theta] - 0.707107*Cos[
           (mul c (square c :-> d) :-> d)  ;;; above, cubed
           (sub (mul d 2.0 :-> e) c :-> e) ;; coefficieint of 3rd image
           (add (mul (nth 3 image-list) e :-> e) result :-> result)) ;; result
          (t
           (mul (nth 0 image-list)
                (- (* (expt (cos angle) 3) 2.0) (cos angle)) :-> result)
           (mul (nth 1 image-list)
                (- (* (expt (cos (- angle (/ pi 4))) 3) 2.0)
                   (cos (- angle (/ pi 4))))
                :-> a)
           (add a result :-> result)
           (mul (nth 2 image-list)
                (- (* (expt (cos (- angle (/ pi 2))) 3) 2.0)
                   (cos (- angle (/ pi 2))))
                :-> a)
           (add a result :-> result)
           (mul (nth 3 image-list)
                (- (* (expt (cos (- angle (* 3 (/ pi 4)))) 3) 2.0)
                   (cos (- angle (* 3 (/ pi 4)))))
                :-> a)
           (add a result :-> result)))))
```

```
(defun steer-4 (image-list angle result)
  (with-local-images ((a (make-image (dimensions (car image-list))))
                      (b (make-image (dimensions (car image-list))))
                      (c (make-image (dimensions (car image-list))))
                      (d (make-image (dimensions (car image-list))))
                      (e (make-image (dimensions (car image-list))))
                      (f (make-image (dimensions (car image-list)))))
    (cond ((image-p angle)
           (point-operation angle 'sin :-> a);; sin-angle
           (point-operation angle 'cos :-> b);; cos-angle
           (square b :-> c);; cos squared
           (square c :-> d);; cos 4th
           (add (mul c -2.4 :-> c) (mul d 3.2 :-> d) :-> d)
;;; - 2.4*Cos[theta]^2 + 3.2*Cos[theta]^4
           (add d 0.2 :-> e);; coefficient of 0th image
           (mul (nth 0 image-list) e :-> result)

(add (mul b .809017 :-> d) (mul a .587785 :-> c) :-> f);; cos + sin
           (square f :-> c);; sin + cos squared
           (square c :-> d);; sin + cos 4th
           (add (mul c -2.4 :-> c) (mul d 3.2 :-> d) :-> d)
           (add d 0.2 :-> e);; coefficient of 1st image
           (add (mul (nth 1 image-list) e :-> e) result :-> result)

(add (mul b 0.309017 :-> d) (mul a 0.951057 :-> c) :-> f);; cos + sin
           (square f :-> c);; sin + cos squared
           (square c :-> d);; sin + cos 4th
           (add (mul c -2.4 :-> c) (mul d 3.2 :-> d) :-> d)
           (add d 0.2 :-> e);; coefficient of 2nd image
           (add (mul (nth 2 image-list) e :-> e) result :-> result)

(add (mul b -0.309017 :-> d) (mul a 0.951057 :-> c) :-> f);; cos + sin
           (square f :-> c);; sin + cos squared
           (square c :-> d);; sin + cos 4th
           (add (mul c -2.4 :-> c) (mul d 3.2 :-> d) :-> d)
           (add d 0.2 :-> e);; coefficient of 2nd image
           (add (mul (nth 3 image-list) e :-> e) result :-> result)

(add (mul b -0.809017 :-> d) (mul a 0.587785 :-> c) :-> f);; cos + sin
           (square f :-> c);; sin + cos squared
           (square c :-> d);; sin + cos 4th
           (add (mul c -2.4 :-> c) (mul d 3.2 :-> d) :-> d)
           (add d 0.2 :-> e);; coefficient of 2nd image
           (add (mul (nth 4 image-list) e :-> e) result :-> result))
```

```
(t
 (mul (nth 0 image-list)
      (+ 0.2 (* -2.4 (expt (cos angle) 2)) (* 3.2 (expt (cos angle) 4)))
      :-> result)
 (mul (nth 1 image-list)
      (+ 0.2 (* -2.4 (expt (cos (- angle (/ pi 5))) 2))
         (* 3.2 (expt (cos (- angle (/ pi 5))) 4)))
      :-> a)
 (add a result :-> result)
 (mul (nth 2 image-list)
      (+ 0.2 (* -2.4 (expt (cos (- angle (* 2 (/ pi 5)))) 2))
         (* 3.2 (expt (cos (- angle (* 2 (/ pi 5)))) 4)))
      :-> a)
 (add a result :-> result)
 (mul (nth 3 image-list)
      (+ 0.2 (* -2.4 (expt (cos (- angle (* 3 (/ pi 5)))) 2))
         (* 3.2 (expt (cos (- angle (* 3 (/ pi 5)))) 4)))
      :-> a)
 (add a result :-> result)
 (mul (nth 4 image-list)
      (+ 0.2 (* -2.4 (expt (cos (- angle (* 4 (/ pi 5)))) 2))
         (* 3.2 (expt (cos (- angle (* 4 (/ pi 5)))) 4)))
      :-> a)
 (add a result :-> result)))))

;;;;;;;;;;;;;;;;;;;;;;;;;;;;;;;;;;;;;;;;;;;;;;;;;;;;;;;;;;;;;;;;;;;;;;;;;;;
;;; PASTEUP PICTURES FOR STEERABLE BASIS VIEWABLE (defmethod init-picture ((pic pasteup) (steerable steerable-basis))
  (setf (layout pic) (list 1 (1+ (order steerable))))
  (let ((dims (list (* (+ (border pic) (y-dim steerable))
                       (list-y-dim (layout pic)))
                    (* (+ (border pic) (x-dim steerable))
                       (list-x-dim (layout pic))))))
    (setf (data pic) (new-array dims :element-type 'bltable-byte))
    (setf (dimensions pic)
          (new-array-dimensions dims :element-type 'bltable-byte)))
  (setf (auto-scale-compound-images pic) *auto-scale-compound-images*)
  (setf (viewable pic) steerable)
  (pushnew pic (pictures-of steerable)))
```

```
   pic)

(defmethod present ((pic pasteup) (steerable steerable-basis))
  (when (or (not (listp (layout pic)))
            (not (and (>= (x-dim pic) (* (list-x-dim (layout pic))
                                         (+ (x-dim steerable) (border pic))))
                      (>= (y-dim pic) (* (list-y-dim (layout pic))
                                         (+ (y-dim steerable) (border pic)))))))
    (free-array (data pic))
    (init-picture pic steerable))
  (with-slots (data pedestal scale pane x-offset y-offset current) pic
    (let ((row (round (+ (/ (- (y-dim pane) (y-dim pic)) 2) y-offset)))
          (col (round (+ (/ (- (x-dim pane) (x-dim pic)) 2) x-offset))))
      (when (not (current-p pic))
        (rescale steerable pic)
        (setf current (current steerable)))
      (clear-pane pane)
      (if (auto-scale-compound-images pic)
          (pane-title-bar pane (format nil "~s auto-scaled" (name steerable)))
          (pane-title-bar pane
                          (format nil "(~S - ~a) * ~a" (name steerable)
                                  (prin1-to-string pedestal)
                                  (prin1-to-string scale))))
      (set-pane-cmap pane (colormap pic))
      (blt data (x-dim pic) (y-dim pic) 0 0 pane row col
           (x-dim pic) (y-dim pic) *pix-src* :current (current pic)))))

(defmethod rescale ((steerable steerable-basis) (pic pasteup))
  (with-slots (scale pedestal data) pic
    (let* ((new-scale
            (or scale
                (and *auto-scale-images* (/-0 255.0 (range steerable) 1.0))
                *gray-scale*))
           (new-pedestal
            (or pedestal
                (and *auto-scale-images* (minimum steerable))
                *gray-pedestal*)))
      (loop for x from 0 below (list-x-dim (layout pic)) do
        (loop for y from 0 below (list-y-dim (layout pic))
              while (< (+ x (* y (list-x-dim (layout pic))))
                       (1+ (order steerable))) do
              (status-line-message (format nil "Rescaling: (~d, ~d)" y x))
              (rescale-compound-image-into-8bit
                (nth (+ x (* y (list-x-dim (layout pic)))) (image-list steerable))
                data (screen-of (picture-pane pic))
```

```
                (auto-scale-compound-images pic)
                new-pedestal new-scale
                (* y (+ (border pic) (y-dim steerable)))
                (* x (+ (border pic) (x-dim steerable)))))))
       (setf scale new-scale
             pedestal new-pedestal))))

;;;;;;;;;;;;;;;;;;;;;;;;;;;;;;;;;;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;;;;;;;;;;;;;;;;;;;;;;;;;;;;;;;;;;

;;; QUADRATURE STEERABLE BASIS OBJECT (DEFCLASS quadrature-steerable-basis (viewable)
  (even-steerable-basis
   odd-steerable-basis)
  (:accessor-prefix ))

;;; note: no display type for these guys for now
;;; look at the even- or odd-steerable-basis inferiors
;;; to see the basis images.
(defun make-quadrature-steerable-basis
    (image &key (even-filters *default-even-steerable-filters*)
           (odd-filters *default-odd-steerable-filters*)
           (display-type nil)
           ((:-> name)))
  (when (viewable-p name) (error "Can not pass exisiting viewable to make-<vbl> functions"))
  (let* ((even-steerable (make-steerable-basis image :filter-list even-filters))
         (odd-steerable (make-steerable-basis image :filter-list odd-filters))
         (steerable (make-instance 'quadrature-steerable-basis
                                   :display-type display-type
                                   :even-steerable-basis even-steerable
                                   :odd-steerable-basis odd-steerable)))
    (push steerable (superiors-of even-steerable))
    (push steerable (superiors-of odd-steerable))
    (set-history steerable 'make-quadrature-steerable-basis image
                 :even-filters even-filters :odd-filters odd-filters)
    (set-name steerable name)
    steerable))

;;; if you try to destroy either the even- or odd-steerable-basis,
;;; continuable error allows you to destroy the whole quadrature-steerable-basis
(defmethod notify-of-inferior-destruction ((steerable quadrature-steerable-basis)
                                           sub-steerable)
  (cerror "Destroy  both ~A and ~A."
          "You are attempting to destroy ~A which is contained in ~A."
```

```
         sub-steerable steerable)
  (destroy steerable))

(defmethod inferiors-of ((steerable quadrature-steerable-basis))
  (list (even-steerable-basis.steerable) (odd-steerable-basis steerable)))

(defmethod dimensions ((steerable quadrature-steerable-basis))
  (dimensions (even-steerable-basis steerable)))

(defmethod order ((steerable quadrature-steerable-basis))
  (min (order (even-steerable-basis steerable))
       (order (odd-steerable-basis steerable))))

(defmethod x-dim ((steerable quadrature-steerable-basis))
  (x-dim (even-steerable-basis steerable)))

(defmethod y-dim ((steerable quadrature-steerable-basis))
  (y-dim (even-steerable-basis steerable)))

(defmethod steer-even ((steerable quadrature-steerable-basis) angle &key ->)
  (with-result-image ((res ->) (dimensions steerable)
                      'steer-even steerable angle)
    (steer (even-steerable-basis steerable) angle :-> res)))

(defmethod steer-odd ((steerable quadrature-steerable-basis) angle &key ->)
  (with-result-image ((res ->) (dimensions steerable)
                      'steer-odd steerable angle)
    (steer (odd-steerable-basis steerable) angle :-> res)))

(defmethod steer ((steerable quadrature-steerable-basis) angle &key ((:-> result)))
  (make-image-pair (list (steer-odd steerable angle)
                         (steer-even steerable angle))
                   :-> result))

(defmethod sum-even ((steerable quadrature-steerable-basis) &key ((:-> result)))
  (sum (even-steerable-basis steerable) :-> result))

(defmethod sum-odd ((steerable quadrature-steerable-basis) &key ((:-> result)))
  (sum (odd-steerable-basis steerable) :-> result))

(defmethod magnitude ((steerable quadrature-steerable-basis) angle
                      &key ((:-> result)))
  (magnitude (steer steerable angle) :-> result))

(defmethod square-magnitude ((steerable quadrature-steerable-basis) angle
```

```
                            &key ((:-> result)))
  (square-magnitude (steer steerable angle) :-> result))

(defmethod complex-phase ((steerable quadrature-steerable-basis) angle
                          &key ((:-> result)))
  (complex-phase (steer steerable angle) :-> result))

;;; In other functions, we want to be able to steer images,
;;; and have it just copy the result to the output.  The angle is irrelevant.
(defmethod steer ((im image) angle &key ->)
  (with-result-image ((res ->) (dimensions im)
                      'steer im angle)
    (copy im :-> res)))

;;; gives the integral over all angles of the orientated energy
(defmethod average-energy ((qsb quadrature-steerable-basis) &key ->)
  (with-result-image ((result ->) (dimensions qsb)
                      'average-energy qsb)
    (cond ((and (= (order (even-steerable-basis qsb)) 2)
                (= (order (odd-steerable-basis qsb)) 3))
           (get-average-energy-2-3 (image-list (even-steerable-basis qsb))
                                   (image-list (odd-steerable-basis qsb)) result)))))

(defun get-average-energy-2-3 (even-list odd-list result)
  (with-local-images (
                      (a (mul (nth 2 even-list) (nth 2 even-list)))
                      (b (mul (nth 0 even-list) (nth 0 even-list)))
                      (c (add a b))
                      (total (mul c 0.375)))
    (mul (nth 0 odd-list) (nth 0 odd-list) :-> a)
    (mul (nth 3 odd-list) (nth 3 odd-list) :-> b)
    (add a b :-> c)
    (mul c 0.3125 :-> a)
    (add a total :-> total)
    (mul (nth 1 odd-list) (nth 1 odd-list) :-> a)
    (mul (nth 2 odd-list) (nth 2 odd-list) :-> b)
    (add a b :-> c)
    (mul c 0.5625 :-> a)
    (add a total :-> total)
    (mul (nth 0 odd-list) (nth 2 odd-list) :-> a)
    (mul (nth 1 odd-list) (nth 3 odd-list) :-> b)
    (add a b :-> c)
    (mul c 0.375 :-> a)
    (add a total :-> total)
    (mul (nth 1 even-list) (nth 1 even-list) :-> a)
```

```
        (mul a 0.5 :-> b)
        (add b total :-> total)
        (mul (nth 0 even-list) (nth 2 even-list) :-> a)
        (mul a 0.25 :-> b)
        (add b total :-> result)))

#|
;;; *** Bill, please write this ***
(defmethod total-energy ((steerable quadrature-steerable-basis) &key ->)
  (with-result-image ((result ->) (dimensions steerable)
                      'total-energy steerable)
    stuff))

;;; *** we also need to write these (defmethod energy-vs-angle ((steerable quadrature-steerable-basis) j i
                             &key ->)
  ;; returns a discrete function
  )

(defmethod energy-peak ((steerable quadrature-steerable-basis)
                         &key ->)
  ;; returns image-pair with vector-field display-type
  )
|#

;;; a steering method for filters. This is more efficient sometimes than
;;; applying each filter to an image, and then steering the images. (if you
;;; only have one angle to which you are going to steer the results).
;;; This converts the filter-list to an image, steers the image, and then
;;; converts the result back to a filter.
;;; It seems that convolutions applied with the same image size as the filter
;;; give spurious results. You need a buffer of one pixel on a side. The
;;; proper things is to go in and fix the filtering code, but I don't want to
;;; touch that. So make a bigger temporary image, and then crop it back down.
;;; Steer the filter to pi more than the actual angle, because you want to
;;; transpose the filter when you apply it.
(defun steer-filter-list (filter-list angle &key ->)
  (with-result-filter ((result ->) (car filter-list) 'steer)
    (let* ((dim (dimensions (car filter-list)))
           (ydim (+
```

```
              2 (car dim)))
             (xdim (+ 2 (cadr dim))))
        (with-local-images ((imp (make-impulse (list ydim xdim)))
                            (sb (make-steerable-basis imp :filter-list filter-list))
                            (filter-image (steer sb (+ pi angle)))
                            (cropped (crop filter-image 1 1 (- ydim 2) (- xdim 2))))
          (copy (obvius::data cropped) :-> (kernel result)))))))
```

```
;;; enhance-aux.lisp  program containing function definitions for orientationally
;;; adaptive steerable pyramid "enhancement" functions.
;;; history:  nov. 18, 1990  freeman created.
;;;           Feb. 2, 1991   made a new version of odd-enhance-collapse, to do better
;;;                          orientationally adaptive filtering.
;;;           Feb. 3, 1991   inserted a new version of the weighting function, to play around so
;;;                          Made it just be a coring version.  (verion 3).
;;;           Feb. 4, 1991   Made a version 4, which uses the blurred squared value of the odd-s
;;;                          filter as the energy to core with.  This gets around the dc leakage
;;;                          problem of the even symmetry filters.
;;;           Feb. 6, 1991   Added code for random dot stereo pair generation.
;;;           Feb. 7, 1991   Put in more sophisticated get-weighting-factors.  take into account
;level, anisotropy,
;;;                          and rank.
;;;           Feb. 9, 1991   Add a version 2 to the get-weighting-factors function:  just look a
;;;                          and level, and ignore anisotropy.

;;; Function to do angularly adaptive filtering on a steerable pyramid.
;;; blur-level:  blur those energies to remove the interference effects.  a value of 1 is reaso
;;; debug-list is a y-offset, and an x-offset relative to the center of the image, in units of
;;; highest resolution pixels.
;;; num-steps    is the number of angular steps you take, when doing the angularly adaptive filt
;;;            Default:  if odd filt length is  N.  then response probably has highest freq N-
;;;                      So squared energy will have even angular freqs up to 2 (N-1).  So you
;;;                      need one more than that to make a steerable basis set, so 2N-1 sample
;; should do.
;;; The enhancements done are deteremined by the list enhancement passed to the function
;;; get-weighting factors, which decides how to penalize or reward the local anisotropy,
;;; energy level, and rank of the current angle's energy in the angular spectrum at this point.
;;; see get-weighting-factors for details.
(defun odd-enhance-collapse (pyr level enhancement
                             &key
                             (version 1)
                             (blur-level 1.0)
                             (num-steps (1- (* 2 (length (odd-filters pyr)))))
                             (debug nil)
                             (debug-list '(1 1))
                             ->)
  (with-result-image ((result ->) (dimensions (car (low-images pyr)))
                      'collapse pyr level)
    (with-local-images ((new-low (apply-filter (end-filter pyr) (access-low pyr (1+ level))))
                        (next-image (similar (access-low pyr level))))
      ;;; convert the pixel position values to offset from center values
      (let* ((xcenter (round (/ (cadr (dimensions (car (low-images pyr)))) 2)))
```

```
                    (ycenter (round (/ (car (dimensions (car (low-images pyr)))) 2)))
                    (x (- (cadr debug-list) xcenter))
                    (y (- (car debug-list) ycenter)))
               (format debug "debugging at level 0 position y = ~d  x = ~d ~%" (car debug-list)
                       (cadr debug-list))
               (odd-enhance-recursive-collapse pyr level enhancement new-low next-image result
                                           :version version
                                           :blur-level blur-level :num-steps num-steps
                                           :debug debug
                                           :debug-list (if (= level 0)
                                                           debug-list
                                                           (list y x))))))))

;;; odd-enhance-recursive-collapse:   collapse a steerable pyramid transform representatic
;;; image back to an image, but with some orientation "enhancement" filtering.  The
;;; enhancements done are deteremined by the list enhancement passed to the function
;;; get-weighting factors, which decides how to penalize or reward the local anisotropy,
;;; energy level, and rank of the current angle's energy in the angular spectrum at this
;;; see get-weighting-factors for details.
;;;
;;; blur-level:  blur those energies to remove the interference effects.  a value of 1 is
;;;
(defun odd-enhance-recursive-collapse (pyr level enhancement low-image next-image result
                                       &key
                                       (version 1)
                                       (blur-level 1.0)
                                       (num-steps)
                                       (debug nil)
                                       (debug-list '(1 1)))
    ;;; find the y and x values for debug printing
  (let* ((xcenter (round (/ (cadr (dimensions next-image)) 2)))
         (ycenter (round (/ (car (dimensions next-image)) 2)))
         (x (+ xcenter (round (/ (cadr debug-list) (expt 2 (1+ level))))))
         (y (+ ycenter (round (/ (car debug-list) (expt 2 (1+ level))))))
    (if (= level 0) (setq y (car debug-list) x (cadr debug-list)))
    (format debug "~% at level ~d, y = ~d, x = ~d ~%" level y x)
    (with-local-images ((weighting-factors (get-weighting-factors (access-qsb pyr level)
                                                         num-steps enhancement
                                                         :level level
                                                         :debug debug
                                                         :debug-list (list y x)
```

```
                                                          :version version))
                      (tmp (make-image (dimensions next-image)))
                      (tmp2 (make-image (dimensions next-image)))
                      (tmp-filter (copy (car (odd-filters pyr)))))
;;; now, expand out the pyramid, but weigh the bands by the ori energy.
(expand-filter (mul (low-filter pyr) 4.0) low-image :zero nil :-> next-image)
(loop for i from 0 below num-steps do
      (let ((angle (/ (* i pi) num-steps)))
        (expand-filter (steer-filter-list (odd-filters pyr) angle :-> tmp-filter)
                       (steer (odd-steerable-basis (access-qsb pyr level)) angle :-
                       :-> tmp)
        (mul tmp (frame i weighting-factors) :-> tmp)
        (format debug "weighting factor ~d at y = ~d and x = ~d : ~d ~%" i y x
                (iref (frame i weighting-factors) y x))
        (add tmp next-image :-> next-image)))
(if (zerop level)
    (copy next-image :-> result)
    (with-local-images ((new-next-image (similar (nth (1- level) (low-images pyr)))
      (odd-enhance-recursive-collapse pyr (1- level) enhancement next-image
                                      new-next-image result
                                      :version version
                                      :blur-level blur-level :num-steps num-steps
                                      :debug debug :debug-list debug-list)))))))

;;; function plots a frequency histogram of the two variables in y-im and x-im.
;;; other inputs:  y-max y-min x-max x-min.
(defun cartesian-histogram (y-im x-im &key
                                      (y-min 0.0) (y-max 1.0)
                                      (x-min 0.0) (x-max 1.0)
                                      (out-dims (dimensions y-im))
                                      (mask nil)
                                      ->)
  (with-result-image ((result ->) out-dims 'cartesian-histogram)
    (let* ((x-scale (/ (cadr out-dims) (- x-max x-min)))
           (y-scale (/ (car out-dims) (- y-max y-min)))
           (y-max-pel (1- (cadr out-dims)))
           (x-max-pel (1- (car out-dims)))
           (y-out 0)
           (x-out 0)
           (max-res 0.0))
      (loop-over-image-positions
          ((tmp y-im)) (y x)
        (cond ((or (null mask) (= (iref mask y x) 1.0))
```

```
            (setq x-out (round (* (- (iref x-im y x) x-min) x-scale)))
            ;;; remember that the y scale is inverted.
            (setq y-out (round (- y-max-pel (* (- (iref y-im y x) y-min) y-scale))))
            ;;; clip outputs to be within the histogram image size
            (setq x-out (max 0 (min x-max-pel x-out)))
            (setq y-out (max 0 (min y-max-pel y-out)))
            (setf (iref result y-out x-out) (1+ (iref result y-out x-out)))))))
      ;;; blur, and make boundary lines
      (blur result :-> result)
      (setq max-res (maximum result))
      (draw-line result 0 (floor x-max-pel 2) y-max-pel (floor x-max-pel 2) :val max-r
      (draw-line result (floor y-max-pel 2) 0 (floor y-max-pel 2) x-max-pel
                :val max-res :-> result))))

;;; plot the histogram of energy, anisotropy and rank, for a particular rank.
(defun plot-stats (stats rank e-min log-e-min log-e-max plot-dims &key ->)
  (with-result-image ((result ->) plot-dims 'plot-stats)
    (with-local-images ((tmp (make-image (dimensions stats)))
                        (energy (similar tmp)))
      (cond ((= rank 0)
             (copy (frame 1 stats) :-> energy))
            ((= rank 1)
             (add (frame 1 stats) (frame 2 stats) :-> energy))
            (t
             (div (frame 2 stats) 2.0 :-> tmp)
             (add (frame 1 stats) tmp :-> energy)))
      (clip energy e-min (maximum energy) :-> energy)
      (point-operation energy #'(lambda (x) (log x)) :-> energy)
      (cartesian-histogram energy (frame 0 stats)
                  :x-min 0.5 :x-max 1.25
                  :y-min log-e-min :y-max log-e-max :out-dims plot-dims :-> r ;;; function to read-out energy values from y image positions
;;; for plots made with plot-stats.
(defun energy-value (y-pos enplot-min enplot-max plot-dims)
  (exp (+ (* (/ (- (car plot-dims) y-pos) (car plot-dims))
             (- enplot-max enplot-min))
          enplot-min)))

;;; function to read-out anisotropy values from x image positions
;;; for plots made with plot-stats.
(defun anisotropy-value (x-pos plot-dims &key (x-min 0.5) (x-max 1.25))
  (+ (* (/ x-pos (cadr plot-dims))
```

```
         (- x-max x-min))
   x-min))

;;; Get the anisotropy measure, and the minimum energy value, and the difference
;;; between the min and the max energy value.  This is used by get-weighting factors.
;;;
;;; input:   qsb:   a quadrature steerable basis
;;;         num-steps:  number of steps in angle over which  you'll measure the energy.
;;;         noise:   a parameter just used to prevent blow-up when you operate on mathematic
;;uniform images.
;;;                 So add it to the square of the energy mean, before dividing by that num
;;;                 add it to the difference min - max energy, because later we will divide
;;number.
;;; output:   (frame 0 result):   anisotropy    a number from 0.5 to num-steps / 2.
;;;           (frame 1 result):   minimum energy over all angles
;;;           (frame 2 result):   difference between minimum and maximum energy, over all ang
;;;                               (during the calculation, frame 2 is used as temporary stora
;; maximum image.)
;;; the anisotropy of E(theta) is defined to be   variance / (2 * mean^2)
;;; see p. 37 yellow, wtf labbook 2.
;;; reversed the order of with-result and with-local-images so that with-result could know
;;; proper resolution to use for the result image sequence.  july 2, 1991
;;; Sept. 16, 1991 Add "tendler-mode", in which  in (frame 1 result) we store the energy
;;; at one particular orientation.  This is to make figures for the noise removal patent.
;;; To invoke it, use tendler-mode = index of desired orientation.

(defun get-statistics (qsb num-steps &key (blur-level 1) (noise 0.001)
                           (debug nil) (debug-list '(10 10))
                           (tendler-mode nil) ->)
   (with-local-images ((tmp (get-energy qsb 0.0 :blur-level blur-level :debug debug
                                    :debug-list debug-list))
                       (total (copy tmp))
                       (tendler (similar tmp))
                       (sq-total (square tmp))
                       (mask (greater-than tmp 0.0)))
      (with-result-image-sequence ((result ->) (append (list 3) (dimensions tmp)))
         ;;;
         ;;; set minimum image and maximum image (frames 1 and 2, respectively) values
         (copy tmp :-> (frame 1 result))
         (copy tmp :-> (frame 2 result))
         (dotimes (i (1- num-steps))
            (let ((angle (/ (* (1+ i) pi) num-steps)))
               (get-energy  qsb angle :blur-level blur-level :debug debug :debug-list debug-list
                  (if (and tendler-mode (= i tendler-mode)) (copy tmp :-> tendler))
```

```
            (min-image (frame 1 result) tmp :-> (frame 1 result))
            (max-image (frame 2 result) tmp :-> (frame 2 result))
            (add tmp total :-> total)
            (square tmp :-> tmp)
            (add tmp sq-total :-> sq-total)))
      ;;;
      ;;; compute anisotropy
      (if tendler-mode (copy tendler :-> (frame 1 result)))
      (square total :-> total)
      (add total noise :-> total)
      (div sq-total total :-> tmp)
      (mul tmp (/ num-steps 2.0) :-> (frame 0 result))
      (sub (frame 2 result) (frame 1 result) :-> (frame 2 result))
      (add (frame 2 result) noise :-> (frame 2 result)))))

;;; we'll vary how we get the oriented energy. sometimes we may want to
;;; use a quadrature steerable basis; other times, we'll want to just
;;; take one phase of a filter, and square and blur it.  So let's isolate
;;; this operation in a function call.
(defun get-energy (qsb angle &key
                       (blur-level 1)
                       (debug nil)
                       (debug-list '(10 10))
                       -> )
;;;   (with-result-image ((result ->) (dimensions qsb)))
;;; do the following to get the dimensions to be correct for odd sized images.  blur to le
;;;1 causes this;
;;; this hack will only work for blur levels 0 and 1.
  (with-result-image ((result ->) (list (* 2 (ceiling (car (dimensions qsb)) 2))
                                         (* 2 (ceiling (cadr (dimensions qsb)) 2))))
    (with-local-images ((tmp (steer (odd-steerable-basis qsb) angle)))
      (square tmp :-> tmp)
      (blur tmp :level blur-level :-> result)
      (format debug "energy at angle ~d , blurred to level ~d, is ~d ~%" angle blur-level
              (iref result (car debug-list) (cadr debug-list))))))

;;; Determines what enhancements are done to the image.  The list,
;;;   enhancement, governs the algorithm.
```

```
;;; The algorithm:  first, measure the anisotropy, the energy level in each direction
;;; and the rank (0 to 1) of each level among all angles at that position. (relative rank.
;;; .2 if you're .2 of the way from lowest energy to highest energy).
;;; Then, based on threshold and sharpness values for a sigmoidal thresholding function,
;;; get a 0 to 1 value at each position for anisotropy, and a 0 to 1 value at each position
;;; and at each angle for energy level and rank.  Then, based on those 3 numbers,
;;; decide how to weigh this particular sub-band in the reconstruction of the image.
;;; The particulars of the last step are determined by the  version  number of the algorithm
;;;
;;; inputs:  qsb:  a quadrature-steerable basis
;;;         blur-level:  how much the energy is blurred.  1 is good.
;;;         num-steps:   Angular resolution to take.  7 for a steerable basis of 4 filters.
;;;         version:  version number of the algorithm.
;;;           noise:  a number to keep divisions from blowing up in perfectly constant regions
;;;         enhancement:  a list:   anisotropy-threshold  anisotropy-sharpness
;;;                                 energy-threshold energy-sharpness
;;;                                 rank-threshold  rank-sharpness
;;;                    for version 2, you add to the end of that list:
;;;                                 level-thresh-for-rank0 level-thresh-for-rank1
;;;         level:  what level of the reconstruction you are at.  Sometimes, the
;;;                 reconstruction function will vary as a function of level.
;;;
;;;         version 1:  just choose high anisotropy and high rank parts, and ignore the rest.
;;;         version 2:  only look at level and rank.
;;;         version 3:  a reconstruction which depends on level.  namely:
;;; level 0:   at rank0: clip in anisotropy at 0.76953125
;;;            at rank1: clip in energy at 59.730558 y pel pos, in anisotropy at 0.76953125
;;;            ie, could clip at energy 59.730558, and at anisotropy 0.76953125, for all ranks
;;; level 1:   as in version 2:
;;;            at rank0, clip at energy  0.576499
;;;            at rank 1, clip at energy 3.080216
;;; level 2:   rank0:  clip in energy at 0.34424
;;;            rank1:  clip in energy at 2.70768
(defun get-weighting-factors (qsb blur-level num-steps enhancement &key
                              (version 1) (level 0)
                              (noise 0.001) (debug nil) (debug-list '(10 10)) ->)
  (with-result-image-sequence ((result ->) (append (list num-steps) (dimensions qsb)))
    (with-local-images ((stats (get-statistics qsb num-steps :blur-level blur-level :noise nc
                                               :debug debug :debug-list debug-list))
                        (anisotropy (make-image (dimensions qsb)))
                        (energy (make-image (dimensions qsb)))
                        (linear-rank (make-image (dimensions qsb)))
                        (tmp (make-image (dimensions qsb)))
                        (rank (make-image (dimensions qsb))))
      (format debug "measured anisotropy: ~d ~% " (iref (frame 0 stats) (car debug-list)
```

```
                                                            (cadr debug-list)))
          ;;; get 0 to 1 anisotropy measure, needed by some versions.
          (if (not (= version 2)) (sigmoid (frame 0 stats) (nth 0 enhancement) (nth 1 enhancement)
                                   :-> anisotropy))
          (dotimes (i num-steps)
             (let ((angle (/ (* i pi) num-steps))
                   (rank0clip nil)   ;;; these two variables used for version 3.
                   (rank1clip nil))
                (get-energy qsb angle :blur-level blur-level :debug debug :debug-list debug-list :->
                ;;; get 0 to 1 rank measure
                (sub energy (frame 1 stats) :-> linear-rank)
                (div linear-rank (frame 2 stats) :-> linear-rank)
                (format debug "at y = ~d, x = ~d, linear-rank= ~d~% " (car debug-list) (cadr debug-l
                    (iref linear-rank  (car debug-list) (cadr debug-list)))
                ;;;
                ;;; now, based on anisotropy, energy, and rank, decide what kind of weight to give
                ;;; this band in the reconstruction.
                (cond ((= version 1)
                       (sigmoid linear-rank (nth 4 enhancement) (nth 5 enhancement) :-> rank)
                       (mul anisotropy rank :-> (frame i result)))
                      ((= version 2) ;; have a rank dependent threshold on the energy.
                       ;;; make a threshold image to use for the energy
                       ;;; at rank= 0, use (nth 6 enhancement), at rank= 1, use (nth 7 enhancement).
                       (mul linear-rank (- (nth 7 enhancement) (nth 6 enhancement) ) :-> tmp)
                       (add tmp (nth 6 enhancement) :-> tmp)
                       (format debug "energy: ~d     threshold value (at y,x) for energy: ~d
sharpness: ~d ~% "
                          (iref energy (car debug-list) (cadr debug-list))
                          (iref tmp (car debug-list) (cadr debug-list)) (nth 3 enhancement))
                       (sigmoid energy tmp (nth 3 enhancement) :-> (frame i result)))
                      ((= version 3)
                       (cond ((= level 0)
                              (sigmoid energy (nth 2 enhancement) (nth 3 enhancement) :-> tmp)
                              ;;; the image, anisotropy, is sigmoided above
                              (mul tmp anisotropy :-> (frame i result)))
                             (t
                              (if (= level 1) (setq rank0clip (nth 6 enhancement) rank1clip
                                                   (nth 7 enhancement)))
                              (if (= level 2) (setq rank0clip (nth 8 enhancement) rank1clip
                                                   (nth 9 enhancement)))
                              (mul linear-rank (- rank1clip rank0clip) :-> tmp)
                              (add tmp rank0clip :-> tmp)
                              (format debug "level: ~d energy: ~d     threshold value (at y,x) for
energy: ~d     sharpness: ~d ~% "
                                  level
```

```
                        (iref energy (car debug-list) (cadr debug-list))
                        (iref tmp (car debug-list) (cadr debug-list)) (nth 3 enhanc
                  (sigmoid energy tmp (nth 3 enhancement) :-> (frame i result)))))
    (format debug "result at angle: ~d,  after sigmoid, before normalization is ~d ~%
          (iref (frame i result) (car debug-list) (cadr debug-list)))
    ;;; now normalize for the relation between num-steps and the number of filters you
    ;;; normally apply to reconstruct the pyramid.
    (mul (frame i result) (/ (1+ (order (odd-steerable-basis qsb))) num-steps)
         :-> (frame i result))
    ;;; print-out the weights, and inputs
    (format debug " ~% anisotropy: ~d   energy:  -d   rank:  ~d  ~%"
            (iref anisotropy  (car debug-list) (cadr debug-list))
            (iref energy   (car debug-list) (cadr debug-list))
            (iref rank   (car debug-list) (cadr debug-list)))
    (format debug "weighting parameter at angle ~d  is ~d ~% ~%" i
            (iref (frame i result) (car debug-list) (cadr debug-list)))))))))
```

```
;;; a function to print out 1 + 2 x num-steps diagnostic pics:
;;; frame 0:  anisotropy
;;; frame 1 - num-steps:  E(theta)
;;; rest of them:  rank(theta)
(defun debug-get-weighting-factors (qsb blur-level num-steps &key
                                    (noise 0.001) (debug nil) (debug-list '(10 10)) ->)
  (with-result-image-sequence ((result ->) (append (list (1+ (* 2 num-steps))) (dimensions
    (with-local-images ((stats (get-statistics qsb num-steps :blur-level blur-level :noise
                                               :debug debug :debug-list debug-list)))
      ;;; store the anisotropy in the output result
      (copy (frame 0 stats) :-> (frame 0 result))
      (dotimes (i num-steps)
        (let ((angle (/ (* i pi) num-steps)))
          ;;; get energy
          (get-energy qsb angle :blur-level blur-level :debug debug :debug-list debug-list
                      :-> (frame (1+ i) result))
          ;;; get rank
          (sub (frame (1+ i) result) (frame 1 stats) :-> (frame (+ i num-steps 1) result))
          (div (frame (+ i num-steps 1) result) (frame 2 stats)
               :-> (frame (+ i num-steps 1) result)))))))
```

```
;;; function to perform a sigmoidal look-up.
;;; (both of these parameters could be themselves images).
;;; parameters: threshold
;;;             sharpness
;;; the function:  1 / (1 + exp(- sharpness (image - threshold)))
(defun sigmoid (image threshold sharpness &key (binsize (/ (range image) *default-df-size:
  (with-result-image ((result ->) image)
    (with-local-images ((tmp (sub image threshold)))
      (mul tmp sharpness :-> tmp)
      (point-operation tmp #'(lambda (x) (/ 1.0 (1+ (exp (* -1.0 x))))) :binsize binsize
                       :-> result))))

;;; a helping function for make-stereogram
;;; convert the displaced x value to a legal, integral value
(defun round-and-clip (x-pos displacement x-max )
  (min (max (+ x-pos (round displacement)) 0) x-max))

;;; input:  a displacement map for the x-values of one image relative to the other,
;;;  and a density of dots parameter.
;;; we have to do this in the manner of a "from warp", to make sure that
;;; there are no holes in the resulting image.  May want to crop the resulting images,
;;; afterwards, to avoid edge effects due to clipping at the edges.
;;; Although, as long as you don't have any positive numbers in your displacement map
;;; closer to the right edge of the image than their displacement value,
;;; nor any negative displacement numbers in pixels closer to that left edge of the
;;; displacement map, then you don't need to clip the result afterwards.
;;; Add ability to have 2 x 2 sized dots, placed on arbitrary points.
(defun make-stereogram (displacement-map density &key (pel-size 1) ->)
  (with-result-image-pair ((result ->) (dimensions displacement-map) 'make-stereogram)
    (let ((x-max (1- (cadr (dimensions displacement-map))))
          (y-max (1- (car (dimensions displacement-map)))))
      (loop-over-image-positions ((val (y-component result))) (y-pos x-pos)
        (if (< (random 1.0) density)
            (if (= pel-size 1) (setf val 1.0)
                (put-pel (y-component result) y-pos x-pos pel-size y-max x-max))))
      ;;; No need to worry about pel size.
;;This will automatically use whatever size the other image uses.
      (loop-over-image-positions ((val (x-component result))) (y-pos x-pos)
        (setf val (iref (y-component result)
```

```
                         y-pos (round-and-clip x-pos
                                      (iref displacement-map y-pos x-pos) x-max))

;;; draw a size x size  sized image pixel at the position y x
(defun put-pel (image y x size y-max x-max)
  (cond ((= size 1)
         (setf (iref image y x) 1.0))
        ((= size 2)
         (setf (iref image
                     (round-and-clip y 0 y-max)
                     (round-and-clip x 0 x-max)) 1.0)
         (setf (iref image
                     (round-and-clip y 1 y-max)
                     (round-and-clip x 0 x-max)) 1.0)
         (setf (iref image
                     (round-and-clip y 1 y-max)
                     (round-and-clip x 1 x-max)) 1.0)
         (setf (iref image
                     (round-and-clip y 0 y-max)
                     (round-and-clip x 1 x-max)) 1.0
```

```
        ))
              (t
                (format t "^G wrong size asked for in put-pel.  Size = ~d ~%" size))))
```

```
;;; functions.lisp  -- utility functions I often use.
;;;     fun.lisp

;;; function plots a frequency histogram of the two variables in y-im and x-im.
;;; other inputs:   y-max y-min x-max x-min.
(defun cartesian-histogram (y-im x-im &key
                                      (y-min 0.0) (y-max 1.0)
                                      (x-min 0.0) (x-max 1.0)
                                      (out-dims (dimensions y-im))
                                      (mask nil)
                                      (blur-flg t)
                                      (grid-flg t)
                                      ->)
  (with-result-image ((result ->) out-dims 'cartesian-histogram)
    (let* ((x-scale (/ (cadr out-dims) (- x-max x-min)))
           (y-scale (/ (car out-dims) (- y-max y-min)))
           (y-max-pel (1- (cadr out-dims)))
           (x-max-pel (1- (car out-dims)))
           (y-out 0)
           (x-out 0)
           (max-res 0.0))
      (loop-over-image-positions
          ((tmp y-im)) (y x)
        (cond ((or (null mask) (= (iref mask y x) 1.0))
               (setq x-out (round (* (- (iref x-im y x) x-min) x-scale)))
               ;;; remember that the y scale is inverted.
               (setq y-out (round (- y-max-pel (* (- (iref y-im y x) y-min) y-scale))))
               ;;; clip outputs to be within the histogram image size
               (setq x-out (max 0 (min x-max-pel x-out)))
               (setq y-out (max 0 (min y-max-pel y-out)))
               (setf (iref result y-out x-out) (1+ (iref result y-out x-out))))))
      ;;; blur, and make boundary lines
      (if blur-flg (blur result :-> result))
      (setq max-res (maximum result))
      (if grid-flg (draw-line result 0 (floor x-max-pel 2) y-max-pel (floor x-max-pel 2)
                              :val max-res :-> result))
      (if grid-flg (draw-line result (floor y-max-pel 2) 0 (floor y-max-pel 2) x-max-pel
                              :val max-res :-> result)))))

;;; returns the minimum of the two images
(defun min-image (imagea imageb &key -> )
  (with-result-image ((result -> ) imagea)
    (with-local-images ((maska (less-than imagea imageb))
                        (maskb (less-than-or-equal-to imageb imagea)))
```

```
                           (tmp (mul maska imagea)))
       (mul maskb imageb :-> result)
       (add tmp result :-> result))))

;;; returns the maximum of the two images
(defun max-image (imagea imageb &key -> )
  (with-result-image ((result -> ) imagea)
    (with-local-images ((maska (greater-than imagea imageb))
                        (maskb (greater-than-or-equal-to imageb imagea))
                        (tmp (mul maska imagea)))
      (mul maskb imageb :-> result)
      (add tmp result :-> result))))

;;; returns the point-by-point maximum of all the frames of an image sequence
(defun max-image-sequence (im-seq &key -> )
   (with-result-image ((resul
```

```
t -> ) (frame 0 im-seq))
      (copy (frame 0 im-seq) :-> result)
      (dotimes (i (1- (sequence-length im-seq)))
        (max-image (frame (1+ i) im-seq) result :-> result))))

;;; returns the point-by-point minimum of all the frames of an image sequence
(defun min-image-sequence (im-seq &key -> )
   (with-result-image ((result -> ) (frame 0 im-seq))
      (copy (frame 0 im-seq) :-> result)
      (dotimes (i (1- (sequence-length im-seq)))
        (min-image (frame (1+ i) im-seq) result :-> result))))

;;; modifies images a and b   their contents are swapped where swap-mask = 1, and
;;; are left alone where swap-mask = 0.
(defun swap (a b swap-mask)
  (with-local-images ((no-swap-mask (invert swap-mask))
                      (tmpa (mul a no-swap-mask))
                      (tmpb (mul b swap-mask))
                      (tmpc (add tmpa tmpb)))
    (mul a swap-mask :-> tmpa)
    (mul b no-swap-mask :-> tmpb)
    (add tmpa tmpb :-> b)
    (copy tmpc :-> a)))
```

Having above indicated a preferred embodiment of the present invention, it will occur to those skilled in the art that modifications and alternatives can be practiced within the spirit of the invention,. It is accordingly intended to define the scope of the invention only as indicated in the following claims.

We claim:

1. Apparatus for the enhancement of an image so as to remove noise and other artifacts therefrom, comprising:

means for scanning said image to produce a scanned image;

means coupled to the said scanning means for convolving a given neighborhood in said scanned image into a number of sets of transform coefficients, each set having a predetermined spatial scale corresponding to a predetermined spatial frequency band characteristic and each set of transform coefficients having been derived from convolving said image with a number of analysis filters;

means including estimates of orientation anisotropy and orientation strength of said scanned image in the neighborhood of the image associated with a transform coefficient at the given neighborhood for modifying each of said transform coefficients to eliminate those portions of the coefficient corresponding to noise by multiplying a coefficient by a modifier, said modifier being a number derived through the comparison of said estimates of orientation anisotropy and orientation strength with orientation anisotropy and orientation strength thresholds derived from related coefficients, said related coefficient being nearby in position to the coefficient being modified or nearby in scale to that of the coefficient being modified or at a different orientation than that of the coefficient being modified in which said thresholds are derived from analysis of multi-scale decomposition of a clean and a degraded image; and, means for reconstructing an enhanced image from said modified coefficients, said reconstructing means including a number of synthesis filters.

2. The apparatus of claim 1, wherein said analysis includes deriving cumulative clean and degraded image coefficient histograms and comparing them.

3. Apparatus for the enhancement of an image so as to remove noise and other artifacts therefrom, comprising:

means for scanning said image to produce a scanned image;

means coupled to said scanning means for convolving a given neighborhood in said scanned image into a number of sets of transform coefficients, each set having a predetermined spatial scale corresponding to a predetermined spatial frequency bandpass characteristic and each set of transform coefficients having been derived from convolving said image with a number of analysis filters;

means for modifying each of said transform coefficients to eliminate those portions of a coefficient corresponding to noise by applying a multi-input function to a transform coefficient, said function having at least two inputs, one of said inputs being the value of said transform coefficient and at least one other of said inputs being a value derived from a related transform coefficient, said related coefficient being nearby in position to the coefficient being modified or nearby in scale to that of the coefficient being modified or at a different orientation than that of the coefficient being modified, said related transform coefficient being associated with a portion of the scanned image in the same neighborhood as the portion of the scanned image from which said transform coefficient is derived to provide sets of coefficients that are all gathered from a given neighborhood in said image; and, means for reconstructing an enhanced image from said modified coefficients, said reconstructing means including a number of synthesis filters.

4. The apparatus of claim 3, wherein said multi-input function includes means for multiplying a transform coefficient with a number equal to 1 or zero depending on whether a threshold is exceeded or not, said threshold being a function of the orientation strength, orientation anisotropy and coefficient value of a scanned image in the neighborhood of the image associated with said transform coefficient.

* * * * *